United States Patent [19]

Reilly

[11] Patent Number: 4,930,092

[45] Date of Patent: May 29, 1990

[54] POLYGON DISPLAY APPARATUS AND METHOD

[75] Inventor: Shirley L. Reilly, Hillsboro, Oreg.

[73] Assignee: Auto-trol Technology Corporation, Denver, Colo.

[21] Appl. No.: 5,252

[22] Filed: Jan. 20, 1987

[51] Int. Cl.$^5$ ............................................. G06F 15/62
[52] U.S. Cl. .................................... 364/522; 340/729; 364/521
[58] Field of Search ....................... 364/518, 521, 522; 340/789, 729; 434/43

[56] References Cited

U.S. PATENT DOCUMENTS 4,775,946  10/1988  Anjyo ............................. 340/729 X

OTHER PUBLICATIONS

Christiansen et al., "Conversion of Complex Contour Line Definitions into Polygonal Element Mosaics", ACM SIGGRAPH '78 Proceedings (1978).
Ganapathy et al., "A New General Triangulation Method for Planar Contours", ACM SIGGRAPH '82 Proceeding (1982).
Adams Associates, The Computer Display Review (1966), pp. II.72.0 through II.104.0.
Catmull, "A Subdivision Algorithm for Computer Display of Curved Surfaces", University of Utah, Department of Computer Science, UTEC-CSc-74-133, Dec. 1974, pp. 11-17.
Clark, James Henry, "3-D Design of Free-Form B-Spline Surfaces", Department of Computer Science, University of Utah, UTEC-CSc-74 120, Sep. 1974.
Cohen and Lee, "Fast Drawing of Curves for Computer Display", Spring Joint Computer Conference (1969), pp. 297-307.
Coons, "Surfaces for Computer-Aided Design of Space Forms," Report MAC-TR-41 (MIT, Jun. 1967).
Delott and Galimberti, "Innovative Design with Computer Graphics", ALTA Frequenza, vol. 36, No. 5 (May 1967), pp. 430-439.
Foley and VanDam, Fundamentals of Interactive Computer Graphics (Addison-Wesley, 1982).

Forgie, Document No, 700316, MIT (Jan. 1970), pp. 13+.
Forrest, "Current Developments in the Design and Production of 3-Dimensional Curved Objects", Proceedings Royal Society, (London, A321, 187-195, 1971), pp. 188+.
Forrest, "Curves for Computer Graphics," Pertinent (List continued on next page.)

Primary Examiner—Gary V. Harkcom
Assistant Examiner—Mark K. Zimmerman
Attorney, Agent, or Firm—Rothgerber, Appel, Powers & Johnson

[57] ABSTRACT

Data is generated for graphically displaying objects having surfaces defined by vertex locations, each having a particular intensity. The values of electrical signals that represent the coordinates of the vertex locations and a point normal used to obtain the intensities are controlled by programming a computer to generate electrical signals that represent coordinates of the vertices. The values of each of the coordinates is in terms of an equation having parameters "s" and "t". "t" is identified and kept constant at a first amount. The coordinate equations are factored to redefine them in terms of a first constant and a variable represented by "s". The equations are sequentially solved by substituting therein a predetermined series of values for "s" to control the values of the electrical signals so that certain of the signals represent ones of the coordinated that form a first row of the vertices. The factoring and solving steps are repeated using a second amount for "t" and the same predetermined series of values for "s" so that certain electrical signals represent ones of the coordinates that form a second row of the vertices. Groups of three of the electrical signals are sequentially selected from those representing the coordinates forming the first and second rows of vertices to form a first row of triangular polygons. The factoring, solving and selection are repeated as necessary to form rows of polygons that represent the entire object for display.

26 Claims, 5 Drawing Sheets

OTHER PUBLICATIONS

Computer Concepts in Computer Graphics, Proceedings of the 2nd University Conf. on Computer Graphics, Ed. by Faiman and Nievergelt (1969).

Gouraud, "Continuous Shading of Curved Surfaces," IEEE Transactions on Computers, vol. C-20, No. 6 (Jun. 1971), pp. 623–629.

Gouraud, "Computer Display of Curved Surfaces," University of Utah Publication UTECH-CSc-71-113 (Jun. 1971), Computer Science Department, University of Utah.

Lee, "A Class of Surfaces for Computer Display," SJCC (1969), pp. 311+.

Lee, "Three-Dimensional Curves and Surfaces for Rapid Computer Display," AD-696176, pp. 1–121.

Sutherland et al., "A Characterization of 10 Hidden-Surface Algorithms," NTIS Document AD-773963.

Newmann and Sproull, "Principles of Interactive Computer Graphics," McGraw-Hill, 1979, pp. 303, 371, 313, 325, 334–344, 389–418).

Kelley, "A Computer Graphics Program for the Generation of Half-Tone Images with Shadows", Thesis, 1970, NTIS AD-698 124.

Weitek Brochure, WTL 1032 and WTL 1033 Processors (Copyright 1983).

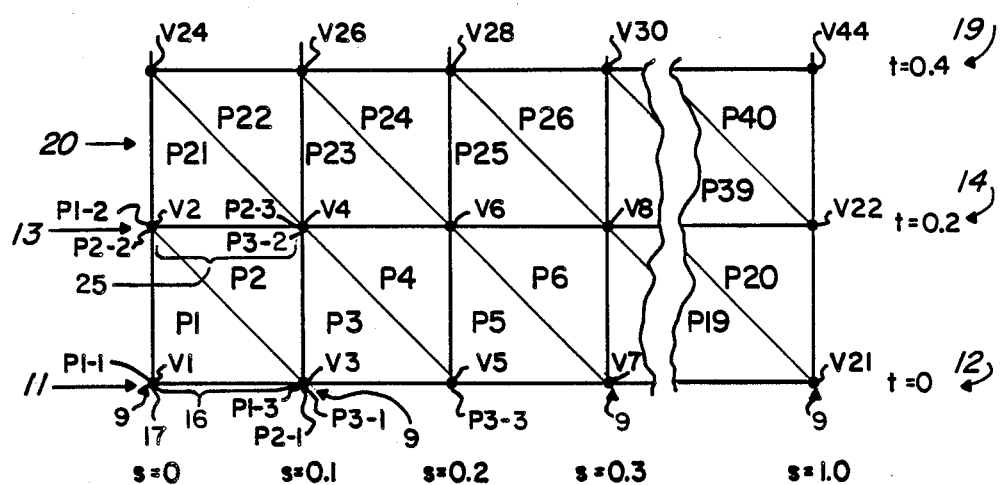
*Fig_2*
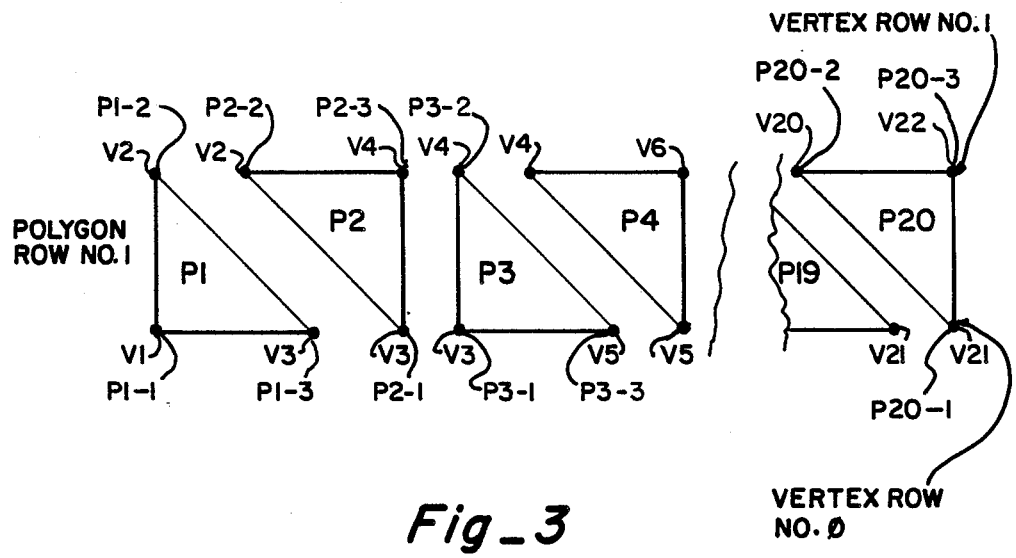
*Fig_3*

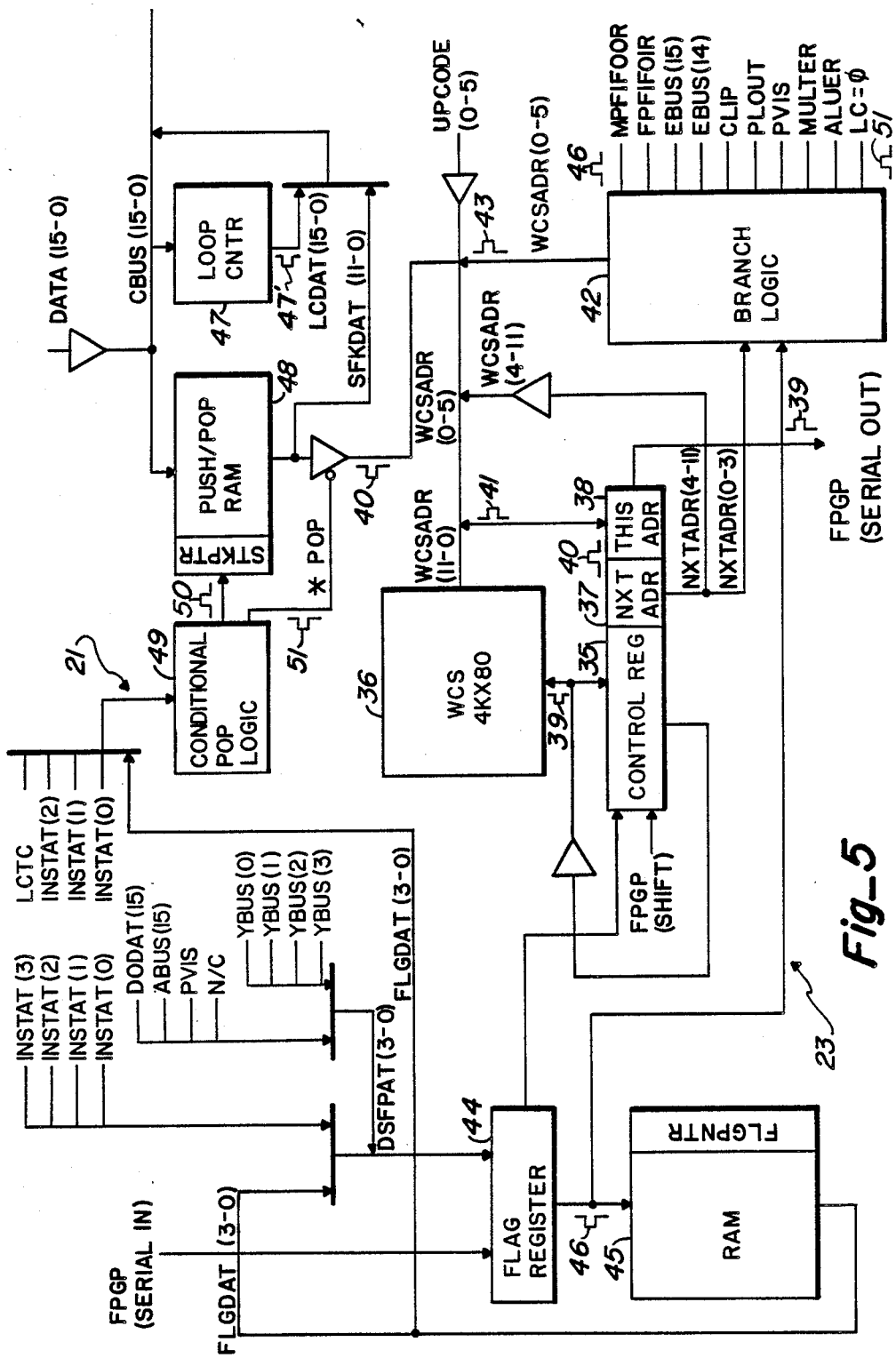
Fig_5

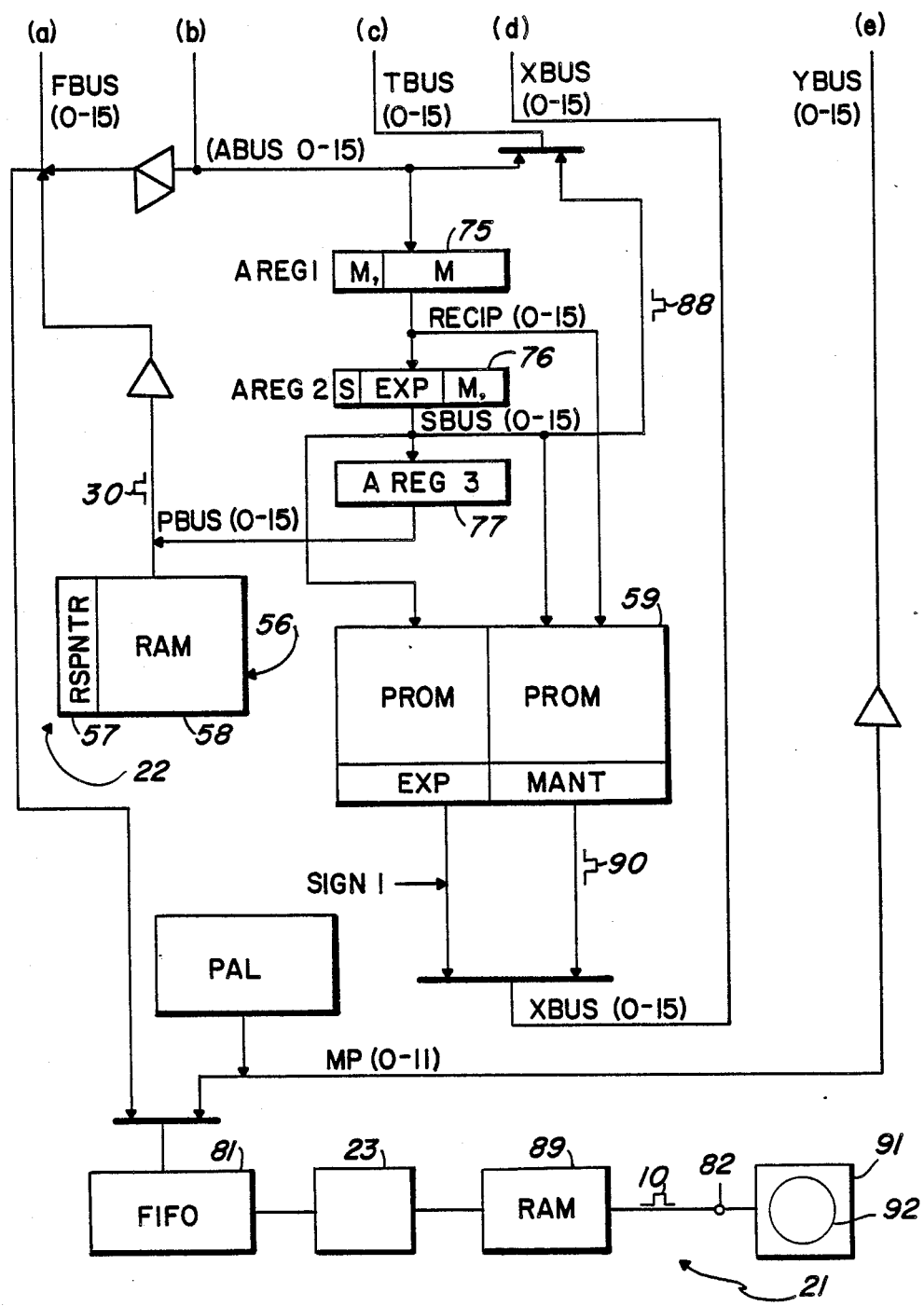
Fig_4B

POLYGON DISPLAY APPARATUS AND METHOD

BACKGROUND OF THE INVENTION

1. Field of the Invention

The present invention relates to the field of computer graphics and more particularly to the field of displaying three dimensional (3-D) objects in two-dimensional (2-D) form.

2. Description of the Prior Art

Computer graphics systems for displaying 3-D objects in 2-D form, such as on a video screen, must first define the surface or shape of the object to be displayed. The surface is defined in terms of each of the three coordinates (x, y, and z) of many points (or vertices) that are used to define the surface. Equations are used to specify how the x coordinate, for example, varies with variations of the parameters "s" and "t", for example. As the complexity of the objects to be displayed increases, it is still necessary to minimize both (1) the time required to process the surface equations so as to obtain the values of the x, y, and z coordinates of the vertices that define the surface of the object, and (2) the amount of data that must be stored as the x, y, and z coordinates are computed.

In the past, as the values of the x, y, and z coordinates of the vertices have been obtained, selected vertices have been organized into polygons formed by from 3 to "n" vertices, where "n" is selected according to the complexity of the surface to be displayed. Some of those systems separately identified each polygon. For example, in the Thesis "A Computer Graphics Program for the Generation of Half-Tone Images with Shadows", by K. C. Kelley, published in 1970, (NTIS AD-698 124), for each polygon there was provided a block of information including plane coefficients, reflectivity coefficients, the number of vertices of the polygon and the coordinates of the first through the "$n^{th}$" vertices.

Similarly, the Thesis "Applications of B-Spline Approximation to Geometric Problems of Computer-Aided Design", by Richard Riesenfeld, Computer Science, University of Utah, UTEC-CSc-73-126, Mar., 1973, ("Riesenfeld") dealt with individual Bezier polygons (that were open or closed) to define curves that are to be rendered on a graphics display.

In a different approach to managing the data corresponding to the x, y, and z coordinates of the vertices that define an object, Foley and Van Damm, in their text "Fundamentals of Interactive Computer Graphics", ("Foley"), refer to an object defined by a mesh formed by polygons. The vertices were said to be stored in a vertex list and a polygon was said to be defined by a list of pointers into the vertex list. Thus, a polygon made up of vertices 3, 5, 7, and 10 in the vertex list would be represented as P=(3, 5, 7, 10). Foley refers to the storage of each vertex just once, such that considerable space is saved, which appears to indicate that the values of all of the vertices that define the object are obtained at once and stored.

Computer graphics systems for displaying 3-D objects in 2-D form are also now expected to show the object with hidden lines removed and to shade the surface of the object as if a light source were shining on the object. For example, the above-noted Kelley Thesis provided a capability of locating the light source at a point away from the observer.

To provide the hidden line and shading capabilities, the normal to the surface of a polygon (the "polygon normal") has been determined. As reported in the Foley text at pages 582 and 583, Gouraud shading, or intensity interpolation shading, uses such polygon (or surface) normals to obtain the vertex (or point) normal by averaging the polygon normals of all polygons that share a given vertex. The intensity at the given vertex is obtained by using the vertex normal with a shading model. The limitations of such averaging of polygon normals are discussed in the text *Principles of Interactive Computer Graphics*, by W. M. Newman and R. F. Sproull, McGraw-Hill, 1973, ("Newman"). Such limitations include inaccuracy of the point normal, the increased time required to obtain the point normal due to the large number of surrounding polygons that share the given vertex, and the need to store additional vertex data that is required due to the increased number of surrounding polygons.

With respect to shading capabilities, the intensity at a given point or vertex must be determined. This is done by first obtaining the point normal and then using intensity models to obtain the intensity at the point as a function of the point normal. Point normals have been obtained by taking the cross product of the partial derivatives of the given vertex with respect to parameters such as "s" and "t". Thus, the partial derivatives $dx/ds$ and $dx/dt$ were used. Having such cross-product, the values of the parameters and other variables in the cross-product equation were then substituted into such equation. Experience indicated that it required prohibitive amounts of computation time to recompute all of the terms of the partial derivative equation with respect to each of the coordinates x, y, and z for each value of the parameters s and t simply to obtain the value of the partial derivatives with respect to x, y, and z. To avoid such extensive computations, the averaging of polygon normals discussed by Newman has been used.

In the dissertation, "A Subdivision Algorithm for Computer Display of Curved Surfaces", by Edwin Catmull, Dec., 1974, UTEC-CSc-74-133, Department of Computer Science, University of Utah.) ("Catmull") it was also recognized that to produce high quality computer-generated images of surfaces and curved solid objects on a raster-scan output device, it was necessary to both accurately represent the surfaces and to control shading and texture. Catmull discussed the difficulties in using polygons to approximate curved surfaces. Catmull referred to a report by Henri Gouraud, "Computer Display of Curved Surfaces", Department of Computer Science, University of Utah, UTEC-CSc-71-113, Jun., 1971, who associated a scalar light intensity value with each vertex of a polygon. Catmull also referred to a report by Bui Tuong-Phong, entitled "Illumination for Computer-Generated Images", Department of Computer Science, University of Utah, UTEC-CSc-71-113, Jun. 1971. Phong interpolated the entire surface normal vector between vertices and edges instead of the scalar intensity values that Gouraud used. This yielded a normal at every display point, (or vertex) which was used to calculate intensity. Catmull noted that such normal was not the mathematically correct one. As understood, inaccuracy results from the amount of interpolation between points that are calculated exactly.

Catmull also discussed using surface normals for intensity calculations (page 34) and referred to Phong who calculated intensity using the surface normal and the light sources. This was complicated because the equation of the normal to a bi-cubic patch is a fifth degree polynomial. This method requires more information in order to obtain the tangents and, of course, it requires the extra computation involved in taking a cross product at every point.

In a thesis by James Henry Clark entitled, "3-D Design of Free-Form B-Spline Surfaces", Department of Computer Science, University of Utah, UTEC-CSc-74-120, Sept., 1974, ("Clark"), page 27 refers to computation of an equation (2.15) for each point of a surface. The equation (2.15) is for S as a function of s and t. The point is made that to perform computations of 16 times for each value of s and t simply to compute one vertex requires too many computations. On page 28, to reduce the computations a table look-up is suggested based on pre-computing the equation using values of s and t. Then, at initialization time, the surface is completely evaluated and stored in tabular form.

SUMMARY OF THE INVENTION

In contrast to the prior art that computed and stored all vertices that define the surface of the object, so that vertices could be later organized into polygons, the preferred embodiment of the present invention determines the values of a relatively few vertices and efficiently groups them into polygons before determining the value of additional vertices to achieve the following objectives.

Polygon display apparatus and method according to the present invention reduce the time required to compute the vertices of the polygons that represent objects to be displayed and the vertex (or point) normals associated with such vertices.

The present invention also significantly reduces the requirements for storing data that represents the values of polygon vertices by computing such vertices on a row by row basis, where such rows are selected so as to substantially reduce the time required to obtain values for the vertex coordinates and the vertex normals.

With these objects in mind, the polygon display apparatus and method of the present invention use an equation having two parameters to define the coordinates of a vertex that represents a point on the surface of an object to be displayed. At first, one of the parameters (e.g. "t") is kept constant to enable factoring of the equation to reduce the time required to obtain the values of a row of vertices as the other parameter (e.g. "s") is varied. A second row of vertices is obtained in the same manner after adjusting the value at which the first parameter is held constant. Similar factoring is performed in each of the partial derivative equations for the partial derivative of the coordinates with respect to "s" and "t", e.g., $dx/ds$ and $dx/dt$ for the x coordinate of the vertices. This factoring is based on the fact that "t" is no longer a variable with respect to each row, such that the number of logic operations necessary to obtain the value of the partial derivatives for the vertex is substantially reduced.

The selection of only two rows of vertex and point normal data substantially reduces the amount of data that must be stored as polygons are defined. For ease of reference, such reduction in such data to two rows is referred to as a "minimum set" of vertex data since two rows of data are required before polygons are defined, as discussed below.

Additionally, once the minimum set of point and point normal data has been obtained and stored for each of the two rows, that data for the two rows is then processed into polygons. In particular, polygons that define the surface of the object to be displayed are identified in a predetermined sequence using a minimum number of steps. Adjacent identified polygons share an edge and that edge is not displayed twice when all polygon outlines are displayed, thus avoiding the problems noted in the Foley text at page 509. Further, this minimizes the amount of row storage required to record the polygons because all of the polygons are not stored at one time for the entire object. Rather, a first polygon is selected by identifying a first group of three vertices from the two rows. Those three vertices are separately stored in polygon storage and then output as a group as a first polygon. Then, one additional vertex is selected from row storage and it is stored in polygon storage by replacing the first vertex in polygon storage, such that only vertices 2, 3, and 4 are in the polygon storage. Vertices 2, 3, and 4 are output as a group as the second polygon. This process is repeated until all of the vertices in the first two rows have been used to define successive polygons.

Then the values of the third row of polygon vertices and the respective point normals are obtained and written into row storage in substitution for the first row and the process of defining additional successive polygons is continued.

BRIEF DESCRIPTION OF THE DRAWINGS

FIG. 2 is an enlarged portion of FIG. 1 showing how the vertices shown in FIG. 1 are organized to form polygons;

FIG. 3 is an enlarged portion of FIG. 2 showing selected polygons in a polygon row no. 1 formed from vertices of vertex rows 1 and 2;

FIGS. 4A and 4B, when joined at lines (a)–(e), form a schematic diagram of a processor that generates signals representing the vertices and polygons shown in FIGS. 1–3; and FIG. 5 is a schematic diagram of a circuit for controlling the processor.

DESCRIPTION OF THE PREFERRED EMBODIMENT

Introduction

Figure 1:
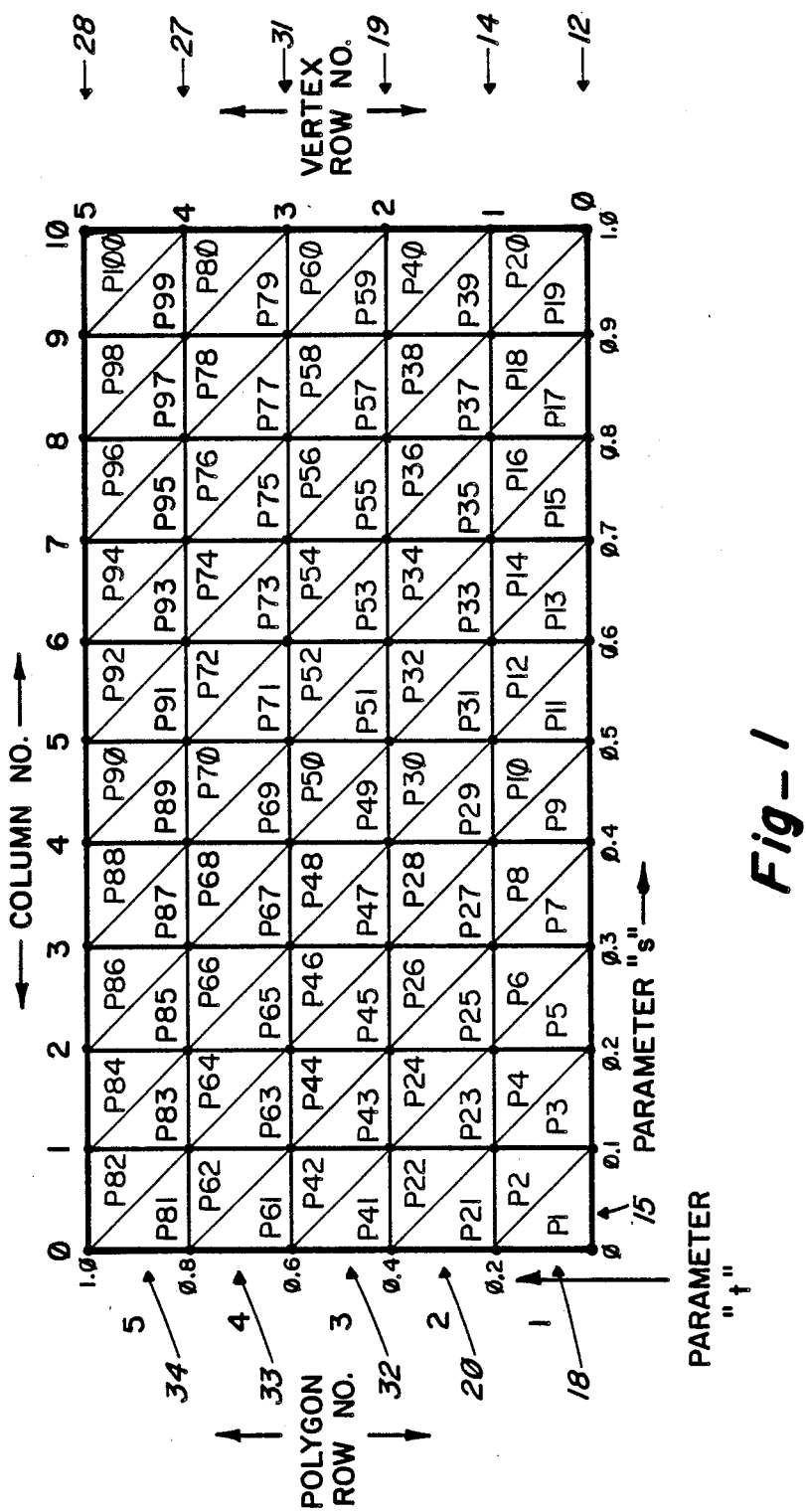
FIG. 1 is an schematic drawing showing how parameters "s" and "t" vary to define vertices of an object to be displayed.

Referring first to FIGS. 1, 2, and 4B in the preferred embodiment of the present invention, cubicorder surfaces are used to represent an object (not shown) to be displayed in a 3-D field of view. A standard 3-D world or object space coordinate system is used. The locations of the points (not shown) of such surfaces vary as a function of the parameters "s" and "t" that are shown in FIG. 1. The locations of vertices 9 represent the points and are expressed in terms of coordinates x, y, and z that define distances within the 3-D world or object space coordinate system.

According to the method of the present invention, the surfaces of the object are graphically displayed by controlling the values of electrical signals 10 (FIG. 4B) that represents the x, y, and z coordinates of the vertices 9 that define the points on the surface of the object. The method includes the steps of selecting an equation having at least two parameters (e.g. "s" and "t" shown in FIG. 1) for defining the x, y, and z coordinates of the vertices 9. A first of the parameters (e.g. "t") is identified and the value of it is kept constant at a first amount, shown as 0 in FIG. 1. The equation is then factored to express the coordinates x, y, and z in terms of the first constant "t" and of a variable represented by a second one (e.g. "s") of the parameters. The equation is sequentially solved by substituting a predetermined series of values for the second one of the parameters ("s"), shown as s=0 through s=1.0 in FIG. 1, to control the values of certain of the vertex electrical signals 10 (FIG. 4B) and to define the coordinates x, y, and z of a series 11 (FIG. 2) of the vertices V1, V3, V5, V7 . . . V21 (FIG. 2) that form a first vertex row 12 (row 0 in FIG. 1) of the points on the surface of the object. The factoring and solving steps are repeated using a second amount (t=0.2, FIG. 1) for the first parameter "t" and the same predetermined series, shown as s=0 through s=1.0 in FIG. 1, of values for the second one "s" of the parameters to control the values of certain other of the electrical signals 10 and to define at least the coordinates of a second series 13 (FIG. 2) of the vertices 9 that form a second vertex row 14 (row 1 in FIG. 1) of the points on the surface of the object.

In other aspects of the method of the present invention, the vertices V1, V3 . . . V21 of the first vertex row 12 and the vertices V2, V4 . . . V22 of the second vertex row 14 are organized into triangular polygons 15, identified as P1 through P100 in FIG. 1, by performing the further step of selecting the coordinates x, y, and z of a pair 16 formed by the vertices V1 and V3 at one end 17 of the first vertex row 12 and the coordinates x, y, and z of one vertex V2 from the corresponding end 17 of the second vertex row 14 to identify and store those electrical signals 10 that represent a first polygon P1 (FIG. 1) that defines certain of the points on the surface of the object to be displayed. The coordinates x, y, and z of the next vertex V4 (FIGS. 2 and 3) of the second vertex row 14 are selected and the coordinates x, y, and z of the first vertex V1 of the first vertex row 12 are discarded to generate and store electrical signals 10 that represent the next polygon P2 (FIG. 1) adjacent the last-formed polygon P1 for defining an additional point on the surface of the object. The selection of the coordinates x, y, and z of the next vertices 9 is continued by alternately and sequentially selecting the next vertex 9 from the first vertex row 12 and then from the second vertex row 14 and discarding a selected previous vertex 9 so that the additional electrical signals 10 are generated for representing a series 18 (FIG. 1) of polygons 15 formed between all of the vertices 9 of the first and second vertex rows 12 and 14, respectively. The series 18 corresponds to polygon row 1 shown in FIG. 1.

The factoring and solving steps are repeated using a third amount ("t"=0.4) for the first parameter "t" and the same predetermined series, shown as s=0 through s=1.0 in FIG. 1, of values for "s" to control the values of certain other of the electrical signals 10 and to define the coordinates x, y, and z of an additional series 19 of the vertices 9 that form an additional vertex row 2 of the points on the surface of the object. After the electrical signals 10 are obtained to define the vertices 9 of each new vertex row, the coordinates x, y, and z of the vertices 9 of the prior vertex row (e.g. 14) and the new vertex row (e.g. 19) are selected to generate electrical signals 10 that represent the polygons 15 defined by those two vertex rows 14 and 19. The vertex rows 14 and 19 (vertex row numbers 1 and 2 in FIG. 1) form a polygon row 20 (shown as polygon row number 2 in FIG. 1).

Figure 4A:
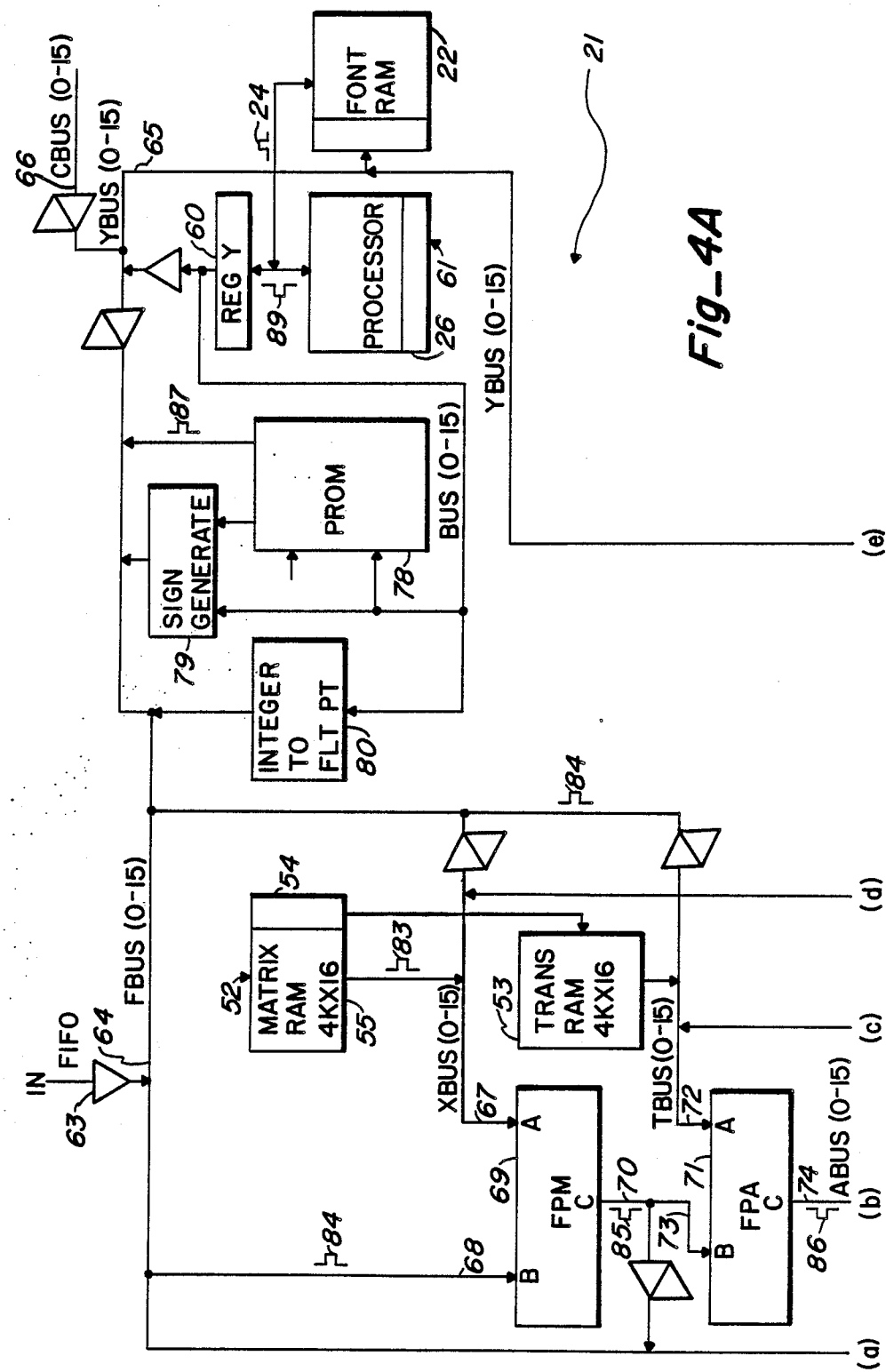

Referring to FIGS. 4A, 4B, and 5, apparatus 21 of the present invention generates the signals 10 for graphically displaying the object. A font RAM circuit 22 is provided for registering the vertex electrical signals 10 that represent the first and second vertex rows 12 and 14 of the vertex locations. In FIG. 5, a control circuit 23 is shown for selecting the vertex electrical signals 10 that represent the pair 16 of vertices V1 and V3 at the one end 17 of the first vertex row 12 and the V2 vertex 9 at the corresponding end 17 of the second vertex row 14 to provide the vertex electrical signals 10 that define the first or P1 polygon 15 for graphically displaying the object.

The control circuit 23 then selects from the RAM circuit 22 a next vertex electrical signal 24 representing the next or V4 vertex 9 of the second vertex row 14 and substitutes the next signal 24 for one of the previously selected signals 10 to define the next or P2 polygon 15 along the first polygon row 18 for representing the object. The control circuit 23 alternately selects the vertex electrical signals 10 representing the vertices 9 from the first vertex row 12 and then from the second vertex row 14 so that the series 18 of polygons 15 is formed between the first and second vertex rows 12 and 14, respectively. The control circuit 23 is rendered effective upon selection of the vertex electrical signals 10 representing all of the vertices 9 of the first and second vertex rows 12 and 14, respectively, for writing into the RAM circuit 22 the vertex electrical signals 10 representing vertices 9 in the third vertex row 19 in place of the first row 12 of vertices 9. The control circuit 23 then cycles to select vertex electrical signals 10 representing a pair 25 of vertices 9 (V2 and V4) at the one end 17 of the second vertex row 14 and the V24 vertex 9 at the corresponding end 17 of the third vertex row 19 to provide the vertex electrical signals 10 that define an additional P21 polygon 15 for graphically displaying the object. A register 26 (FIG. 4A) defines the number (shown as six in FIG. 1) of vertex rows 12, 14, etc. to be used in displaying the object. In response to forming the last or P100 polygon 15 from the last two vertex rows 27 and 28 of that number (six) of rows, the control circuit 23 stops.

SURFACE DEFINITION EQUATIONS

Considering how the cubic-order surfaces of the object to be displayed are defined, the parametric form for cubic-order surfaces is stated in equation (1) below. Equation (1) is the general form for Hermite, Bezier, and B-spline curves according to the Foley text, page 524. Equations for the y and z coordinates are equivalent.

$$x(s,t) = D11*s^3*t^3 + D12*s^3*t^2 + D13*s^3*t + \\ D14*s^3 + D21*s^2*t^3 + D22*s^2*t^2 + \\ D23*s^2*t + D24*s^2 + D31*s*t^3 + \\ D32*s*t^2 + D33*s*t + D34*s + \\ D41*t^3 + D42*t^2 + D43*t + D44 \quad (1)$$

where s=(0,1), t=(0,1).

Equation (1) can also be expressed as:

$$x(s,t) = S*Dx*T^t \quad (2)$$

where S=[$s^3$ $s^2$ s 1], T=[$t^3$ $t^2$ t 1], and $T^t$ is the transpose of T.

Similarly, equations (1) and (2) can be expressed in terms of the "y" or "z" coordinates, in which cases the respective "Dy" and "Dz" terms are used instead of "Dx".

Referring to equation (1), the terms "D11", "D12", "D13", "D14", "D21", "D22", "D23", "D24", "D31", "D32", "D33", "D34", "D41", "D42", "D43", and "D44" represent coefficients that are defined by a coefficient matrix, there being one coefficient matrix for each coordinate x, y, and z.

For example, the x coefficient matrix is obtained as follows:

PROCESS 1
Obtain x Coefficient Matrix

| Step No. | Step |
|---|---|
| 1.1 | enter an input x coefficient matrix. |
| 1.2 | concatenate a magic matrix with the input x coefficient matrix. |
| 1.3 | concatenate the resulting matrix with the transpose of the magic matrix. |
| 1.4 | get the x coefficient matrix. |

To perform Process 1, the matrix elements are arranged as follows:

$$\begin{bmatrix} a11 & a12 & a13 & a14 \\ a21 & a22 & a23 & a24 \\ a31 & a32 & a33 & a34 \\ a41 & a42 & a43 & a44 \end{bmatrix} \quad (3)$$

Based on this arrangement, the input x coefficient matrix is:

$$\begin{bmatrix} x(0,0) & x(0,1) & dx/dt(0,0) & dx/dt(0,1) \\ x(1,0) & x(1,1) & dx/dt(1,0) & dx/dt(1,1) \\ dx/ds(0,0) & dx/ds(0,1) & d2x/dsdt(0,0) & d2x/dsdt(0,1) \\ dx/ds(1,0) & dx/ds(1,1) & d2x/dsdt(1,0) & d2x/dsdt(1,1) \end{bmatrix} \quad (4)$$

where x(0,1) means the value of x at s=0, t=1, for example.

The magic matrix for the Hermite form of parametric cubic surfaces is defined on page 57 in the Catmull text as follows:

$$\begin{bmatrix} 2 & -2 & 1 & 1 \\ -3 & 3 & -2 & -1 \\ 0 & 0 & 1 & 0 \\ 1 & 0 & 0 & 0 \end{bmatrix} \quad (5)$$

The Step 1.2 concatenation of the magic matrix and the input x coefficient matrix is a post-concatenation. With the input x coefficient matrix (4) referred to as B, and the resulting concatenated matrix referred to as C, the post-concatenation results in the following:

$$\begin{aligned}
C11 &= B11*2 + B21*-2 + B31 + B41 \\
C12 &= B12*2 + B22*-2 + B32 + B42 \\
C13 &= B13*2 + B23*-2 + B33 + B43 \\
C14 &= B14*2 + B24*-2 + B34 + B44 \\
\\
C21 &= B11*-3 + B21*3 + B31*-2 - B41 \\
C22 &= B12*-3 + B22*3 + B32*-2 - B42 \\
C23 &= B13*-3 + B23*3 + B33*-2 - B43
\end{aligned} \quad (6)$$

-continued
$$\begin{aligned}
C24 &= B14*-3 + B24*3 + B34*-2 - B44 \\
\\
C31 &= B31 \\
C32 &= B32 \\
C33 &= B33 \\
C34 &= B34 \\
C41 &= B11 \\
C42 &= B12 \\
C43 &= B13 \\
C44 &= B14
\end{aligned}$$

In Step 1.3, the concatenated matrix C resulting from Step 1.2 and the transpose of the magic matrix (5) are concatenated. This is a post-concatenation. The transpose of the magic matrix is as follows:

$$\begin{bmatrix} 2 & -3 & 0 & 1 \\ -2 & 3 & 0 & 0 \\ 1 & -2 & 1 & 0 \\ 1 & -1 & 0 & 0 \end{bmatrix} \quad (7)$$

The resulting x coefficient matrix is referred to as "D" and is in the form of matrix (3), where:

$$\begin{aligned}
D11 &= 2*C11 + (-2)*C12 + C13 + C14 \\
D12 &= -3*C11 + 3*C12 + (-2)*C13 - C14 \\
D13 &= C13 \\
D14 &= C11 \\
\\
D21 &= 2*C21 + (-2)*C22 + C23 + C24 \\
D22 &= -3*C21 + 3*C22 + (-2)*C23 - C24 \\
D23 &= C23 \\
D24 &= C21 \\
\\
D31 &= 2*C31 + (-2)*C32 + C33 + C34 \\
D32 &= -3*C31 + 3*C32 + (-2)*C33 - C34 \\
D33 &= C33 \\
D34 &= C31 \\
\\
D41 &= 2*C41 + (-2)*C42 + C43 + C44 \\
D42 &= -3*C41 + 3*C42 + (-2)*C43 - C44 \\
D43 &= C43 \\
D44 &= C41
\end{aligned} \quad (8)$$

Process 1 is described in greater detail below in respect to Charts 1A through 1L.

Referring to the parametric form for cubic-order surfaces stated in equation (1) and the coefficient matrix elements (8), it is observed that "s" and "t" are parameters that vary, whereas the elements of the x coefficient matrix (e.g. "D11") represent a number (i.e., a constant). In the past, to obtain a value for the coordinate "x", the particular "s" and "t" values were substituted for the s, $s^2$, $s^3$, etc. terms of equation (1) and calculated, or a look up table was used to obtain $s^2$, $s^3$, etc. for a given value of "s" and $t^3$ and $t^2$ for a given value of "t". The various operations called for in equation (1) were then a function of the values of "s" and "t". As noted above, when such values of "s" and "t" were substituted into equation (1), it took a prohibitive number of machine cycles to calculate all of the values of the coordinates x, y, and z of the various vertices 9. Further, such selection of "s" and "t" was unrelated to the eventual grouped relationship of certain vertices (e.g. V1, V2, and V3) into the polygons 15.

FACTORING SURFACE EQUATIONS

On the other hand, the preferred embodiment of the present invention substantially reduces the number of machine cycles required to compute the coordinates x, y, and z of each of the vertices 9 that represent the object. In particular, one of such parameters is held constant and the other of the parameters is varied. For each value of the other parameter, the x, y, and z coordinates of a given vertex 9 are obtained. Further, by holding the first parameter constant, equation (1) can be factored and reduced to a function of only one parameter. As a result, as the second parameter is varied, the number of machine cycles required to obtain the values of the coordinates of each vertex 9 is substantially reduced. The parameter held constant is then incremented by one increment and held constant while the other parameter is varied through its entire range. This results in obtaining values for the x, y, and z coordinates of only the two series 11 and 13 of vertices 9, which are stored and then organized into the form of the series 18 of polygons 15. Then a third vertex row 19 of vertices 9 is obtained and another series 20 of polygons 15 is formed.

Referring now in detail to FIG. 1, the selection of the increments by which the parameters "s" and "t" are varied (or incremented) may be appreciated. Each of the parameters "s" and "t" is incremented or stepped by amounts that indicate how finely the surface of the object to be displayed will be drawn. The surface of the object to be displayed is determined by a series of curves, generated by varying "s" and "t" from 0 to 1. The step sizes by which "s" and "t" vary determine how many curves will make up the surface. The smaller the step size, the more detailed the surface will appear. The smallest step size allowed for both "s" and "t" is 1. This means that 100/1, or 100, steps is the finest the surface may be divided. Since the values of "s" and "t" are used frequently, as well as their squared and cubed values, these values are precalculated and stored.

The "s" and "t" step sizes are input as two 16 bit integers with a value from 1 to 100. The "s" and "t" step sizes may be different.

The surface of the object to be displayed is generated in a grid-like manner. The "s" step size determines the number of columns used to generate the surface, while the "t" step size determines the number of rows used. The number of columns used is 1 plus (100/"s" step size). The number of rows is 1 plus (100/"t" step size). For example, FIG. 1 shows an "s" step size of 10. Since (100/10) is 10, there are 1+10=11 columns numbered 0 to 10. For data storage purposes, these columns have "column addresses" of 0 to 10. Similarly, a "t" step size of 20 is shown. Since 100/20 is 5, there are 1+5=6, there are 6 vertex rows numbered 0 to 5, which are identified by the reference numbers 12, 14, 19, 27, and 28, respectively. Again, for data storage purposes, these vertex rows have vertex row addresses of 0 to 5.

As will be described below with respect to Process 2, a given vertex 9 is defined by substituting selected "s" and "t" values into the x coordinate equation and into the corresponding y and z coordinate equations. The "s" and "t" values that are used result in the given vertex 9 having a particular vertex row address and a particular column address. Thus, in the example shown in FIGS. 2 and 3, a first or V1 vertex 9 on the lower left end 17 of FIG. 2 has a vertex row address of "0" and a column address of "0" and is obtained using "s"=0 and "t"=0 (stated as "(0,0)") in the x coordinate equation and in the corresponding y and z coordinate equations. The next V3 vertex 9 to the right has a 0 vertex row address and a 1 column address, and is obtained using "s"=0.1 and "t"=0, (stated as "(0.1,0)"). Considering a 1 vertex row address, the first or V2 (left hand most) vertex 9 has a 1 vertex row address and a 0 column address and is obtained using "s"=0 and "t"=0.2.

As described below with respect to Processes 3 and 4, the vertex data for a given (e.g. V1) vertex 9 is accessed, transformed and the point intensity calculated. This is done for the V2 vertex 9 and then for the V3 vertex 9. Then these three V1, V2, and V3 vertices 9 are combined to form the first polygon P1 (FIG. 1).

DEFINITION OF MULTIPLIERS FOR COORDINATE EQUATION (1)

With the "s" and "t" grid in mind, the effect of holding "t" constant while varying "s" may be appreciated by referring to equation (1) and to the coefficient matrix elements (8). When the parameter "t" is held constant while "s" is incremented, there is only one variable, namely "s", in equation (1). This enables the factoring of equation (1) as follows:

$$x(s,t) = s^3(D11*t^3 + D12*t^2 + D13*t + D14) + \\ s^2(D21*t^3 + D22*t^2 + D23*t + D24) + \\ s(D31*t^3 + D32*t^2 + D33*t + D34) + \\ (D41*t^3 + D42*t^2 + D43*t + D44) \quad (9)$$

Since "t" is constant for any vertex row address, the terms in parentheses in equation (9) are constant. To save on calculation time, those terms are calculated only once per row (and are stored) as follows:

$$s3 = D11*t^3 + D12*t^2 + D13*t + D14 \\ s2 = D21*t^3 + D22*t^2 + D23*t + D24 \\ s1 = D31*t^3 + D32*t^2 + D33*t + D34 \\ s0 = D41*t^3 + D42*t^2 + D43*t + D44 \quad (10)$$

The terms "s3", "s2", "s1", and "s0" are referred to as "multipliers".

Referring to the multiplier equations (10), it is observed that the multipliers s3, s2, s1 and s0 are constant for any given vertex row address since "t" is constant for any given vertex row address. Thus, equation (9) reduces to the following:

$$x(s,t) = s^3(s3) + s^2(s2) + s(s1) + s0. \quad (11)$$

Having equation (11), in order to obtain the value for the x coordinate of a particular vertex 9, it is simply necessary to insert into equation (11) the value of the multipliers s0, s1, s2 and s3 and the values of $s^3$, $s^2$, and s. Thus, the number of operations to determine the value of the x coordinate, for example, is reduced to 6, including 3 multiplies and 3 addition steps.

In the same manner as equation (11) was obtained, the following factored equations for the y and z coordinates of each vertex 9 are obtained and are as follows:

$$y(s,t) = s^3(s3) + s^2(s2) + s(s1) + s0 \quad (13)$$

$$z(s,t) = s^3(s3) + s^2(s2) + s(s1) + s0 \quad (14)$$

In equations (13) and (14), the elements D11, D12, D13, etc. in the multipliers s3, s2, s1, and s0 refer to the y or z coefficient matrices instead of to the x coefficient matrix.

DEFINITION OF MULTIPLIERS FOR POINT NORMAL VECTORS

The preferred embodiment of the present invention also substantially reduces the time necessary to obtain a point normal vector for each vertex 9. The point normal vector is used in obtaining a point intensity for each vertex 9. The point normal vector is the cross-product of the partial derivatives of the coordinates x, y, and z of the vertex 9 with respect to each variable (or parameter) "s" and "t". The cross-product is as follows:

$$[dx/ds \; dy/ds \; dz/ds] \times \begin{bmatrix} dx/dt \\ dy/dt \\ dz/d \end{bmatrix} = \begin{matrix} \text{[point normal } x, \\ \text{point normal } y, \\ \text{point normal } z] \end{matrix} \quad (15)$$

where:
point normal x = (dz/ds*dy/dt) − (dy/ds*dz/dt)
point normal y = (dx/ds*dz/dt) − (dz/ds*dx/dt)
point normal z = (dy/ds*dx/dt) − (dx/ds*dy/dt)

Before the cross product can be obtained, the partial derivatives must be determined. To determine the partial derivatives, the point coordinate equation (1) is differentiated with respect to "s" and also with respect to "t". The equations for the x coordinate of these partial derivatives are as follows:

$$\begin{aligned}
dx/ds = & \; 3*D11*t^3*s^2 + 3*D12*t^2*s^2 + 3*D13*t*s^2 + \\
& \; 3*D14*s^2 + 2*D21*t^3*s + 2*D22*t^2*s + \\
& \; 2*D23*t*s + 2*D24*s + D31*t^3 + D32*t^2 + \\
& \; D33*t + D34
\end{aligned} \quad (16)$$

and $$\begin{aligned}
dx/dt = & \; 3*D11*s^3*t^2 + 2*D12*s^3*t + D13*s^3 + \\
& \; 3*D21*s^2*t^2 + 2*D22*s^2*t + D23*s^2 + \\
& \; 3*D31*s*t^2 + 2*D32*s*t + D33*s + \\
& \; 3*D41*t^2 + 2*D42*t + D43
\end{aligned} \quad (17)$$

where "D" is the x coefficient matrix.

These equations can be factored as follows:

$$\begin{aligned}
dx/ds = & \; s^2(3*D11*t^3 + 3*D12*t^2 + 3*D13*t + 3*D14) + \\
& \; s(2*D21*t^3 + 2*D22*t^2 + 2*D23*t + 2*D24) + \\
& \; (D31*t^3 + D32*t^2 + D33*t + D34)
\end{aligned} \quad (18)$$

$$\begin{aligned}
dx/dt = & \; s^3(3*D11*t^2 + 2*D12*t + D13) + \\
& \; s^2(3*D21*t^2 + 2*D22*t + D23) + \\
& \; s(3*D31*t^2 + 2*D32*t + D33) + \\
& \; (3*D41*t^2 + 2*D42*t + D43)
\end{aligned} \quad (19)$$

The following terms of the factored equations (18) and (19) are calculated once per vertex row address, and the resulting constants or multipliers are stored at the following addresses:

| Address of Multiplier | Term | |
|---|---|---|
| (dx/ds s2) | $3*D11*t^3 + 3*D12*t^2 + 3*D13*t + 3*D14$ | |
| (dx/ds s1) | $2*D21*t^3 + 2*D22*t^2 + 2*D23*t$ | (20) |
| | $+ 2*D24$ | |
| (dx/ds s0) | $D31*t^3 + D32*t^2 + D33*t + D34$ | |
| (dx/dt s3) | $3*D11*t^2 + 2*D12*t + D13$ | |
| (dx/dt s2) | $3*D31*t^2 + 2*D22*t + D23$ | (21) |
| (dx/dt s1) | $3*D31*t^2 + 2*D32*t + D33$ | |
| (dx/dt s0) | $3*D41*t^2 + 2*D42*t + D43$ | |

The method and apparatus 21 of the present invention obtain these multipliers as described in greater detail with respect to Process 2 below.

The equations (18) and (19) for the partial derivative coordinates can be expressed in their fully factored form in terms of the multipliers in (20) and (21) as follows:

$$dx/ds \,(s,t) = (dx/ds \; s2)*s^2 + (dx/ds \; s1)*s + (dx/ds \; s0) \quad (22)$$

$$dx/dt \,(s,t) = (dx/dt \; s3)*s^3 + (dx/dt \; s2)*s^2 + (dx/dt \; s1)*s + (dx/dt \; s0) \quad (23)$$

The partial derivative coordinates (equations (22) and (23)) are thus expressed in terms of the single variable ("s").

The same factoring and calculation is performed for the coordinates y and z with their corresponding coefficient matrices to obtain equations equivalent to equations (22) and (23) for the partial derivatives of such coordinates with respect to "s" and "t".

POINT NORMAL VECTORS

To enable the point normal to be obtained for a given vertex 9, a value of "s" is substituted into each such partial derivative equation (22) and (23) to obtain the values of the partial derivatives of x with respect to "s" and "t" for that value of "s". "s" is incremented once for each vertex 9 that has a given vertex row address and the calculations are repeated to obtain all of the values of the partial derivatives of x with respect to "s" and "t" for that given vertex row address.

Similarly, a value of "s" is substituted into each such partial derivative equation (22) and (23) corresponding to the y coordinate to obtain the values of the partial derivatives of y with respect to "s" and "t" for that value of "s". "s" is incremented once for each vertex 9 that has that given vertex row address and the calculations are repeated to obtain all of the values of the partial derivatives of y with respect to "s" and "t" for that given row address.

Similarly, a value of "s" is substituted into each such partial derivative equation (22) and (23) corresponding to the coordinate to obtain the values of the partial derivatives of z with respect to "s" and "t" for that value of "s". "s" is incremented once for each vertex 9 that has that given vertex row address and the calculations are repeated to obtain all of the values of the partial derivatives of z with respect to "s" and "t" for that given vertex row address.

This results in values for the various partial derivatives of each coordinate x, y, and z with respect to "s" and "t", which are necessary for computing the cross product vectors for the various vertices 9 having that given vertex row address. In the example shown, the cross product for the x coordinate of the point normal vector for the V1 vertex 9 is then obtained. Next, the cross product for the y coordinate of the point normal vector for the V1 vertex 9 is obtained, whereafter the cross product for the z coordinate of the point normal vector for the V1 vertex 9 is obtained. This process is repeated for all of the vertices V2 through Vn having that given vertex row address, where Vn in FIGS. 2 and 3 is 21 for vertex row address 0.

When the x, y, and z coordinates of the point normal vector have been obtained for each vertex 9 having that given vertex row address, the processing of the point normal vectors for that given vertex row address is complete. The other variable "t" is then incremented, "s" is set to "0" and then "s" is incremented to obtain values of the coordinates x, y, and z of the vertices 9 and of the corresponding point normals for the next vertex row address 1 that corresponds to the vertex row 14.

VERTEX COORDINATE AND POINT NORMAL VECTOR PROCESSING

In greater detail, the process of calculating values of the coordinates x, y, and z of the vertices 9 and the point normal vectors of the two row vertex addresses 0 and 1 corresponding to the vertex rows 12 and 14 is as follows. One coordinate of a vertex 9 and a partial derivative with respect to "s" and also with respect to "t" for the coordinate of that vertex 9 is calculated at a time. The x coordinate is described below, it being understood that the calculations of the y and z coordinates are similar. Equation (1) for generating the x coordinate of the point is as follows:

$$x(s,t) = D11*s^3*t^3 + D12*s^3*t^2 + D13*s^3*t + D14*s^3 + D21*s^2*t^3 + D22*s^2*t^2 + D23*s^2*t + D24*s^2 + D31*s*t^3 + D42*t^2 + D43*t + D41 \quad (1)$$

As described above, equation (1) is factored for use with the minimum set of vertices 9 defined by vertex row addresses 0 and 1 and appears as equation (11) as follows:

$$x(s,t) = s^3(s3) + s^2(s2) + s(s1) + s0. \quad (11)$$

Also having the partial derivative coordinate equations in factored form (equations (22) and (23) above), the generation of the vertices 9 for the first two vertex row addresses 0 and 1 and the point normal vectors corresponding to such vertices 9 proceeds by setting "t" to 0. Next, s3, s2, s1, and s0 are calculated and stored. Then the multipliers (dx/ds s2), (dx/ds s1), (dx/ds s0), (dx/dt s3), (dx/dt s2), (dx/dt s1), and (dx/dt s0) are computed and stored. Next "s" is set to 0. The x coordinate of the V1 vertex 9 (0,0) is calculated as follows:

$$\text{vertex } (s,t)x = (s3*s^3) + (s2*s^2) + (s1*s) + s0 \quad (24)$$

The partial derivatives for the vertex V1 (0,0) are computed as follows:

$$dx/ds(s,t) = [(dx/ds\ s2)*s^2] + [(dx/ds\ s1)*s] + (dx/ds\ s0) \quad (25)$$

$$dx/dt(s,t) = [(dx/dt\ s3)*s^3] + [(dx/dt\ s2)*s^2] + [(dx/dt\ s1)*s] + (dx/dt\ s0) \quad (26)$$

To continue obtaining values for the x coordinate for the first vertex row address 0, "s" is incremented by "s" step size and the above computations for x point coordinate and x partial derivatives are repeated. This continues, with "s" being incremented each time by "s" step size until "s" is greater than one. Then "s" is set back to 0 and the process is repeated to obtain the y point coordinate and y partial derivatives. The same is then done for the z coordinate.

When the 0 vertex row address of vertices 9 and partial derivatives has been completed, the cross-product of the "s" and "t" partial derivatives is computed as described above and is stored as point normal vectors. "t" is then incremented by "t" step size, "s" is set back to 0, and the above steps are repeated for the vertices 9 and point normal vectors of the vertex row address 1 that corresponds to the vertex row 14.

The steps in Process 2 can thus be summarized as follows:

PROCESS 2
Obtain Values for Vertex Coordinates x, y, and z
of Vertex Row Addresses 0 and 1 and
Corresponding Point Normal Vectors

| Step # | Step |
|---|---|
| 2.0 | For TCNTR = 0 and t step size do: |
| | 2.0.1 for x, y, and z, do: |
| |     2.0.1.1 calculate multipliers for partial derivatives with respect to "s" coordinates; |
| |     2.0.1.2 calculate multipliers for partial derivatives with respect to "t" coordinates, |
| |     2.0.1.3 calculate multiplies for point coordinates. |
| |     2.0.1.4 For column = 0 to 100 by "s" step size, do: |
| |         2.0.1.4.1 calculate point coordinate, |
| |         2.0.1.4.2 calculate partial derivative with respect to "s" coordinate. |
| |         2.0.1.4.3 calculate partial derivative with respect to "t" coordinates. |
| |     End for column = 0 to 100 by "s" step size. |
| | End for x, y, and z. |
| | 2.0.2 For column = to 100 by "s" step size, do: |
| |     2.0.2.1 cross partial derivative coordinates to get point normal vector. |
| | End for column = 0 to 100 by "s" step size. |
| | 2.0.3 Toggle row F/F. |
| | End for TCNTR = 0 and "t" step size. |
| 2.1 | Set TCNTR to "t" step size times 2. TCNTR is the value of t that will be used to calculate the next vertex row address. |

Having obtained the values for the vertex coordinates of x, y, and z for each vertex 9 of vertex rows 12 and 14 and having obtained the point normal vector for each such vertex 9, that data is further processed to form the triangular polygons 15 so that all of the vertices 9 in a polygon 15 will be coplanar (see Process 4 below). Before a group of vertices 9 is output as a given polygon 15, the data representing the values of the x, y, and z coordinates of each vertex 9 of the polygon 15 and the point normal vector for each such vertex 9 is processed further. Initially, this involves transformation of the vertex coordinates from the object space coordinate system. Also, the point intensity is obtained for each such vertex 9 using the previously calculated point normal vector (see Process 3 below).

POINT INTENSITY PROCESSING

In regard to obtaining the point intensity, it should be understood that all of the vertices 9 that are calculated in Process 2 are in what is referred to as the world or object space coordinate system. That is, the object space coordinate system is used to define the object. On the other hand, the sun or source of light is specified by the user in terms of a 3D screen coordinate system, since the screen coordinate system is the one used by the user. The sun always points to the origin of the screen coordinate system, but the user can specify where the sun is shining from in terms of the x, y, and z coordinates of the screen (not shown). Since the screen coordinate system is not the same as the object coordinate system, the sun coordinates must be transformed into object space so that both the object and the sun are represented in the same coordinate system in order to obtain the point intensity. An inverse matrix is used to effect this transformation of the "sun screen space" to the "sun object space". The transformed sun in the object space coordinate system is referred to as the "sun object space" and has x, y, and z coordinates. The processing of the intensity of each vertex 9 uses a point intensity equation and results in specifying the point intensity at that particular vertex 9.

In particular, the vector for the sun screen space is referred to as the "sun screen space vector". The sun screen space vector has x, y, and z coordinates and is input in IEEE floating point format as follows:

sun screen space x ms
sun screen space x ls
sun screen space y ms
sun screen space y ls
sun screen space z ms
sun screen space z ls.

The sun screen space vector is transformed to a sun vector in the object space coordinate system, referred to as the "sun object space vector". This is done by obtaining the inverse of the transformation matrix. The inverse of a matrix is obtained by first representing the matrix as follows:

$$\begin{bmatrix} A11 & A12 & A13 & A14 \\ A21 & A22 & A23 & A24 \\ A31 & A32 & A33 & A34 \\ A41 & A42 & A43 & A44 \end{bmatrix} \begin{vmatrix} 1 & 0 & 0 & 0 \\ 0 & 1 & 0 & 0 \\ 0 & 0 & 1 & 0 \\ 0 & 0 & 0 & 1 \end{vmatrix} \quad (27)$$

Once in this form, a series of elementary row transformations is performed. The legal elementary row transformations are to interchange any two rows, to add some number times one row to any other row, and to multiply any row by some number. These row transformations are performed until the matrices (27) are as follows:

$$\begin{bmatrix} 1 & 0 & 0 & 0 \\ 0 & 1 & 0 & 0 \\ 0 & 0 & 1 & 0 \\ 0 & 0 & 0 & 1 \end{bmatrix} \begin{vmatrix} I11 & I12 & I13 & I14 \\ I21 & I22 & I23 & I24 \\ I31 & I32 & I33 & I34 \\ I41 & I42 & I43 & I44 \end{vmatrix} \quad (28)$$

The inverse matrix is the I matrix on the right of the matrices shown in (28).

The sun object space vector (x,y,z) is calculated as follows:

$$\begin{aligned} \text{sun object space } x &= I11 * \text{sun screen space } x + \\ & I21 * \text{sun screen space } y + \\ & I31 * \text{sun screen space } z \\ \text{sun object space } y &= I12 * \text{sun screen space } x + \\ & I22 * \text{sun screen space } y + \\ & I32 * \text{sun screen space } z \\ \text{sun object space } z &= I13 * \text{sun screen space } x + \\ & I23 * \text{sun screen space } y + \\ & I33 * \text{sun screen space } z \end{aligned} \quad (29)$$

The sun object space distance squared that is used in the point intensity calculation is calculated as follows:

$$\begin{aligned} \text{sun object space distance squared} = & \\ \text{sun object space } x & * \text{sun object space } x + \\ \text{sun object space } y & * \text{sun object space } y + \\ \text{sun object space } z & * \text{sun object space } z \end{aligned} \quad (30)$$

The point intensity of each vertex 9 is computed from the sun object space vector and the point normal vector of the vertex 9. The point normal vectors are not unit vectors, therefore their distance must be found. Since calculating distance requires a square root calculation, to avoid taking square roots, the distance found is the point normal distance squared. The point normal distance squared is computed for a vertex 9 as follows:

$$\begin{aligned} \text{point normal distance squared} = & \\ \text{point normal } x & * \text{point normal } x + \\ \text{point normal } y & * \text{point normal } y + \\ \text{point normal } z & * \text{point normal } z \end{aligned} \quad (31)$$

Point intensity dot is calculated for a vertex 9 as follows:

$$\begin{aligned} \text{point intensity dot} = & \\ \text{point normal } x & * \text{sun object space } x - \\ \text{point normal } y & * \text{sun object space } y + \\ \text{point normal } z & * \text{sun object space } z \end{aligned} \quad (32)$$

Since the point normal distance is squared, the point intensity dot is also squared. Before squaring it however, its sign is saved. Now the point intensity can be calculated as follows:

$$\text{point intensity} = \frac{\text{point intensity dot squared}}{\text{point normal distance squared} * \text{sun object space distance squared}} \quad (33)$$

where sun object space distance squared is that which was identified as equation (30).

TRANSFORMATION OF VERTEX COORDINATES

As indicated above, the values of all of the vertices 9 that are calculated in Process 2 are in the object space coordinate system. Since the vertices are to be displayed in the screen coordinate system, the x, y, and z coordinates for each vertex are transformed by a standard transformation matrix, as appropriate. This is referred to below in connection with Process 3 which both transforms (step 3.6) the x, y, and z coordinates of a given vertex 9 into the screen coordinate system and calculates (steps 3.1–3.5) the point intensity for each vertex 9 according to the method described above.

The above determination of point intensity and the transformation of the x, y, and z coordinates of a given vertex 9 is summarized as follows:

| | PROCESS 3 Obtain Point Intensities and Transform Vertices |
|---|---|
| Step # | Step |
| 3.0 | For each vertex, do: |
| 3.1 | Calculate point normal distance squared, |
| 3.2 | Dot point normal vector with sun object space vector to get point intensity dot. |
| 3.3 | Square point intensity dot saving its sign. |
| 3.4 | Set point intensity to point intensity dot squared divided by point normal distance squared times sun object space distance squared. |
| 3.5 | Set ms bit of point intensity to its saved sign bit. |
| 3.6 | transform point using transformation matrix. |
| 3.7 | Output x, y and z and point intensity to storage for use in Process 4. |

SELECTING VERTICES TO FORM POLYGONS

Having described the transformation of each vertex 9 that has previously been calculated and having described the method of obtaining the point intensity for each such vertex 9, the following Process 4 is performed for selecting the particular vertices 9 (e.g. V1, V2, and V3) that form a given triangular polygon 15 (e.g. P1 in FIG. 1). As each such vertex 9 for a given triangular polygon 15 is selected in Process 4, the above transformation and calculation of point intensity is performed by Process 3 for each such vertex 9. The vertices 9 thus processed are output as a group.

The method of defining the triangular polygons is summarized as follows:

| | PROCESS 4 Obtain Polygons For Polygon Row 0 | |
|---|---|---|
| Step # | | Step |
| START: | 4.1 | Get 1st x, y, z, I and store. |
| | 4.2 | Get 2nd x, y, z, I and store. |
| | 4.3 | Get 3rd x, y, z, I and store. |
| | 4.4 | Output polygon made up of stored 4.1–4.3 |
| LOOP: | 4.5 | If input is a command STOP. |
| | 4.6 | Get next x, y, z, I and store in 4.1. |
| | 4.7 | Output next polygon made up of 4.1–4.3 |
| | 4.8 | If input is a command STOP. |
| | 4.9 | Get next x, y, z, I and store in 4.2. |
| | 4.10 | Output next polygon made up of 4.1–4.3. |
| | 4.11 | If input is a command STOP. |
| | 4.12 | Get next x, y, z, I and store in 4.3. |
| | 4.13 | Output next polygon made up of 4.1–4.3. |
| | 4.14 | Go to LOOP. |

In Process 4, "Get" means get from Process 3 output. The "1st", "2nd", and "3rd" x, y, and z are the values of the x, y, and z coordinates of the respective V1, V2, and V3 vertices 9. "I" in Process 4 is the point intensity of each such given V1, V2 and V3 vertex 9.

Referring in particular to Process 4 and to FIGS. 1–3, triangular polygons 15 are processed across one polygon row at a time, e.g. across the polygon row 18, where the polygon row 18 is formed by the two vertex rows 12 and 14. For example, the first P1 polygon 15 processed for the polygon row 18 is made up of the V1, V2, and V3 vertices 9 obtained using respective "s", "t" values of (0,0), (0.1,0), and (0,0.2). All other polygons 15 on the polygon row 18 only need one additional vertex 9 to define the next triangular polygon 15. In this example, the next or P2 polygon 15 processed is formed using respective "s", "t" values of (0,0.2), (0.1,0), and (0.1,0.2) substituted into equation (11). The first or P2-1 vertex 9 of the P2 polygon 15 is the same as the third or P1-3 vertex 9 of the first or P1 polygon 15. The second or P1-2 and P2-2 vertices 9 of both of the P1 and P2 polygons 15 are the same V2 vertex 9. Therefore, it is only necessary to access one new vertex 9 having "s" and "t" values of (0.1,0.2) to obtain the third or P2-3 vertex 9 for the second or P2 polygon 15.

For the third or P3 polygon 15, the first or P3-1 vertex 9 is the V3 vertex 9, which was the P2-1 vertex 9 of the second or P2 polygon 15. The second or P3-2 vertex 9 using "s" and "t" values of (0.2,0) has to be accessed. The third or P3-3 vertex 9 is the V4 vertex 9, which was the third or P2-3 vertex 9 of the second or P2 polygon 15.

PROCESSING POLYGONS FOR A GIVEN POLYGON ROW

In greater detail and referring to FIGS. 2, 3 and 4B, steps 4.1–4.3 of the above method read intermediate vertex signals 30 (FIG. 4B) that represent the x, y, and z coordinates and the point intensity of the pair 25 of first and second V1 and V3 vertices 9 in the first vertex row 12 and of the first or V2 vertex 9 in the second vertex row 14. These intermediate vertex signals 30 are stored at locations identified as 4.1, 4.2, and 4.3, respectively.

Step 4.4 identifies these three intermediate vertex signals 30 as representing the first or P1 polygon 15. The signals 30 are serially read from the storage locations 4.1–4.3 and are output as the vertex signals 10 representing the P1 polygon 15.

The method then moves to a loop that includes step 4.5. If step 4.5 is not a "command", step 4.6 is performed by reading the intermediate vertex signals 30 (FIG. 4B) that represent the coordinates x, y, and z and the point intensity of the next or V4 vertex 9, which is the next vertex 9 in the vertex row 14 diagonally opposite to the V1 vertex 9. The intermediate vertex signal 30 representing the V4 vertex 9 is read into storage location 4.1 in place of the intermediate vertex signal 30 representing the V1 vertex 9. At this time, storage locations 4.1–4.3 store signals 30 representing the second or P2 polygon 15. In step 4.7 those intermediate vertex signals 30 are identified as representing the second or P2 polygon 15. The intermediate vertex signals 30 are serially read from storage and are output as the vertex signals 10 representing the P2 polygon 15.

If the next input is not a "command" (step 4.8), the next step is performed by reading the next intermediate vertex signals 30 which represent the coordinates x, y, and z and the point intensity of the V5 vertex 9, which is the next vertex 9 in vertex row 12. The signals 30 for the V5 vertex 9 are read into storage location 4.2 in place of the signals 30 representing the V2 vertex 9. Storage locations 4.1–4.3 at this time store signals 30 representing the V3, V4, and V5 vertices 9 which represent the third or P3 polygon 15. The signals 30 are serially read from storage and are output as the vertex signals 10 representing the P3 polygon 15.

If the next input is not a "command" (step 4.11), step 4.12 is performed by reading the next intermediate vertex signal 30, which represent the coordinates x, y and z and the point intensity of the V6 vertex 9, which is the next vertex 9 in the vertex row 14. The intermediate vertex signals 30 for the V6 vertex 9 are read into storage location 4.3 in place of the intermediate vertex signals 30 for the V3 vertex 9. Storage locations 4.1–4.3 at this time store intermediate vertex signals 30 representing a fourth or P4 polygon 15. In step 4.13 those intermediate vertex signals 30 are serially read to identify them as representing the fourth or P4 polygon 15 and are output as the vertex signals 10 representing the P4 polygon 15.

Step 4.14 returns the method to LOOP, which starts at step 4.5. The cycle continues until both of the last (right hand) vertices 9 having the respective vertex rows 0 and 1 have been processed into polygons 15. In the example shown in FIG. 3, these are the V21 vertices 9 in the vertex row 12 and the V22 vertex 9 in the vertex row 14. The processing of the last or Pn polygon 15 (shown as P20) in the polygon row 18 causes a "command" to be input in the next one of the steps 4.5, 4.8, and 4.11, which stops the polygon processing.

TRANSITION TO NEXT VERTEX ROW AND NEXT POLYGON ROW

At this juncture, vertex signals 10 representing the P1–P20 polygons 15 defined by the first polygon row 18 have been output as a group, with each vertex 9 of the polygon 15 specified by x, y and z coordinates transformed into the screen space coordinate system. Each vertex 9 also has a point intensity value. The next step is to obtain the values of the x, y and z coordinates and the point normals for each vertex 9 in the third vertex row 19. This requires incrementing "t" by "t" step size and performing Process 2 again starting with step 2.0.1. Then, as described above, Processes 3 and 4 are performed so that vertex signals 10 representing the values of the transformed x, y and z coordinates for each vertex 9 in the polygon row 20 and the point intensity for such vertices 9 are output to define the polygons 15 of the polygon row 20. In the example shown in FIG. 2, this involves outputting the vertex signals 10 representing polygons P21 through P40.

Similarly, referring to FIG. 1 it can be understood that at the end of such processing of each polygon row, such as 20, the next vertex row, such as 31, and then the next polygon row, such as 32, are processed. This sequence is performed until the vertex signals 10 representing the polygons 15 of the fourth polygon row 33 and then the last polygon row 34 have been output.

DETAILED DESCRIPTION OF CONTROL APPARATUS

Referring now to FIGS. 4A, 4B, and 5 of the drawings, the methods of the preferred embodiment of the present invention may be performed by the preferred embodiment of the apparatus 21 of the present invention. The operation of the apparatus 21 is controlled by a control register 35 of the control circuit 23. The control register 35 is connected to a writable control store (WCS) 36 that stores various computer programs in the form of microcode. The control register 35 controls the selection of words or commands from the WCS 36 in conjunction with a next address register 37 and a this address register 38.

In response to a reset command, the address in the this address register 38 is reset to 0. This causes the WCS 36 to output an instruction signal 39 representing an instruction ("instruction 0") that is at address 0 into the control register 35. At the next clock cycle, the signal 39 for the instruction 0 is sent to the apparatus 21 shown in FIGS. 4A and 4B. Also, a signal 40 representing the next address associated with the instruction 0 is shifted into the this address register 38. In the same cycle, a new this address signal 41 also addresses the WCS 36. At the next cycle, the WCS 36 outputs to the control register 35 an instruction signal 39 associated with the next address, such that on the next cycle the instruction signal 39 corresponding to the next address will be output to the apparatus 21. As the cycling continues, this operation continues by successively outputting the instruction signals 39 from the WCS 36 to the control register 35 to the apparatus 21. Also, to take into consideration events that should modify the next address, a branch logic circuit 42 is connected to enable modification of the next address signal 40 of each instruction based upon the occurrence of a condition, such as a flag or processor register reaching 0. The branch logic circuit 42 outputs a modify signal 43 that modifies the next address signal 40 that is transferred to the this address register 38. As a result, the WCS 36 outputs the instruction signal 39 that corresponds to the modified next address. An example of this is discussed later in connection with the processing of the P21 and P22 polygons 15 from the respective third and second vertex rows 19 and 14. In that case, the need for the modified addresses results from the fact that the data for the V24, V26, etc. vertices 9 of the vertex row 19 are written into vertex row 0 storage, such that the selection of the V24, V26 ... V44 vertices 9 to form the P21, P22 ... P40 polygons 15 has to be reversed.

In addition, a flag register 44 is provided for setting various flags for various conditions. The flag register 44 is connected to a flag store RAM 45 that stores flag signals 46 representing the flags for access during processing to indicate how certain operations are to be performed.

Also provided is a loop counter 47 of the counter circuit 26 that can be set to an initial value and then decremented each time an event occurs. The loop counter 47 outputs a signal 47' when it decrements to 0. For example, it will input the signal 47' to the branch logic circuit 42 which, if programmed to perform this function, will modify the next address signal 40 to access an appropriate next instruction.

A push/pop stack RAM 48 is used in conjunction with a subroutine that is called by the control register 35. The push/pop stack RAM 48 stores the particular next address that follows the subroutine. The stack RAM 48 outputs the next address signal 40 to the WCS 36 to cause it to output to the control register 35 the instruction signal 39 that corresponds to that next address. This is done because a particular subroutine may be called at different times during the various operations, such that there is no particular next address associated with a given subroutine.

Also, with respect to the next address following a particular subroutine, a conditional pop-logic circuit 49 is connected to both the push/pop stack RAM 48 and to the branch logic circuit 42. In this case, the use of the instruction at the next address in the push/pop stack RAM 48 is conditional upon an event happening, which event controls the conditional pop-logic circuit 49. If the event occurs, the conditional pop-logic circuit 49 outputs a signal 50 to instruct the push/pop stack RAM 48 to output its next address signal 40 to the WCS 36, which then outputs the instruction signal 39 corresponding to that next address. If the event does not occur, then the conditional pop-logic circuit 49 does not permit the next address to be read from the push/pop stack RAM 48. Instead, a second signal 51 from the conditional pop-logic circuit 49 is applied to the branch logic circuit 42 to modify the next address signal 40 that is transferred to the this address register 38. The instruction signal 39 corresponding to that modified next address is then output from the WCS 36 to the control register 35.

DETAILED DESCRIPTION OF COMPUTATION APPARATUS

Referring now in detail to FIGS. 4A and 4B, the portions of the apparatus 21 for arithmetic computation and data storage are shown. The operation of the apparatus 21 of the present invention to perform the method of the present invention is described in terms of the various Steps of Processes 1.0 through 4.0, where the computational operations required to perform a Step are described in the following Charts. Each such Chart has columns, in which a first column heading indicates the computational or machine cycle in which a particular operation is performed. This is indicated by the heading "Cycle". In general, when data is input, 10 cycles occur before an output is obtained. The description of such Charts includes where data is stored, such as in a matrix Ram 52 (FIG. 4A). Similarly, data is stored in a translate RAM 53 and in a pipeline RAM section 56 of the RAM circuit 22. Data is also stored in a Reciprocal PROM 59 and in a y register 60 (FIG. 4A) associated with a processor 61. Data is also stored in the font RAM 22 and certain data from a data field (not shown) or from a FIFO register 63 is input directly to an F BUS 64, which can be connected to a Y BUS 65 and a C BUS 66.

The other column headings indicate what data is input to and output from certain other circuit elements shown in FIGS. 4A, 4B, and 5. Still referring to FIGS. 4A and 4B and to such Charts, respective A and B inputs 67 and 68 to a floating point multiplier 69 are labeled "FPM A IN" and "FPM B IN" and a C output 70 of the floating point multiplier 69 is labeled "FPM C OUT". Similarly, a floating point adder 71 has an A input 72 identified as "FPA A IN" and a corresponding B input 73 is identified as "FPA B IN". A C output 74 of the floating point adder 71 is identified as "FPA C OUT". An A REG 1 register 75 is connected to the C output 74 of the floating point adder 71 and is referred to as "A REG 1" 75. An A REG 2 register 76 is connected to the A REG 1 75, an an A REG 3 register 77 is connected to the A REG 2 register 76.

The data section 55 of the matrix RAM 52 can store sixteen 4×4 matrices. In the present invention, four matrices are stored in the section 55, the x coefficient matrix, the y coefficient matrix, the z coefficient matrix and the transformation matrix. For each matrix, the data section 55 has a storage location for each ms and ls word of the sixteen elements of the given matrix. Thus, referring to the basic matrix arrangement in (3), there is an individual storage location for each ms and ls word of element 11, 12, 13, 14, etc. If new data, such as new element 11, is written into the location 11 of the matrix RAM 52 it will overwrite the previous data at location 11. Thus, before new data is written to a particular location, the current data must have been fully processed or written into a register.

The apparatus 21 also includes a PROM 78 connected to a sign generate circuit 79. An integer to floating point circuit 80 is also connected to the Y register 60.

A second FIFO register 81 (FIG. 4B) is provided for storing the vertex signals 10 before they are selected to define the polygons 15 and output at a terminal 82.

OPERATION

In the use of the present invention, a particular parametric form for cubic order surfaces is selected for defining the surface of an object to be displayed (see Equation (1)). The coefficient matrix (8) for the selected surfaces is obtained using Process 1. It will be recalled that Process Step 1.2 called for concatenating the magic matrix (5) with the input x coefficient matrix (4).

OPERATION—PROCESS STEP 1.2 CONCATENATE MAGIC MATRIX (5) WITH INPUT X COEFFICIENT MATRIX (4)

Referring to FIGS. 4A and 4B, Step 1.2 is performed by loading certain of the elements B of the input x coefficient matrix (4) into the matrix RAM 52. This is described with respect to the following Charts 1A through 1L.

| | CHART 1A Process step 1.2 | | |
|---|---|---|---|
| Cycle | FPM A IN | FPM B IN | FPM C OUT |
| 1 | B14 ms | 2 ms | |
| 2 | B14 ls | 2 ls | |
| 3 | B13 ms | 2 ms | |
| 4 | B13 ls | 2 ls | |
| 5 | B12 ms | 2 ms | |
| 6 | B12 ls | 2 ls | |
| 7 | B11 ms | 2 ms | |
| 8 | B11 ls | 2 ls | |
| 9 | | | |
| 10 | | | |
| 11 | B24 ms | −2 ms | 2*B14 ms |
| 12 | B24 ls | −2 ls | 2*B14 ls |
| 13 | B23 ms | −2 ms | 2*B13 ms |
| 14 | B23 ls | −2 ls | 2*B13 ls |
| 15 | B22 ms | −2 ms | 2*B12 ms |
| 16 | B22 ls | −2 ls | 2*B12 ls |
| 17 | B21 ms | −2 ms | 2*B11 ms |
| 18 | B21 ls | −2 ls | 2*B11 ls |
| 19 | | | |
| 20 | | | |
| 21 | | | −2*B24 ms |
| 22 | | | −2*B24 ls |
| 23 | | | −2*B23 ms |
| 24 | | | −2*B23 ls |
| 25 | | | −2*B22 ms |
| 26 | | | −2*B22 ls |
| 27 | | | −2*B21 ms |
| 28 | | | −2*B21 ls |
| 29 | | | |
| 30 | | | |
| 31 | B34 ms | −2 ms | |

CHART 1B
Process Step 1.2

| Cycle | FPA A IN | FPA B IN | FPA C OUT |
|---|---|---|---|
| 1 | | | |
| 2 | | | |
| 3 | | | |
| 4 | | | |
| 5 | | | |
| 6 | | | |
| 7 | | | |
| 8 | | | |
| 9 | | | |
| 10 | | | |
| 11 | B44 ms | FPM OUT | |
| 12 | B44 ls | FPM OUT | |
| 13 | B43 ms | FPM OUT | |
| 14 | B43 ls | FPM OUT | |
| 15 | B42 ms | FPM OUT | |
| 16 | B42 ls | FPM OUT | |
| 17 | B41 ms | FPM OUT | |
| 18 | B41 ls | FPM OUT | |
| 19 | | | |
| 20 | | | |
| 21 | FPA OUT | FPM OUT | 2*B14 + B44 ms |
| 22 | FPA OUT | FPM OUT | 2*B14 + B44 ls |
| 23 | FPA OUT | FPM OUT | 2*B13 + B43 ms |
| 24 | FPA OUT | FPM OUT | 2*B13 + B43 ls |
| 25 | FPA OUT | FPM OUT | 2*B12 + B42 ms |
| 26 | FPA OUT | FPM OUT | 2*B12 + B42 ls |
| 27 | FPA OUT | FPM OUT | 2*B11 + B41 ms |
| 28 | FPA OUT | FPM OUT | 2*B11 + B41 ls |
| 29 | | | |
| 30 | | | |
| 31 | FPA OUT | B34 ms | 2*B14 − 2*B24 + B44ms |

CHART 1C
Process Step 1.2

| Cycle | FPM A IN | FPM B IN | FPM C OUT |
|---|---|---|---|
| 32 | B34 ls | −2 ls | |
| 33 | B33 ms | −2 ms | |
| 34 | B33 ls | −2 ls | |
| 35 | B32 ms | −2 ms | |
| 36 | B32 ls | −2 ls | |
| 37 | B31 ms | −2 ms | |
| 38 | B31 ls | −2 ls | |
| 39 | | | |
| 40 | | | |
| 41 | B24 ms | 3 ms | −2*B34 ms |
| 42 | B24 ls | 3 ls | −2*B34 ls |
| 43 | B23 ms | 3 ms | −2*B33 ms |
| 44 | B23 ls | 3 ls | −2*B33 ls |
| 45 | B22 ms | 3 ms | −2*B32 ms |
| 46 | B22 ls | 3 ls | −2*B32 ls |
| 47 | B21 ms | 3 ms | −2*B31 ms |
| 48 | B21 ls | 3 ls | −2*B31 ls |
| 49 | | | |
| 50 | | | |
| 51 | B14 ms | −3 ms | 3*B24 ms |
| 52 | B14 ls | −3 ls | 3*B24 ls |
| 53 | B13 ms | −3 ms | 3*B23 ms |
| 54 | B13 ls | −3 ls | 3*B23 ls |
| 55 | B12 ms | −3 ms | 3*B22 ms |
| 56 | B12 ls | −3 ls | 3*B22 ls |
| 57 | B11 ms | −3 ms | 3*B21 ms |
| 58 | B11 ls | −3 ls | 3*B21 ls |
| 59 | | | |
| 60 | | | |
| 61 | | | −3*B14 ms |
| 62 | | | −3*B14 ls |

CHART 1D
Process Step 1.2

| Cycle | FPA A IN | FPA B IN | FPA C OUT | |
|---|---|---|---|---|
| 32 | FPA OUT | B34 ls | 2*B14 | −2*B24 + B44 ls |
| 33 | FPA OUT | B33 ms | 2*B13 | −2*B23 + B43 ms |
| 34 | FPA OUT | B33 ls | 2*B13 | −2*B23 + B43 ls |
| 35 | FPA OUT | B32 ms | 2*B12 | −2*B22 + B42 ms |
| 36 | FPA OUT | B32 ls | 2*B12 | −2*B22 + B42 ls |
| 37 | FPA OUT | B31 ms | 2*B11 | −2*B21 + B41 ms |
| 38 | FPA OUT | B31 ls | 2*B11 | −2*B21 + B41 ls |
| 39 | | | | |
| 40 | | | | |
| 41 | B44 ms | FPM OUT | C14 ms | |
| 42 | B44 ls | FPM OUT | C14 ls | |
| 43 | B43 ms | FPM OUT | C13 ls | |
| 44 | B43 ls | FPM OUT | C13 ls | |
| 45 | B42 ms | FPM OUT | C12 ms | |
| 46 | B42 ls | FPM OUT | C12 ls | |
| 47 | B41 ms | FPM OUT | C11 ms | |
| 48 | B41 ls | FPM OUT | C11 ls | |
| 49 | | | | |
| 50 | | | | |
| 51 | FPA OUT | FPM OUT | −2*B34 | −B44 ms |
| 52 | FPA OUT | FPM OUT | −2*B34 | −B44 ls |
| 53 | FPA OUT | FPM OUT | −2*B33 | −B43 ms |
| 54 | FPA OUT | FPM OUT | −2*B33 | −B43 ls |
| 55 | FPA OUT | FPM OUT | −2*B32 | −B42 ms |
| 56 | FPA OUT | FPM OUT | −2*B32 | −B42 ls |
| 57 | FPA OUT | FPM OUT | −2*B31 | −B41 ms |
| 58 | FPA OUT | FPM OUT | −2*B31 | −B41 ls |
| 59 | | | | |
| 60 | | | | |
| 61 | FPA OUT | FPM OUT | 3*B24 | −2*B34 − B44 ms |
| 62 | FPA OUT | FPM OUT | 3*B24 | −2*B34 − B44 ls |

CHART 1E
PROCESS STEP 1.2

| CYCLE | FPM A IN | FPM B IN | FPM C OUT |
|---|---|---|---|
| 63 | | | −3*B13 ms |
| 64 | | | −3*B13 ls |
| 65 | | | −3*B12 ms |
| 66 | | | −3*B12 ls |
| 67 | | | −3*B11 ms |
| 68 | | | −3*B11 ls |
| 69 | | −2 ms | |
| 70 | | −2 ls | |
| 71 | | −2 ms | |
| 72 | | −2 ls | |
| 73 | | −2 ms | |
| 74 | | −2 ls | |
| 75 | FPA OUT | −2 ms | |
| 76 | FPA OUT | −2 ls | |
| 77 | | | |
| 78 | | | |
| 79 | C23 ms | −2 ms | |
| 80 | C23 ls | −2 ls | |
| 81 | | 2 ms | |
| 82 | | 2 ls | |
| 83 | C11 ms | 2 ms | |
| 84 | C11 ls | 2 ls | |
| 85 | C21 ms | 2 ms | −2*C22 ms |
| 86 | C21 ls | 2 ls | −2*C22 ls |
| 87 | C22 ms | 3 ms | |
| 88 | C22 ls | 3 ls | |
| 89 | | | −2*C23 ms |
| 90 | | | −2*C23 ls |
| 91 | C12 ms | 3 ms | |
| 92 | C12 ls | 3 ls | |
| 93 | | | 2*C11 ms |

CHART 1F
PROCESS STEP 1.2

| Cycle | FPA A IN | FPA B IN | FPA C OUT |
|---|---|---|---|
| 63 | FPA OUT | FPM OUT | 3*B23 − 2*B33 − B43 ms |
| 64 | FPA OUT | FPM OUT | 3*B23 − 2*B33 − B43 ls |
| 65 | FPA OUT | FPM OUT | 3*B22 − 2*B32 − B42 ms |
| 66 | FPA OUT | FPM OUT | 3*B22 − 2*B32 − B42 ls |
| 67 | FPA OUT | FPM OUT | 3*B21 − 2*B31 − B41 ms |
| 68 | FPA OUT | FPM OUT | 3*B21 − 2*B31 − B41 ls |
| 69 | | | |
| 70 | | | |
| 71 | | FPA OUT | C24 ms |
| 72 | | FPA OUT | C24 ls |
| 73 | FPA OUT | | C23 ms |
| 74 | FPA OUT | | C23 ls |
| 75 | | | C22 ms |
| 76 | | | C22 ls |
| 77 | | | C21 ms |
| 78 | | | C21 ls |
| 79 | | | |
| 80 | | | |
| 81 | | | |
| 82 | | | |
| 83 | | FPA OUT | C23 ms + C24 ms |
| 84 | | FPA OUT | C23 ls + C24 ls |
| 85 | FPM OUT | | |
| 86 | FPM OUT | | |
| 87 | | | |
| 88 | | | |
| 89 | C24 ms | FPM OUT | |
| 90 | C24 ls | FPM OUT | |
| 91 | | | |
| 92 | | | |
| 93 | C14 ms | FPM OUT | |

CHART 1G
PROCESS STEP 1.2

| CYCLE | FPM A IN | FPM B IN | FPM C OUT |
|---|---|---|---|
| 94 | | | 2*C11 ls |
| 95 | C11 ms | 3 ms | 2*C21 ms |
| 96 | C11 ls | 3 ls | 2*C21 ls |
| 97 | C13 ms | −2 ms | 3*C22 ms |
| 98 | C13 ls | −2 ls | 3*C22 ls |
| 99 | C21 ms | −3 ms | |
| 100 | C21 ls | −3 ls | |
| 101 | | | 3*C12 ms |
| 102 | | | 3*C12 ls |
| 103 | | | |
| 104 | | | |
| 105 | C12 ms | −2 ms | 3*C11 ms |
| 106 | C12 ls | −2 ls | 3*C11 ls |
| 107 | | | −2*C13 ms |
| 108 | | | −2*C13 ls |
| 109 | C32 ms | −2 ms | −3*C21 ms |
| 110 | C32 ls | −2 ls | −3*C21 ls |
| 111 | C31 ms | −2 ms | |
| 112 | C31 ls | −2 ls | |
| 113 | C33 ms | −2 ms | |
| 114 | C33 ls | −2 ls | |
| 115 | | | −2*C12 ms |
| 116 | | | −2*C12 ls |
| 117 | | | |
| 118 | | | |
| 119 | | | −2*C32 ms |
| 120 | | | −2*C32 ls |
| 121 | | | −2*C31 ms |
| 122 | | | −2*C31 ls |
| 123 | | | −2*C33 ms |
| 124 | | | −2*C33 ls |

CHART 1H
PROCESS STEP 1.2

| CYCLE | FPA A IN | FPA B IN | FPA C OUT |
|---|---|---|---|
| 94 | C14 ls | FPM OUT | |
| 95 | FPA OUT | FPM OUT | −2*C22 + C23 + C24 ms |
| 96 | FPA OUT | FPM OUT | −2*C22 + C23 + C24 ls |
| 97 | | FPM OUT | |
| 98 | | FPM OUT | |
| 99 | FPA OUT | | −2*C23−C24 ms |
| 100 | FPA OUT | | −2*C23−C24 ls |
| 101 | C14 ms | FPM OUT | |
| 102 | C14 ls | FPM OUT | |
| 103 | FPA OUT | C13 ms | 2*C11 + C14 ms |
| 104 | FPA OUT | C13 ls | 2*C11 + C14 ls |
| 105 | | FPM OUT | D21 ms |
| 106 | | FPM OUT | D21 ls |
| 107 | FPM OUT | | |
| 108 | FPM OUT | | |
| 109 | FPA OUT | FPM OUT | 3*C22 − 2*C23 − C24 ms |
| 110 | FPA OUT | FPM OUT | 3*C22 − 2*C23 − C24 ls |
| 111 | | | 3*C12−C14 ms |
| 112 | | | *C12−C14 ls |
| 113 | | FPA OUT | 2*C11 + C13 + C14 ms |
| 114 | | FPA OUT | 2*C11 + C13 + C14 ls |
| 115 | FPM OUT | | |
| 116 | FPM OUT | | |
| 117 | A REG 2 | FPA OUT | −3*C11 − 2*C13 ms |
| 118 | A REG 2 | FPA OUT | −3*C11 − 2*C13 ls |
| 119 | C34 ms | FPM OUT | D22 ms |
| 120 | C34 ls | FPM OUT | D22 ls |
| 121 | C33 ms | FPM OUT | |
| 122 | C33 ls | FPM OUT | |
| 123 | C34 ms | FPM OUT | |
| 124 | C34 ls | FPM OUT | |

CHART 1I
PROCESS STEP 1.2

| CYCLE | FPM A IN | FPM B IN | FPM C OUT |
|---|---|---|---|
| 125 | C32 ms | 3 ms | |
| 126 | C32 ls | 3 ls | |
| 127 | C42 ms | 3 ms | |
| 128 | C42 ls | 3 ls | |
| 129 | | | |
| 130 | | | |
| 131 | | | |
| 132 | | | |
| 133 | | | |
| 134 | | | |
| 135 | C31 ms | −3 ms | 3*C32 ms |
| 136 | C31 ls | −3 ls | 3*C32 ls |
| 137 | | | 3*C42 ms |
| 138 | | | 3*C42 ls |
| 139 | C41 ms | −3 ms | |
| 140 | C41 ls | −3 ls | |
| 141 | C42 ms | 2 ms | |
| 142 | C42 ls | 2 ls | |
| 143 | C41 ms | 2 ms | |
| 144 | C41 ls | 2 ls | |
| 145 | | | −3*C31 ms |
| 146 | | | −3*C31 ls |
| 147 | | | |
| 148 | | | |
| 149 | C43 ms | −2 ms | −3*C41 ms |
| 150 | C43 ls | −2 ls | −3*C41 ls |
| 151 | | | 2*C42 ms |
| 152 | | | 2*C42 ls |
| 153 | | | 2*C41 ms |
| 154 | | | 2*C41 ls |

CHART 1 J
PROCESS STEP 1.2

| CYCLE | FPA A IN | FPA B IN | FPA C OUT |
|---|---|---|---|
| 125 | | | D11 ms |
| 126 | | | D11 ls |
| 127 | | | D12 ms |
| 128 | | | D12 ls |
| 129 | | FPA OUT | −2*C32 + C34 ms |
| 130 | | FPA OUT | −2*C32 + C34 ls |
| 131 | FPA OUT | | 2*C31 + C33 ms |
| 132 | FPA OUT | | 2*C31 + C33 ls |
| 133 | | | −2*C33−C34 ms |
| 134 | | | −2*C33−C34 ls |
| 135 | A REG 2 | FPM OUT | |
| 136 | A REG 2 | FPM OUT | |
| 137 | C44 ms | FPM OUT | |
| 138 | C44 ls | FPM OUT | |
| 139 | | | |
| 140 | | | |
| 141 | | | D 31 ms |
| 142 | | | D 31 ls |
| 143 | | | |
| 144 | | | |
| 145 | FPA OUT | FPM OUT | 3*C32 − 2*C33 − C34 ms |
| 146 | FPA OUT | FPM OUT | 3*C32 − 2*C33 − C34 ls |
| 147 | | | 3*C42−C44 ms |
| 148 | | | 3*C42−C44 ls |
| 149 | A REG 2 | FPM OUT | |
| 150 | A REG 2 | FPM OUT | |
| 151 | C44 ms | FPM OUT | |
| 152 | C44 ls | FPM OUT | |
| 153 | C43 ms | FPM OUT | |
| 154 | C43 ls | FPM OUT | |
| 155 | | | D 32 ms |

CHART 1 K
PROCESS STEP 1.2

| CYCLE | FPM A IN | FPM B IN | FPM C OUT |
|---|---|---|---|
| 156 | | | |
| 157 | | | |
| 158 | | | |
| 159 | | | −2*C43 ms |
| 160 | | | −2*C43 ls |

CHART 1 L
PROCESS STEP 1.2

| CYCLE | FPM A IN | FPM B IN | FPM C OUT |
|---|---|---|---|
| 156 | | | D 32 ls |
| 157 | | | |
| 158 | | | |
| 159 | FPA OUT | FPM OUT | −3*C41 + 3*C42 − C44 ms |
| 160 | FPA OUT | FPM OUT | −3*C41 + 3*C42 − C44 ls |
| 161 | | | −2*C42 + C44 ms |
| 162 | | | −2*C42 + C44 ls |
| 163 | A REG 2 | FPA OUT | 2*C41 + C43 ms |
| 164 | A REG 2 | FPA OUT | 2*C41 + C43 ls |
| 165 | | | |
| 166 | | | |
| 167 | | | |
| 168 | | | |
| 169 | | | D42 ms |
| 170 | | | D42 ls |
| 171 | | | |
| 172 | | | |
| 173 | | | D41 ms |
| 174 | | | D41 ls |
| 175 | | | D24 ms |
| 176 | | | D24 ls |

Referring to Charts 1A through 1L, in cycles 1 through 8, eight signals 83 representing the ms and ls words of the elements B14 through B11 of the input x coefficient matrix (4) are input from the matrix RAM 52 to the "FPM A IN" input 67. In the same cycles 1 through 8, signals 84 representing 2 ms and 2 ls are input from the F BUS 64 to the "FPM B IN" input 68. Thus, referring to the results (6) of the post-concatenation performed in step 1.2, the first 8 cycles of Chart 1A represent loading the signals 83 and 84 into the floating point multiplier 69 for the multiplication operation that will result in the first term of each of the C concatenated matrix elements C14, C13, C12 and C11. In the 11th through 18th cycles, the floating point multiplier 69 outputs signals 85 representing the products of the multiplicands that were input into the "FPM A IN" input 67 and the "FPM B IN" input 68 during cycles 1 through 8. These products include, for example, the product "2*B14 ms". These products are loaded into the "FPA B IN" input 73 as indicated by "FPM OUT" at cycles 11 through 18 under the "FPA B IN" heading. Also, during cycles 11 through 18, signals 83 representing the input x coefficient matrix (4) elements B44 through B41 are input from the matrix RAM 52 to the "FPA A IN" input 72 for both the ms and ls words. This conditions the floating point adder 71 to output (in cycles 21 through 28) signals 86 representing, for example, the sum of the first term (B11*2) and the fourth term (B41) of the C11 concatenated matrix (6).

In cycles 21 through 28, the floating point multiplier 69 outputs signals 85 representing the products that correspond to the second terms of each of the C11 through C14 elements of the concatenated matrices (6). These are indicated as being input to the "FPA B IN" input 73. In cycles 21 through 28 the signals 86 are output from the floating point adder 71 and are then input to the floating point adder A input 72 to condition the floating point adder 71 for producing output signals 86 representing the sum of the first, second and fourth terms of each of the C11, C12, C13 and C14 elements of the concatenated matrix (6) in cycles 31 through 38.

As noted above, the data in the matrix RAM 52 can be overwritten. To condition the x coefficient matrix RAM 52 for being overwritten with the x coefficient matrix data in place of the input x coefficient matrix data, in cycles 3–10, the ms and ls words for the input x coefficient matrix elements B13, B12, B11 and B14 are written into the A REG 1 register 75, the A REG 2 register 76, and the A REG 3 register 77 and successively into the pipeline RAM 56. In cycles 21–28, this data is written into the matrix RAM 52 as the C44 through C41 elements of the x coefficient matrix (6). The following "MTX PTR" addresses indicate writing to the following locations in the x coefficient matrix storage section 55 of the matrix RAM 52:

Chart 2

| MTX PTR Address | Location |
|---|---|
| B00 ms | B44 ms |
| B00 ls | B44 ls |
| B03 ms | B43 ms |
| B03 ls | B43 ls |
| B02 ms | B42 ms |
| B02 ls | B42 ls |
| B01 ms | B41 ms |
| B01 ls | B41 ls |

Referring again to the concatenated matrix (6), it is observed that no multiply or add operations are required for the C31 through C34 elements of the concatenated matrix (6). Accordingly, they do not have to be moved in or out of or within the matrix RAM 52.

In cycles 41 through 48, the floating point adder 71 outputs the FPA output signals 86 that represent the ms and ls words of the C14 through C11 elements of the concatenated matrix (6). In the successive cycles 42 through 49, such FPA output signals 86 are stored in the A REG 1 register 75. In successive cycles 43 through 50 such signals 86 are successively stored in the A REG 2 register 76. In the next cycles 44 through 51, such signals 86 are stored in the A REG 3 register 77. In cycles 44–51 such signals 86 are stored in the pipeline RAM 56.

With this description in mind, it is believed that the processing of the matrix elements C21 through C24 of the concatenated matrix (6) may be understood from further reference to Charts 1A through 1L. Such processing results in the outputting (see Chart 1F, "FPA C OUT") in cycles 71 through 78 of the FPA output signals 86 representing the ms and ls words for the C 21 through C24 elements of the concatenated matrix (6). In cycles 71-78 these signals 86 are written into the matrix RAM 52 as the ms and ls words of the x coefficient elements B24 B21. This completes the processing of the C concatenated matrix (6).

STEP 1.3 CONCATENATE MATRIX (6) WITH THE TRANSPOSE OF THE MAGIC MATRIX (5)

Referring again to Process 1, it may be understood that when the concatenated matrix (6) is obtained (step 1.2), it is then concatenated (step 1.3) with the transpose of the magic matrix (5). The result is the x coefficient matrix (8) which has elements D11–D14, etc. The concatenation of matrix (6) with the transpose of the magic matrix (5) is done in a manner similar to that described above with respect to the post-concatenation operation corresponding to step 1.2. Thus, step 1.3 is performed by starting to obtain element D21 in the x coefficient matrix (8). Still referring to Charts 1A through 1L, signals 86 representing the C23 and C24 elements are input in cycles 71 through 74 to the FPA A IN and FPA B IN inputs 72 and 73 respectively as shown in Chart 1F. The sums of these elements are output as signals 86 in cycles 83 and 84 (see "FPA C OUT" on Chart 1F).

To continue to process the element D21, in cycles 75 and 76 the signals 86 representing the C22 ms and C22 ls elements of the concatenated matrix (6) are read from the matrix RAM 52 and written into the FPM A IN input 67. In those cycles, the −2 ms and −2 ls signals 84 from the F BUS 64 are input to the FPM B IN input 68. This will obtain the second term of the D21 element in cycles 85 and 86. In cycles 85 and 86, the signals 86 representing the C21 ms and C21 ls terms are read from the matrix RAM 52 into the FPM A IN input 67 and the signals 84 from the F BUS 64 are input to the FPM B IN input 68.

The output signals 85 from the floating point multiplier 69 in cycles 85 and 86 representing (−2*C22) ms and ls are input to the "FPA A IN" input 72 as indicated by "FPM OUT" under the "FPA A IN" heading in Chart 1F. Signals 86 representing C23+C24 ms and ls (FPA C OUT at cycles 83 and 84) are input to the FPA B IN input 73 in cycles 83 and 84 so that the floating point adder 71 will output in cycles 95 and 96 a signal 86 representing the second through fourth terms of the element D21. This signal 86 is input to the FPA A IN input 72 in cycles 95 and 96 (see Chart 1H) and the signals 85 representing the term 2*C21 are input to the FPA B IN input 73, so that the signals 86 output in cycles 105 and 106 represent the ms and ls words of the D21 elements of the x coefficient matrix (8) (see Chart 1H, FPA C OUT). Similarly, at cycles 119 and 120, the floating point adder 71 outputs signals 86 representing the ms and ls words of the D22 element of the x coefficient matrix (8). In respect to each of the signals 86 representing the ms and ls words for the D21 and D22 matrix elements, when such signals 86 are output from the FPA C OUT output 74 they are (in the next cycle) applied to the A REG 1 register 75, and in succeeding cycles are applied to the A REG 2 register 76, to the A REG 3 register 77, to the pipeline RAM 56, and are ultimately stored in the matrix RAM 52.

Referring again to the x coefficient matrix (8), it may be observed that no multiplication, addition or data transfer need be performed to obtain the D13, D23, D33 and D43 elements. These are retained in the matrix RAM 52 at those addresses. To obtain the values for the D14, D24, D34 and D44 elements, that only require shifting to new storage locations in the matrix RAM 52, respective ms and ls words of the C11, C21, C31 and C41 elements are read from the matrix RAM 52 into the A REG 1 register 75 and into the A REG 2 register 76 before being written into the new address of the matrix RAM 52.

The signals 86 representing the D11 and D12 elements are output from the floating point adder 71 in cycles 125 through 128 (Chart 1J) and are input to the pipeline RAM 56 via the registers 75, 76, and 77, and then to the matrix RAM 52. The signals 86 representing the D31 element (cycles 141 and 142) are written into the pipeline RAM 56, and then to the matrix RAM 52, whereas the signals 86 representing the D32 elements (cycles 155 and 156) and the D42 and D41 elements (cycles 169, 170, 171, and 172) are written directly into the matrix RAM 52.

PROCESSING Y COEFFICIENT MATRIX

When the complete x coefficient matrix (8) has been obtained and stored in the x coefficient matrix location of the matrix RAM 52, the push/pop RAM 48 outputs the next address signal 40 to the WCS 36 to cause similar operations of Process 1 to be performed again to obtain the y coefficient matrix (8). The signals 86 representing the B11, etc. elements of the input y coefficient matrix (4) are input to the y location of the matrix RAM 52. The signals 84 representing the 3, −3, 2 and −2 values of the various terms of the magic matrix (5) are also input from the F BUS 64 and the operation is performed as described above.

PROCESSING Z COEFFICIENT MATRIX

When the complete y coefficient matrix (8) has been obtained and the signals 86 stored in the y coefficient matrix location of the matrix RAM 52, the push/pop RAM 48 outputs the next address signal 40 to the WCS 36 to cause a similar operation to be performed again to obtain the z coefficient matrix (8). The signals representing the B11, etc. elements of the input z coefficient matrix (4) have been input to the z location of the matrix RAM 52. The signals 84 representing the 3, −3, 2 and −2 values of the various terms of the magic matrix (5) have also been input from the F BUS 64 and the above operations of Process 1 are run as described above.

STEP 3.0.2 SUN SCREEN SPACE VECTOR PROCESSING

When the complete z coefficient matrix (8) has been obtained and stored in the z location of the matrix RAM 52, further instructions process the x, y, and z coordinates of the sun screen space vector, including row transformations indicated by the matrices (28), and then by calculating and squaring the sun object space vector as indicated at equations (29) and (30).

CHART 3 A
SUN OBJECT SPACE VECTOR (29)

| CYCLE | FPM A IN | FPM II B IN | FPM C OUT |
|---|---|---|---|
| 1 | I13 ms | x ms | |
| 2 | I13 ls | x ls | |
| 3 | I12 ms | x ms | |
| 4 | I12 ls | x ls | |
| 5 | I11 ms | x ms | |
| 6 | I11 ls | x ms | |
| 7 | I23 ms | y ms | |
| 8 | I23 ls | y ls | |
| 9 | I22 ms | y ms | |
| 10 | I22 ls | y ls | |
| 11 | | | x * I13 ms |
| 12 | | | x * I13 ls |
| 13 | | | x * I12 ms |
| 14 | | | x * I12 ls |
| 15 | | | x * I11 ms |
| 16 | | | x * I11 ls |
| 17 | I21 ms | y ms | y * I23 ms |
| 18 | I21 ls | y ls | y * I23 ls |
| 19 | | | y * I22 ms |
| 20 | | | y * I22 ls |
| 21 | | | |
| 22 | | | |
| 23 | | | |
| 24 | | | |
| 25 | I33 ms | z ms | |
| 26 | I33 ls | z ls | |
| 27 | I31 ms | z ms | y * I21 ms |
| 28 | I31 ls | z ls | y * I21 ls |
| 29 | I32 ms | z ms | |
| 30 | I32 ls | z ls | |

CHART 3 B
SUN OBJECT SPACE VECTOR (29)

| CYCLE | FPA A IN | FPA B IN | FPA C OUT |
|---|---|---|---|
| 1 | | | |
| 2 | | | |
| 3 | | | |
| 4 | | | |
| 5 | | | |
| 6 | | | |
| 7 | | | |
| 8 | | | |
| 9 | | | |
| 10 | | | |
| 11 | 0 ms | FPM OUT | |
| 12 | 0 ls | FPM OUT | |
| 13 | 0 ms | FPM OUT | |
| 14 | 0 ls | FPM OUT | |
| 15 | 0 ms | FPM OUT | |
| 16 | 0 ls | FPM OUT | |
| 17 | | | |
| 18 | | | |
| 19 | | | |
| 20 | | | |
| 21 | FPA OUT | y * I23 ms | x I13 + 0 ms |
| 22 | FPA OUT | y * I23 ls | x I13 + 0 ls |
| 23 | y * I22 ms | FPA OUT | x I12 + 0 ms |
| 24 | y * I22 ls | FPA OUT | x I12 + 0 ls |
| 25 | | | x I11 + 0 ms |
| 26 | | | x I11 + 0 ls |
| 27 | y*I21 ms + x*I11 | FPM OUT | |
| 28 | y*I21 ls + x*I11 | FPM OUT | |
| 29 | | | |
| 30 | | | |

CHART 3 C
SUN OBJECT SPACE VECTOR (29)

| CYCLE | FPM A IN | FPM B IN | FPM C OUT |
|---|---|---|---|
| 31 | | | |
| 32 | | | |
| 33 | | | |
| 34 | | | |
| 35 | | | z * I33 ms |
| 36 | | | z * I33 ls |
| 37 | | | z * I31 ms |
| 38 | | | z * I31 ls |
| 39 | | | z * I32 ms |
| 40 | | | z * I32 ls |
| 41 | | | |
| 42 | | | |
| 43 | | | |
| 44 | | | |
| 45 | FPA OUT | FPA OUT | |
| 46 | FPA OUT | FPA OUT | |
| 47 | FPA OUT | FPA OUT | |
| 48 | FPA OUT | FPA OUT | |
| 49 | FPA OUT | FPA OUT | |
| 50 | FPA OUT | FPA OUT | |
| 51 | | | |
| 52 | | | |
| 53 | | | |
| 54 | | | |
| 55 | | | SUN $Z^2$ ms |
| 56 | | | SUN $Z^2$ ls |
| 57 | | | SUN $Y^2$ ms |
| 58 | | | SUN $Y^2$ ls |
| 59 | | | SUN $X^2$ ms |
| 60 | | | SUN $X^2$ ls |
| 61 | | | |
| 62 | | | |

CHART 3 D
SUN OBJECT SPACE VECTOR (29)

| CYCLE | FPA A IN | FPA B IN | FPA C OUT |
|---|---|---|---|
| 31 | | FPA OUT | y*I23 + x*I13 ms |
| 32 | | FPA OUT | y*I23 + x*I13 ls |
| 33 | | | y*I22 + x*I12 ms |
| 34 | | | y*I22 + x*I12 ls |
| 35 | FPM OUT | | |
| 36 | FPM OUT | | |
| 37 | FPA OUT | FPM OUT | y*I21 + x*I11 ms |
| 38 | FPA OUT | FPM OUT | y*I21 + x*I11 ls |
| 39 | A REG 2 | FPM OUT | |
| 40 | A REG 2 | FPM OUT | |
| 41 | | | |
| 42 | | | |
| 43 | | | |
| 44 | | | |
| 45 | | | Z ms |
| 46 | | | Z ls |
| 47 | | | Y ms |
| 48 | | | Y ls |
| 49 | | | X ms |
| 50 | | | X ls |
| 51 | | | |
| 52 | | | |
| 53 | | | |
| 54 | | | |

-continued

CHART 3 D
SUN OBJECT SPACE VECTOR (29)

| CYCLE | FPA A IN | FPA B IN | FPA C OUT |
|---|---|---|---|
| 55 | | FPM OUT | |
| 56 | | FPM OUT | |
| 57 | FPM OUT | | |
| 58 | FPM OUT | | |
| 59 | | FPM OUT | |
| 60 | | FPM OUT | |
| 61 | | | |
| 62 | | | |

CHART 3 E
SUN OBJECT SPACE VECTOR (29)

| CYCLE | FPA A IN | FPA II B IN | FPA C OUT |
|---|---|---|---|
| 63 | | | |
| 64 | | | |
| 65 | | | |
| 66 | | | |
| 67 | FPA OUT | | SUN $Z^2 + y^2$ ms |
| 68 | FPA OUT | | SUN $Z^2 + y^2$ ls |
| 70 | | | |
| 71 | | | |
| 72 | | | |
| 73 | | | |
| 74 | | | |
| 75 | | | |
| 76 | | | |
| 77 | | | (SUN DIS. ms)$^2$ |
| 78 | | | (SUN DIS. ls)$^2$ |

Referring to Charts 3A through 3E, the "I" matrix elements are those in the inverse matrix (28), "x" represents the sun screen space x coordinate, "y" represents the sun screen space y coordinate, "z" represents the sun screen space z coordinate, and "SUN x", "SUN y", and "SUN z" represent the respective x, y, and z sun object space coordinates. At cycle 1 a signal 83 representing the I 13 ms word is input to the "FPM A IN" input 67 and a signal 84 representing the sun screen space x ms word is input to the "FPM B IN" input 68. The resulting output signal 85 from the floating point multiplier 69 is indicated at cycle 11 as x*I13 ms, which indicates the sun screen space x times the inverse matrix element I13 corresponding to the first term of the sun object space z equation (29). This output signal 85 is input to the floating point adder B input 73. In the same cycle 11 zero is input to the floating point adder A input 72. The other inputs corresponding to the other multiplication operations that are required to compute the sun object space z equation (29) may be understood from further reference to Charts 3A through 3E.

Signals 85 representing the product of the inverse matrix element I23 and the sun screen space y are output from the floating point multiplier output 70 at cycles 17 and 18, are applied to the A REG 1 register 75 and in successive cycles are applied to the pipeline RAM 56 and to A REG 3 register 77. In cycles 21 and 22 these signals 86 are input to the FPA B IN input 73 simultaneously with the inputting to the FPA A IN input 72 of the output signal 86 representing (x*I13+0) from the adder 71. Signals 86 representing the sum (I13*x+I23*y) are output from the floating point adder in cycles 31 and 32 and are stored in the A REG 1 register 75 and the A REG 2 register 76. These signals 86 are then input in cycles 35 and 36 to the FPA B IN input 73. Also, in cycles 35 and 36, the ms and ls words for the third term (I33*z) of the sun object space z are output from the floating point multiplier 69 and are input to the A IN input 72 of the floating point adder 71. Ten cycles after cycle 35 and 36, namely cycle 45 and 46, the signal 86 representing the sun object space z coordinate is output from the FPA C OUT output 74. This is also entered into the A REG 1 register 75 and in successive cycles through cycle 53 is entered in the pipeline RAM 56 for both the ms and ls words.

Having the signals 86 representing the sun object space z, y, and x coordinates (cycles 45 through 50) (shown by capital letters z, y and x in Chart 3D), then as indicated at equation (30) the sun object space distance squared is obtained. Referring to Charts 3A and 3E, cycles 45 through 50, signals 30 representing the ms and ls words for the sun object space coordinates are shown input into each of the floating point multiplier inputs 67 and 68 so that the sun object space distance squared equation (30) is processed. Ten cycles later, starting at cycles 55, signals 85 representing the sun object space distance squared for the ms and ls words for the x, y, and z coordinates are output from the floating point multiplier 69. The signals 85 representing the squared sun object space x, y, and z coordinates are output in cycles 55 through 60 (see "SUN $Z^2$ ms", for example) and are appropriately input to the floating point adder 71 as shown on Charts 3A through 3E, such that in cycles 67 and 68 the partial sums, and in cycles 77 and 78, the entire sums (see (SUN DIS.)$^2$, for example) are output as the signals 86 representing equation (30). These signals 86 are written into the pipeline RAM 56 via the registers 75, 76, and 77.

PROCESSING MULTIPLIERS

Having performed the operations described above, Process 2 Steps 2.0.1.1 through 2.0.1.3 of Process 2 are performed to obtain the multipliers for the coefficients in equation (11) and for the partial derivatives in equations (22) and (23). Referring to FIGS. 4A, 4B, and 5 in conjunction with the Charts 4A through 4I, the multipliers in equations (10) are first computed.

CHART 4A
OBTAIN MULTIPLIER (10) AND PARTIAL
DERIVATIVES (22) AND (23)

| CYCLE | FPM A IN | FPM B IN | FPM C OUT |
|---|---|---|---|
| 1 | D11 ms | $t^3$ ms | |
| 2 | D11 ls | $t^3$ ls | |
| 3 | D12 ms | $t^2$ ms | |
| 4 | D12 ls | $t^2$ ls | |
| 5 | D13 ms | t ms | |
| 6 | D13 ls | t ls | |
| 7 | | | |
| 8 | | | |
| 9 | D14 ms | 3 ms | |
| 10 | D14 ls | 3 ls | |
| 11 | FPM OUT | 3 ms | D11*$t^3$ ms |
| 12 | FPM OUT | 3 ls | D11*$t^3$ ls |
| 13 | FPM OUT | 3 ms | D12*$t^2$ ms |
| 14 | FPM OUT | 3 ls | D12*$t^2$ ls |
| 15 | FPM OUT | 3 ms | D13* t ms |
| 16 | FPM OUT | 3 ls | D13* t ls |
| 17 | | | |
| 18 | | | |
| 19 | | $t^3$ ms | 3* D14 ms |
| 20 | | $t^3$ ls | 3* D14 ls |
| 21 | D21 ms | | 3*D11*$t^3$ ms |
| 22 | D21 ls | | 3*D11*$t^3$ ls |
| 23 | D22 ms | $t^2$ ms | 3*D12*$t^2$ ms |
| 24 | D22 ls | $t^2$ ls | 3*D12*$t^2$ ls |
| 25 | | | 3*D13*t ms |

-continued

CHART 4A
OBTAIN MULTIPLIER (10) AND PARTIAL DERIVATIVES (22) AND (23)

| CYCLE | FPM A IN | FPM B IN | FPM C OUT |
|---|---|---|---|
| 26 | | | 3*D13*t ls |
| 27 | D23 ms | 2 ms | |
| 28 | D23 ls | 2 ls | |
| 29 | D24 ms | | |
| 30 | D24 ls | | |
| 31 | FPM OUT | | D21*t$^3$ ms |

CHART 4B
OBTAIN MULTIPLIERS (10) AND PARTIAL DERIVATIVES (22) AND (23)

| Cycle | FPA A IN | FPA B IN | FPA C OUT |
|---|---|---|---|
| 1 | | | |
| 2 | | | |
| 3 | | | |
| 4 | | | |
| 5 | | | |
| 6 | | | |
| 7 | | | |
| 8 | | | |
| 9 | | | |
| 10 | | | |
| 11 | | FPM OUT | |
| 12 | | FPM OUT | |
| 13 | FPM OUT | | |
| 14 | FPM OUT | | |
| 15 | | FPM OUT | |
| 16 | | FPM OUT | |
| 17 | D14 ms | | |
| 18 | D14 ls | | |
| 19 | | FPM OUT | |
| 20 | | FPM OUT | |
| 21 | FPM OUT | | |
| 22 | FPM OUT | | |
| 23 | | FPM OUT | D11*t$^3$+D12*t$^2$ ms |
| 24 | | FPM OUT | D11*t$^3$+D12*t$^2$ ls |
| 25 | FPM OUT | | |
| 26 | FPM OUT | | |
| 27 | | | D13*t+D14 ms |
| 28 | | | D13*t+D14 ls |
| 29 | D11*t$^3$+D12*t$^2$ms | D13*t+D14 ms | |
| 30 | D11*t$^3$+D12*t$^2$ls | D12*t+D14 ls | |
| 31 | | FPM OUT | 3*D14+3*D11*t$^3$ ms |

CHART 4C
OBTAIN MULTIPLIERS (10) AND PARTIAL DERIVATIVES (22) AND (23)

| Cycle | FPM A IN | FPM B IN | FPM C OUT |
|---|---|---|---|
| 32 | FPM OUT | | D21*t$^3$ ls |
| 33 | FPM OUT | | D22*t$^2$ ms |
| 34 | FPM OUT | | D22*t$^2$ ls |
| 35 | | | |
| 36 | | | |
| 37 | | FPM OUT | 2*D23 ms |
| 38 | | FPM OUT | 2*D23 ls |
| 39 | t ms | | 2*D24 ms |

CHART 4C
OBTAIN MULTIPLIERS (10) AND PARTIAL DERIVATIVES (22) AND (23)

| Cycle | FPM A IN | FPM B IN | FPM C OUT |
|---|---|---|---|
| 40 | t ls | | 2*D24 ls |
| 41 | | | 2*D21*t$^3$ ms |
| 42 | | | 2*D21*t$^3$ ls |
| 43 | D23 ms | t ms | 2*D22*t$^2$ ms |
| 44 | D23 ls | t ls | 2*D22*t$^2$ ls |
| 45 | | | |
| 46 | | | |
| 47 | D31 ms | t$^3$ ms | |
| 48 | D31 ls | t$^3$ ls | |
| 49 | | | 2* D23*t ms |
| 50 | | | 2* D23*t ls |
| 51 | | | |
| 52 | | | |
| 53 | | | D23 * t ms |
| 54 | | | D23 * t ls |
| 55 | | | |
| 56 | | | |
| 57 | | | D31 * t$^3$ ms |
| 58 | | | D31 * t$^3$ ls |
| 59 | | | |
| 60 | | | |
| 61 | | | |
| 62 | | | |

CHART 4D
OBTAIN MULTIPLIERS (10) AND PARTIAL DERIVATIVES (22) AND (23)

| Cycle | A FPA IN | B FPA IN | C FPA OUT |
|---|---|---|---|
| 32 | | FPM OUT | 3*D14+*D11*t$^3$ ls |
| 33 | FPM OUT | | |
| 34 | FPM OUT | | |
| 35 | 3*D11*t$^3$ms | | 3*D12*t$^2$ |

CHART 4D
OBTAIN MULTIPLIERS (10) AND PARTIAL DERIVATIVES (22) AND (23)

| Cycle | A FPA IN | B FPA IN | C FPA OUT |
|---|---|---|---|
|  | +3*D14 ms | FPA OUT | +3*D13*t ms |
| 36 | 3*D11*t³ ls |  | 3*D12*t² |
|  | +3*D14 ls | FPA OUT | +3*D13*t ls |
| 37–38 |  |  |  |
| 39 |  | FPM OUT | s3 ms |
| 40 |  | FPM OUT | s3 ls |
| 41 | FPM OUT |  |  |
| 42 | FPM OUT |  |  |
| 43 |  | FPM OUT | D21*t³+D22*t² ms |
| 44 |  | FPM OUT | D22*t³+D22*t² ls |
| 45 |  |  | dx/ds s2 ms |
| 46 |  |  | dx/ds s2 ls |
| 47–48 |  |  |  |
| 49 | FPM OUT |  |  |
| 50 | FPM OUT |  |  |
| 51 |  | D21*t³+D22*t² ms | 2*D21*t³+2*D24 ms |
| 52 |  | D21*t³+D22*t² ls | 2*D21*t³+2*D24 ls |
| 53 | FPM OUT |  |  |
| 54 | FPM OUT |  |  |
| 55 |  | D34 ms |  |
| 56 |  | D34 ls |  |
| 57 | FPM OUT |  |  |
| 58 | FPM OUT |  |  |
| 59 | 2*D21*t³+2*D24 ms | FPA OUT | 2*D22*t²+2*D23*t ms |
| 60 | 2*D21*t³+2*D24 ls | FPA OUT | 2*D22*t²+2*D23*t ls |
| 61 |  | D24 ms |  |
| 62 |  | D24 ls |  |

CHART 4E
OBTAIN MULTIPLIERS (10) AND PARTIAL DERIVATIVES (22) AND (23)

| Cycle | FPM A IN | FPM B OUT | FPM C OUT |
|---|---|---|---|
| 63 | D32 ms | t² |  |
| 64 | D32 ls | t² |  |
| 65 |  |  |  |
| 66 |  |  |  |
| 67 | D42 ms |  |  |
| 68 | D42 ls |  |  |
| 69 | D41 ms | t³ ms |  |
| 70 | D41 ls | t³ ls |  |
| 71 | D43 ms | t ms |  |
| 72 | D43 ls | t ls |  |
| 73 | D33 ms |  | D32*t² ms |
| 74 | D33 ls |  | D32*t² ms |
| 75 | 2 ms |  |  |
| 76 | 2 ls |  |  |
| 77 |  | t² ms | D42*t² ms |
| 78 |  | t² ls | D42*t² ls |
| 79 |  |  | D41*t³ ms |
| 80 |  |  | D41*t³ ls |
| 81 |  |  | D43*t ms |
| 82 |  |  | D43*t ls |
| 83 | 3 ms |  | D33*t ms |
| 84 | 3 ls |  | D33*t ls |
| 85 | D22 ms | FPM OUT | 2*t ms |
| 86 | D22 ls | FPM OUT | 2*t ls |
| 87 | D12 ms |  |  |
| 88 | D12 ls |  |  |
| 89 | D32 ms |  |  |
| 90 | D32 ls |  |  |
| 91 | D42 ms |  |  |
| 92 | D42 ls |  |  |
| 93 | D21 ms | FPM OUT | 3*t² ms |

CHART 4F
OBTAIN MULTIPLIERS (10) AND PARTIAL DERIVATIVES (22) AND (23)

| Cycle | FPA A IN | FPA B IN | FPA C OUT |
|---|---|---|---|
| 63 | FPA OUT |  | D21*t³+D22*t² +D23*t ms |
| 64 | FPA OUT |  | D21*t³+D22*t² +D23*t ls |
| 65–66 |  |  |  |
| 67 |  | FPA OUT | D31*t³+D34 ms |
| 68 |  | FPA OUT | D31*t³+D34 ls |
| 69 |  |  | dx/ds s1 ms |
| 70 |  |  | dx/ds s1 ls |
| 71 |  |  |  |
| 72 |  |  |  |
| 73 | FPM OUT |  | s2 ms |
| 74 | FPM OUT |  | s2 ls |
| 75–76 |  |  |  |
| 77 |  | FPM OUT |  |
| 78 |  | FPM OUT |  |
| 79 | FPM OUT |  |  |
| 80 | FPM OUT |  |  |
| 81 | D44 ms | FPM OUT |  |
| 82 | D44 ls | FPM OUT |  |
| 83 | FPA OUT | FPM OUT | D31*t³+D32*t²+D34 ms |
| 84 | FPA OUT | FPM OUT | D31*t³+D32*t²+D34 ls |
| 85–86 |  |  |  |
| 87–88 |  |  |  |
| 89 |  |  | D41*t³+D42*t² ms |
| 90 |  |  | D41*t³+D42*t² ls |
| 91 | D41*t³ +D42*t² ms | FPA OUT | D43*t+D44 ms |
| 92 | D41*t³ +D42*t² ls | FPA OUT | D43*t+D44 ls |
| 93 |  |  | s1&dx/ds s0 ms |

CHART 4G
OBTAIN MULTIPLIERS (10) AND PARTIAL DERIVATIVES (22) AND (23)

| Cycle | FPM A IN | FPM B IN | FPM C OUT |
|---|---|---|---|
| 94 | D21 ls | FPM OUT | 3*t² ls |
| 95 | | | 2*D22*t ms |
| 96 | | | 2*D22*t ls |
| 97 | | | 2*D12*t ms |
| 98 | | | 2*D12*t ls |
| 99 | | | 2*D32*t ms |
| 100 | | | 2*D32*t ls |
| 101 | | | 2*D42*t ms |
| 102 | | | 2*D42*t ls |
| 103 | D11 ms | | 3*D21*t² ms |
| 104 | D11 ls | | 3*D21*t² ls |
| 105 | D31 ms | | |
| 106 | D31 ls | | |
| 107 | | | |
| 108 | | | |
| 109 | D41 ms | | |
| 110 | D41 ls | | |
| 111 | | | |
| 112 | | | |
| 113 | | | 3*D11*t2 ms |
| 114 | | | 3*D11*t² ls |
| 115 | | | 3*D31*t² ms |
| 116 | | | 3*D31*t² ls |
| 117 | | | |
| 118 | | | |
| 119 | | | 3*D41*t² ms |
| 120 | | | 3*D41*t² ls |
| 121 | | | |
| 122 | | | |
| 123 | | | |
| 124 | | | |

CHART 4H
OBTAIN MULTIPLIERS (10) AND PARTIAL DERIVATIVES (22) AND (23)

| Cycle | FPA A IN | FPA B IN | FPA C OUT |
|---|---|---|---|
| 94 | | | s1 & dx/ds s0 ls |
| 95 | D23 ms | FPM OUT | |
| 96 | D23 ls | FPM OUT | |
| 97 | D13 ms | FPM OUT | |
| 98 | D13 ls | FPM OUT | |
| 99 | D33 ms | FPM OUT | |
| 100 | D33 ls | FPM OUT | |
| 101 | D43 ms | FPM OUT | s0 ms |
| 102 | D43 ls | FPM OUT | s0 ls |
| 103 | | FPM OUT | |
| 104 | | FPM OUT | |
| 105 | FPA OUT | | 2*D22*t+D23 ms |
| 106 | FPA OUT | | 2*D22*t+D23 ls |
| 107 | | FPA OUT | 2*D12*t+D13 ms |
| 108 | | FPA OUT | 2*D12*t+D13 ls |
| 109 | | | 2*D32*t+D33 ms |
| 110 | | | 2*D32*t+D33 ls |
| 111 | | | 2*D42*t+D43 ms |
| 112 | | | 2*D42*t+D43 ls |
| 113 | FPM OUT | | |
| 114 | FPM OUT | | |
| 115 | | FPM OUT | dx/ds s2 ms |
| 116 | | FPM OUT | dx/ds s2 ls |
| 117 | 2*D32*t+D33 ms | | |
| 118 | 2*D32*t+D33 ls | | |
| 119 | 2*D42*t+D43 ms | FPM OUT | |
| 120 | 2*D42*t+D43 ls | FPM OUT | |
| 121 | | | |
| 122 | | | |
| 123 | | | dx/dt s3 ms |
| 124 | | | dx/dt s3 ls |

CHART 4I
OBTAIN MULTIPLIERS (10) AND PARTIAL DERIVATIVES (22) AND (23)

| Cycle | FPA A IN | FPA B IN | FPA C OUT |
|---|---|---|---|
| 125 | | | |
| 126 | | | |
| 127 | | | dx/dt s1 ms |
| 128 | | | dx/dt s1 ls |
| 129 | | | dx/dt s0 ms |
| 130 | | | dx/dt s0 ls |

The PROM 78 stores values of "s" and "t", and the squares and cubes of "s" and "t", for the respective increments 0.1 and 0.2 shown in FIG. 1. The "s" and "t" terms listed in Charts 4A through 4I are signals 87 output from the PROM 78. The register y 60 is set for the "s" or "t" value that is to be processed to cause the PROM 78 to output the desired value. Referring to cycle 1 on Chart 4A, to Process 2, Step 2.0.1, and to the s3 multiplier of equation (10), it is seen that a signal 83 representing the D11 ms word of the x coefficient matrix is input to the floating point multiplier A input 67 from the matrix RAM 83. Also, the PROM 78 is caused to output the signal 87 representing the ms word of $t^3$. The signal 87 is input to the B input 68. The remaining cycles 2 through 6 input the respective signals 83 and 87 representing the remaining terms of the s3 multiplier of equation (10) that must be multiplied. These products for the first, second and third terms of the s3 multiplier equation (10) are output from the floating point multiplier 69 as the signals 85 and are in turn added to the D14 term in cycle 17 such 2 that the sum of the third and fourth terms of the s3 multiplier equation (10) are output from the floating point adder 71 at cycles 27 and 28. The sum of the first and second terms of the multiplier s3 have been output as the signals 86 from the floating point adder 71 at cycles 23 and 24 and are input to the A REG 1 register 75 and the A REG 2 register 76. Signals 88 representing such first and second terms of the s3 equation (10) are input in cycles 29 and 30 from the A register 76 into the floating point adder A input 72. In the same cycles 29 and 30, signals 30 from the pipeline RAM 56 representing the third and fourth terms of the s2 equation (10) are input to the floating point adder B input 73. As a result, in cycles 39 and 40, signals 86 representing the ms and ls words for the complete multiplier s3 are output from the floating point adder output C 74 and are input into the A REG 1 register 75. In cycles 39 through cycle 43, such signals 86 representing the multiplier s3 ms and ls words are written into the pipeline RAM 56 via registers 75 through 77.

In a similar manner, the s2, s1, and s0 multipliers of equations (10) are calculated and output as the signals 86 in respective cycles 73–74, 93–94, and 101–102. These signals 86 are stored in the pipeline RAM 56 in successive cycles.

Further, and referring now to the multipliers identified in equations (20) and (21), the multiplier (dx/ds s2) is processed starting at cycles 11 and 12, where the signals 85 representing the ms and ls words for the product of D11 times $t^3$ are input to the floating point multiplier A input 67. At the same cycles, the signals 84 representing the 3 ms and ls words are input from the F BUS 64 to the floating point multiplier B input 68. At cycles 21 and 22 the signals 85 representing the entire first term (e.g. $3*D11*t^3$) of the (dx/ds s2) multiplier are output from the floating point multiplier 69.

Referring to Process 2, Steps 2.0.1.1 through 2.0.1.3, and to Charts 4A through 4I, in a similar manner the other terms of the multipliers shown in equations (20) and (21) are output and stored in the pipeline RAM 56 for use in calculating the values of the x, y, and z coordinates and the point normals relating thereto. For example, in cycles 45 and 46 the floating point adder C output 74 outputs the signal 86 representing the multiplier (dx/ds s2) ms and ls words which are stored in the processor input register.

When Process Step 2.0.1.3 has been completed, signals 86 representing all of the multipliers shown at equation (20) and (21) and all of the multipliers s3, s2, s1 and s0, used in equation (11) have been obtained and the apparatus 21 is ready to perform Step 2.0.1.4 to obtain the values of the x, y, and z coordinates and the point normals relating thereto. When the last operation of Step 2.0.1.3 has been completed, the next instruction that is read is to "pop", which causes the next address signal 40 to be read from the stack RAM 48. This address signal 40 is applied to the WCS 36 which outputs an instruction signal 39 to the control register 35, which calls a subroutine for calculating such values of the coordinates x, y, and z and the related point normals.

PROCESS 2, STEP 2.0.1.4 OBTAIN VALUES FOR X POINT COORDINATES AND PARTIAL DERIVATIVES

Referring to Charts 5A through 5F in conjunction with FIGS. 4A, 4B, and 5, Step 2.0.1.4 of Process 2 is described for the x coordinate.

CHART 5A
STEP 2.0.1.4, OBTAIN VALUES FOR x
POINT COORDINATES AND PARTIAL DERIVATIVES

| Cycle | FPM A IN | FPM B IN | FPM C OUT |
|---|---|---|---|
| 1 |  | $s^3$ ms |  |
| 2 |  | $s^3$ ls |  |
| 3 | s3 ms | $s^3$ ms |  |
| 4 | s3 ls | $s^3$ ls |  |
| 5 | dx/dt s3 ms | $s^3$ ms |  |
| 6 | dx/dt s3 ls | $s^3$ ls |  |
| 7 |  | $s^2$ ms |  |
| 8 |  | $s^2$ ls |  |
| 9 | dx/ds s2 ms | $s^2$ ms |  |
| 10 | dx/ds s2 ls | $s^2$ ls |  |
| 11 | s2 ms | $s^2$ ms |  |
| 12 | s2 ls | $s^2$ ls |  |
| 13 |  | $s^2$ ms | $s3* s^3$ ms |
| 14 |  | $s^2$ ls | $s3* s^3$ ls |
| 15 |  | $s^2$ ms | dx/dt $s3*s^3$ ms |
| 16 |  | $s^2$ ls | dx/dt $s3*s^3$ ls |
| 17 | dx/dt s2 ms | $s^2$ ms |  |
| 18 | dx/dt s2 ls | $s^2$ ls |  |
| 19 |  |  | dx/ds $s2*s^2$ ms |
| 20 |  |  | dx/ds $s2*s^2$ ls |
| 21 | A | s ms | $s2*s^2$ ms |
| 22 |  | s ls | $s2*s^2$ ls |
| 23 | s1 ms | s ms |  |
| 24 | s1 ls | s ls |  |
| 25 | dx/ds s1 ms | s ms |  |
| 26 | dx/ds s1 ls | s ls |  |
| 27 | dx/dt s1 ms | s ms | dx/dt $s2*s^2$ ms |
| 28 | dx/dt s1 ls | s ls | dx/dt $s2*s^2$ ls |
| 29 |  | $s^3$ ms |  |
| 30 |  | $s^3$ ls |  |
| 31 | s3 ms | $s^3$ ms |  |

CHART 5B
STEP 2.0.1.4, OBTAIN VALUES FOR x
POINT COORDINATES AND PARTIAL DERIVATIVES

| Cycles | FPA A IN | FPA B IN | FPA C IN |
|---|---|---|---|
| 1 |  |  |  |
| 2 |  |  |  |
| 3 |  |  |  |
| 4 |  |  |  |
| 5 |  |  |  |
| 6 |  |  |  |
| 7 |  |  |  |
| 8 |  |  |  |
| 9 |  |  |  |
| 10 |  |  |  |
| 11 |  |  |  |
| 12 |  |  |  |
| 13 | s0 ms |  | FPM OUT |
| 14 | s0 ls |  | FPM OUT |
| 15 | dx/dt s0 ms |  | FPM OUT |

-continued
CHART 5B
STEP 2.0.1.4, OBTAIN VALUES FOR x
POINT COORDINATES AND PARTIAL DERIVATIVES

| Cycles | FPA A IN | FPA B IN | FPA C IN |
|---|---|---|---|
| 16 | dx/dt s0 ls | FPM OUT | |
| 17 | | | |
| 18 | | | |
| 19 | dx/ds s0 ms | FPM OUT | |
| 20 | dx/ds s0 ls | FPM OUT | |
| 21 | | FPM OUT | |
| 22 | | FPM OUT | |
| 23 | FPA OUT | | $s3*s^3+s0$ ms |
| 24 | FPA OUT | | $s3*s^3+s0$ ls |
| 25 | | | dx/dt($s3*s^3+s0$)ms |
| 26 | | | dx/dt($s3*s^3+s0$)ls |
| 27 | dx/dt($s3*s^3+s0$)ms | FPM OUT | |
| 28 | dx/dt($s3*s^3+s0$)ls | FPM OUT | |
| 29 | | | dx/ds($s2*s^2+s0$)ms |
| 30 | | | dx/ds($s2*s^2+s0$)ls |

CHART 5C
STEP 2.0.1.4, OBTAIN VALUES FOR x
POINT COORDINATES AND PARTIAL DERIVATIVES

| Cycle | FPM A IN | FPM B IN | FPM C OUT |
|---|---|---|---|
| 32 | s3 ls | | |
| 33 | dx/dt s3 ms | | s1 * s ms |
| 34 | dx/dt s3 ls | | s1 * s ms |
| 35 | | $s^2$ ms | dx/ds s1*s ms |
| 36 | | $s^2$ ls | dx/ds s1*s ls |
| 37 | dx/ds s2 ms | | dx/dt s1*s ms |
| 38 | dx/ds s2 ls | | dx/dt s1*s ls |
| 39 | s2 ms | | |
| 40 | s2 ls | | |
| 41 | | | $s3*s^3$ ms |
| 42 | | | $s3*s^3$ ls |
| 43 | | | dx/dt $s3*s^3$ ms |
| 44 | | | dx/dt $s3*s^3$ ls |
| 45 | dx/dt s2 ms | | |
| 46 | dx/dt s2 ls | | |
| 47 | | | dx/ds $s2*s^2$ ms |
| 48 | IF MORE "s": GO TO A | | dx/ds $s2*s^2$ ls |
| 49 | IF LAST "s", THEN DO 50-66 | s ms | $s2 * s^2$ ms |
| 50 | " | s ls | $s2 * s^2$ ls |
| 51 | s1 ms | | |
| 52 | s1 ls | | |
| 53 | dx/ds s1 ms | | |
| 54 | dx/ds s1 ls | | |
| 55 | dx/dt s1 ms | | dx/dt $s2*s^2$ ms |
| 56 | dx/dt s1 ls | | dx/dt $s2*s^2$ ls |
| 57 | | | |
| 58 | | | |
| 59 | | | |
| 60 | | | |
| 61 | | | s1 * s ms |
| 62 | | | s1 * s ls |

CHART 5D
STEP 2.0.1.4, OBTAIN VALUES FOR x
POINT COORDINATES AND PARTIAL DERIVATIVES

| Cycle | FPA A IN | FPA B IN | FPA C OUT |
|---|---|---|---|
| 32 | | | |
| 33 | FPA OUT | FPM OUT | $s3*s^3+s2*s^2 + s0$ ms |
| 34 | FPA OUT | FPM OUT | $s3*s^3+s2*s^2 + s0$ ls |
| 35 | A REG 2 | FPM OUT | |
| 36 | A REG 2 | FPM OUT | |
| 37 | FPA OUT | FPM OUT | dx/dt($s3*s^3+s2*s^2+s0$)ms |
| 38 | FPA OUT | FPM OUT | dx/dt($s3*s^3+s2*s^2+s0$)ls |
| 39 | | | |
| 40 | | | |
| 41 | s0 ms | FPM OUT | |

CHART 5D-continued
STEP 2.0.1.4, OBTAIN VALUES FOR x
POINT COORDINATES AND PARTIAL DERIVATIVES

| Cycle | FPA A IN | FPA B IN | FPA C OUT |
|---|---|---|---|
| 42 | s0 ls | FPM OUT | |
| 43 | dx/dt s0 ms | FPM OUT | x ms |
| 44 | dx/dt s0 ls | FPM OUT | x ls |
| 45 | | | dx/ds ms |
| 46 | | | dx/ds ls |
| 47 | dx/ds s0 ms | FPM OUT | dx/dt ms |
| 48 | dx/ds s0 ls | FPM OUT | dx/dt ls |
| 49 | | FPM OUT | |
| 50 | | FPM OUT | |
| 51 | FPA OUT | | $s3*s^3 + s0$ ms |
| 52 | FPA OUT | | $s3*s^3 + s0$ ls |
| 53 | | | dx/dt($s3*s^3+s0$)ms |
| 54 | | | dx/dt($s3*s^3+s0$)ls |
| 55 | dx/dt($s3*s^3+s0$)ms FPM OUT | | |
| 56 | dx/dt($s3*s^3+s0$)ls FPM OUT | | |
| 57 | | | dx/ds($s2*s^2+s0$)ms |
| 58 | | | dx/ds($s2*s^2+s0$)ls |
| 59 | | | |
| 60 | | | |
| 61 | FPA OUT | FPM OUT | $s3*s^3+s2*s^2+s0$ ms |
| 62 | FPA OUT | FPM OUT | $s3*s^3+s2*s^2+s0$ ls |

CHART 5E
STEP 2.0.1.4, OBTAIN VALUES FOR x
POINTS COORDINATES AND PARTIAL DERIVATIVES

| Cycle | FPM A IN | FPM B IN | FPM C OUT |
|---|---|---|---|
| 63 | | | dx/ds s1*s ms |
| 64 | | | dx/ds s1*s ls |
| 65 | | | dx/dt s1*s ms |
| 66 | | | dx/dt s1*s ls |

CHART 5F
STEP 2.0.1.4, OBTAIN VALUE FOR x
POINTS COORDINATES AND PARTIAL DERIVATIVES

| Cycle | FPA A IN | FPA B IN | FPA C OUT | TRANS RAM PTR DATA |
|---|---|---|---|---|
| 63 | A REG 2 | FPM OUT | | |
| 64 | A REG 2 | FPM OUT | | |
| 65 | FPA OUT | FPM OUT | dx/dt($s3*s^3+s2*s^2+s0$)ms | |
| 66 | FPA OUT | FPM OUT | dx/dt($s3*s^3+s2*s^2+s0$)ls | |
| 67 | | | | |
| 68 | | | | |
| 69 | | | | |
| 70 | | | | |
| 71 | | | | x ms |
| 72 | | | | x ls |

CHART 5F-continued
STEP 2.0.1.4, OBTAIN VALUE FOR x
POINTS COORDINATES AND PARTIAL DERIVATIVES

| Cycle | FPA A IN | FPA B IN | FPA C OUT | TRANS RAM PTR DATA |
|---|---|---|---|---|
| 73 | | | dx/ds ms | |
| 74 | | | dx/ds ls | |
| 75 | | | dx/ds ms | |
| 76 | | | dx/ds ls | |

FPA C OUT cycles 71–76 = last vertex 9 in row

Referring also to Equation (1), it will be recalled that the D11, etc. matrix elements have been obtained and combined with the "t" values to obtain the s0 through s3 multipliers in Equations (10). Here, such multipliers and the multipliers of Equations 20 and 21 are combined as in Equations (13), (14), (22), and (23). This outputs the signals 86 representing coordinate values for an entire vertex row 12 representing the partial derivatives with respect to "s" and "t" for each x coordinate value.

The "s", "t" PROM 78 still stores $s^3$ and $s^2$ for a given value of "s". The y register 60 is set for the "s" value of the first V1 vertex 9 in the 0 vertex row 12 so that on the first cycle the PROM 78 outputs the signal 87 representing the ms word for $s^3$ and on the second cycle the signal 87 representing the ls word for $s^3$. The $s^3$ ms and $s^3$ ls signals 87 are input to the floating point multiplier B input 68 where they remain until that B input 68 is loaded again with a different signal. With those signals 87 at the floating point multiplier B input 68, signals 30 representing the values of s3 ms and s3 ls are input from the pipeline RAM 56 (Chart 4D, cycles 39 and 40) to the floating point multiplier A input 67 in the next two clock cycles (3 and 4). Thus, the floating point multiplier 69 is now conditioned to output the signal 85 representing the first term "$s^3(s3)$" of equation (11) for the x coordinate of the V1 vertex 9 in the 0 vertex row 12.

To start the processing of equation (23), in clock cycles 5 and 6 signals 30 representing the constants (dx/dt s3 ms) and (dx/dt s3 ls) (Chart 4H, cycles 123 and 124) are input from the pipeline RAM 56 to the floating point multiplier A input 67. In the next two cycles, the value of "s" for the first or V1 vertex 9 in the 0 vertex row 12 is input into the y register 60 and a bit is set to cause the PROM 61 to output the signals 87 representing the value of $s^2$ ms and $s^2$ ls. These signals 87 are sequentially input to the floating point multiplier B input 68. During the next four cycles (9–12), signals 30 representing the constants (dx/ds s2) ms, dx/ds s2 ls, s2 ms and s2 ls are read from the pipeline RAM 56 and are input to the floating point multiplier A input 67. The floating point multiplier 69 is now conditioned to output signals representing the first term "(dx/ds s2)s2" of equation (22) and the second term "$s^2(s2)$" of equation (11).

In cycles 13 and 14, signals 85 representing the product of the ms and ls words of "s3" and "s3" are output from the floating point multiplier C output 70. Referring to equation (11), this is the first term that required a multiply operation. The signals 85 representing the (s3) $s^3$ ms and ls words are input to the floating point adder input B register 73 in the same clock cycle. At the same time, signals 87 representing the value of s0 ms and ls words are input to the A input 72 of the floating point adder 71. The floating point adder 71 is now conditioned to add the first and fourth terms of equation (11).

In a similar manner, at cycles 15 and 16 the next signals 85 output from the floating point multiplier 69, are input to the floating point adder B input 73. These are the ms and ls words for (dx/dt s3) times the ms and ls words for ($s^3$), respectively. The signals 85 output in cycles 15 and 16 thus are the result of processing the ms and ls words of the first term "(dx/dt s3)*$s^3$" of equation (23).

In cycles 17 and 18, signals 86 representing the ms and ls words of the second term of equation (23), "(dx/dt s2)", are input to the floating point multiplier A input 67. Since the signals 87 representing the ms and ls words of $s^2$ are still input to the floating point multiplier B input 68, cycles 17 and 18 condition the floating point multiplier 69 for processing the second term of equation (22).

In cycles 19 and 20, the floating point multiplier 69 outputs the signals 85 representing the ms and ls words for the product "(dx/ds s2)*$s^2$", which are output from the floating point multiplier C output 70 and are input to the floating point adder B input 73. These signals 85 from the floating point multiplier C output 70 present the computation of the first term of equation (22). In cycles 19 and 20, the pipeline RAM 56 also supplies to the floating point adder A input 72 signals 30 representing the ms and ls words for (dx/ds s0).

In cycles 21 and 22, the floating point multiplier B input 68 receives signals 84 representing the values of the "s" ms word and the "s" ls word from the PROM 78. In those same two cycles, signals 85 representing the s2*$s^2$ ms and ls words are output from the floating point multiplier C output 70 and are input to the floating point adder B input 73. This reflects the processing of the second term of equation (11) for the x coordinate.

In cycles 23 and 24, signals 30 representing the s1 ms and ls words are input to the floating point multiplier A input 72 from the pipeline RAM 56. In the same two cycles, the floating point adder 71 outputs the signals 86 representing the ms and ls words of the sum of "(s3)$s^3$+s0". This reflects the addition of the first and last terms of equation (11). These signals 86 are input to the floating point adder A input 72.

In the next cycles 25 and 26, signals 30 representing the ms and ls words for the term "(dx/ds s1)" are input to the floating point multiplier A input 67 to initiate processing of the second term of equation (22). In the same two cycles, the floating point adder C output 74 outputs signals 86 representing the ms and ls words of the sum of the words that were input at cycles 13 and 14, thus representing the sum of the first and fourth terms of equation (23). Those signals 86 output from the floating point adder C output 74 are stored in the A REG 1 register 75 and then in the A REG 2 register 76 in cycles 26 and 27. In cycles 27 and 28, the floating point multiplier C output 70 outputs signals 85 representing the result of the multiplication of the second term of equation (23), i.e. (dx/dt s2)*$s^2$. Those signals 85 are input to the floating point adder B input 73 in cycles 27 and 28 and the signals 86 representing the sum of the first and fourth terms of equation (23) that were stored in the A REG 2 register 76 are input into the floating point adder A input 72 to enable the addition of the first and fourth terms of equation (23) with the second term (see cycles 37 and 38). In the next two cycles, signals 30 representing the ms and ls words for (dx/dt s1) are input to the floating point multiplier A input 67 representing the third term of equation (23). Since signals representing the ms and ls words for "s" are still applied to the floating point multiplier FPM B IN input 68, cycles 25–28 condition the floating point multiplier 69 to generate signals 85 (see cycles 35–38) representing "dx/ds s1*s" of equation (22) and "dx/dt s1*s" of equation (23).

At cycle 28, all necessary inputs have been provided to the floating point multiplier 69 and to the floating point adder 71 with respect to the initial value of "s" for the first or V1 vertex 9 in the 0 vertex row 12. Thus, at this juncture, the signals 87 input to the floating point multiplier 69 starting at cycle 29 represent the next value of "s". This corresponds to Process 2, Step 2.0.1.4 that indicates that the substeps 2.0.1.4.1 through 2.0.1.4.3 are performed for each "s" step size. Using the next "s" step value, equations (11), (22) and (23) are then processed to obtain the x coordinate value and the partial derivatives for the second vertex V3 in the 0 vertex row 12. Thus, the signals 87 input in cycles 29 through 50 for the second "s" value in the 0 vertex row 12 are for the same terms of the equations (11), (22) and (23) as were input in cycles 1 through 28.

To provide signals 87 representing the next value of "s", "$s^2$" and "$s^3$", the value of "s" in the processor 61 is incremented by "s" step size (i.e. 0.1) and the new "s" value is applied to the y register 60 to address the PROM 78 so that it will output the next values of $s^3$, $s^2$, and s as the signals 87.

Cycles 29 through 48 also continue the processing of the first or V1 vertex 9 which is, as described above based on the first "s" value. In particular, the floating point adder C output 74 outputs the signals 86 representing the ms and ls words for the term "(dx/ds s2)*$s^2$+(dx/ds s0)", which reflects the sum of the first and third terms of equation (22). In cycles 33 and 34, the floating point adder C output 74 outputs the signals 86 represeting the ms and ls words for the sums of the first, second and fourth terms of equation (11). This output of such signals 86 representing the first, second and fourth terms is at the same time input to the floating point adder A input 72. In these same cycles 33 and 34, the floating point multiplier 69 has output the signals 85 representing the product that is the third term of equation (11). In cycles 33 and 34, these signals 85 are input to the floating point adder B input 73 to facilitate the final addition step of equation (11), which is output in cycles 43 and 44 as the signals 86 representing the ms and ls words of the x coordinate for the V1 vertex 9 in the 0 vertex row 12.

Considering cycles 35 and 36, the floating point multiplier C output 70 outputs the signals 85 representing the ms and ls words for the product that is the second term of equation (22). In the same two cycles 35 and 36 these signals 85 are input to the floating point adder B input 73 to facilitate obtaining the sum of all of the terms of equation (22). To obtain the final sum of equation (22), on the same two cycles 35 and 36, the A REG 2 register 76 outputs the signals 88 representing the sum of the first and third terms of equation (22), which are applied to the floating point adder A input 72.

In cycles 37 and 38, the floating point multiplier C output register 70 outputs the signals 85 representing both the ms and ls words for the product that is the third term of equation (23). These signals 85 are input to the floating point adder B input 73. In the same two cycles 37 and 38, the signals 86 representing the ms and ls words of the first, second and fourth terms of equation (23) are output from the floating point adder C output 74 and are input to the floating point adder A input 72 to facilitate completion of the sums of the terms of equation (23).

In cycles 43–48, the signals 86 representing the ms and ls words for the x coordinate (equation (11)) of the V1 vertex 9 and the partial derivatives of that coordinate (equations (22) and (23)) are generated by the floating point adder 71. The signals 86 are stored in the font RAM 22.

At this juncture (cycle 48), the first value of "s" has been processed and the second value of "s" (for the V2 vertex 9 in the 0 vertex row 12) is still being processed. If at the end of cycle 48 there are additional "s" values to be processed in order to process all of the x coordinates and associated x partial derivatives for the V1 to V21 vertices 9 along the 0 vertex row 12, then the next address input to the WCS 36 will be that which causes cycles 21 through 48 to occur again to finish processing the current "s" and then to start processing the next "s" value for the 0 vertex row 12 (see "A" in Chart 5A). However, during the processing of the successive "s" values across the 0 vertex row 12 for the vertices V1, V3, V5, etc. through Vn−1, the processor 61 has been decrementing from an initial value representing the total number "n" of "s" values in the 0 vertex row 12. When the n−1 "s" value has been processed, the processor 61 outputs a control signal 89 to the branch logic circuit 42 to cause a new next address signal 89 to be input to the WCS 36. The new next address signal 43 initiates a "last vertex routine" for processing the last "s" value in the 0 vertex row 12.

This last "s" value routine is described in Charts 5C through F, starting at cycle 49. The routine is the same as the above routines for the prior "s" values, but does not include any further inputs for an "s" value following the last "s" value. Accordingly, the last vertex routine may be understood by reference to Charts 5C through 5F from cycles 49 through 76. The last "s" routine results in outputs at cycles 71 through 76 of the ms and ls words for the x coordinate and the partial derivatives with respect to "s" and "t" for the last value of "s" based on processing equations (11), (22) and (23).

COMPUTATION OF Y POINT COORDINATES AND PARTIAL DERIVATIVES

The above description of operations to obtain the signals 86 representing the x point coordinates and the partial derivatives is based on a subroutine that conforms to Process Step 2.0.1.4 and that was called by an instruction from the WCS 36. When the last computation is completed for the last "s" value of the 0 vertex row 12, which is for the last or V21 vertex 9 in the example shown in FIGS. 2 and 3, the next instruction that is read by the push/pop RAM 48 is a statement to pop, which causes the next address signal 40 to be read from the push/pop RAM 48. The address read is a next address signal 40 for an instruction for performing Process Steps 2.0.1.1 through 2.0.1.3 for the y coordinate to calculate signals 86 representing the multipliers in equation (13) and in the y coordinate equations corresponding to equations (22) and (23). These signals are written into the pipeline RAM 58. When all of the y coefficient multipliers have been written into the pipeline RAM 58, the push/pop RAM 48 pops to initiate the above-described operation of the WCS 36 to output the next address signal 40 to the control register 35. The instruction signal 39 output from the control register 35 calls the subroutine for Process 2 Steps 2.0.1.4, so that the signals 30 representing the y coefficient multipliers are read from the pipeline RAM 58. Also, the signals 87 representing the "s", "$s^2$" and "$s^3$" values are read from the "s", "t" PROM 78 as described above. The signals 86 are stored in the FONT RAM 22 and represent the values of the y coordinates for the V1 through V21 vertices 9 in the 0 vertex row 12. Also, the signals 86 representing the corresponding partial derivatives with respect to "s" and "t" for each such vertex V1 through V21 in the 0 vertex row 12 are stored in the font RAM 22.

COMPUTATION OF Z POINT COORDINATES AND PARTIAL DERIVATIVES

The same operation then occurs to end the above y coordinate computation and initiate the z coordinate computation as was described above for the x to y coordinate transition. Step 2.0.1.4 has been completed when the z coordinate computation is completed. The push-/pop RAM 48 then reads a statement to pop and the next address signal 40 is sent to the WCS 36 to cause the control register 35 to call the subroutine for performing step 2.0.2, which is described below in respect to Charts 6A through 6E.

OBTAIN POINT NORMAL VECTORS

Referring to Charts 6A through 6E and the point normal vector equation (15), it is recalled that the signals 86 representing the partial derivatives of x, y, and z with respect to "s" and "t" for each of the V1 through V21 vertices 9 in the 0 vertex row 12 have been stored in the font RAM 22.

Based on the descriptions above of Charts 5A through 5F, the following Charts 6A through 6E may be understood as describing how the signals 86 representing the ms and ls words of the point normal V1 vertex 9 of the 0 vertex row 12 are obtained. As an example, as shown below signals 86 are indicated as "NORM×ms" and "NORM×ls" at cycles 27 and 28 representing point normal x in Equation (15) for the V1 vertex 9.

As indicated at cycle 43, until the point normal z for the Vn−1 vertex 9 in the given vertex row 12 has been processed, the subroutine loops and performs operations noted at cycles 17 through 43 in respect to each of the vertices 9 of the 0 vertex row 12 up to, but not including, the Vn vertex 9. In the example shown in FIGS. 2 and 3, the x, y, and z point normal coordinates for the V1, V3–V19 vertices 9 are processed. When the V21 vertex is next, a subroutine is called via the push-/pop RAM 48 and the WCS 36 to perform the "last one" cycles 44–67 to output the signals 86 representing the x, y, and z point normals for the V21 vertex 9.

CHART 6A
STEP 2.0.2.1, POINT NORMAL VECTORS

| Cycle | FPM A IN | FPM B IN | FPM C OUT |
|---|---|---|---|
| 1 | | dz/ds ms | |
| 2 | | dz/ds ls | |
| 3 | dy/dt ms | | |
| 4 | dy/dt ls | | |
| 5 | | dz/dt ms | |
| 6 | | dz/dt ls | |
| 7 | dy/ds ms | | |
| 8 | dy/ds ls | | |
| 9 | dx/ds ms | | |
| 10 | dx/ds ls | | |
| 11 | | dx/dt ms | |
| 12 | | dx/dt ls | |
| 13 | dz/ds ms | | dz/ds*dy/dt ms |
| 14 | dz/ds ls | | dz/ds*dy/dt ls |
| 15 | dy/ds ms | | |
| 16 | dy/ds ls | | |

CHART 6A-continued
STEP 2.0.2.1, POINT NORMAL VECTORS

| Cycle | FPM A IN | FPM B IN | FPM C OUT |
|---|---|---|---|
| 17 | A | | dy/ds*dz/dt ms |
| 18 | | | dy/ds*dz/dt ls |
| 19 | | dy/dt ms | dx/ds*dz/dt ms |
| 20 | | dy/dt ls | dx/ds*dz/dt ls |
| 21 | dx/ds ms | | |
| 22 | dx/ds ls | | |
| 23 | | | dz/ds*dx/dt ms |
| 24 | | | dz/ds*dx/dt ls |
| 25 | NEXT | dz/ds ms | dy/ds*dx/dt ms |
| 26 | | dz/ds ls | dy/ds*dx/dt ls |
| 27 | dy/dt ms | | |
| 28 | dy/dt ls | | |
| 29 | | dz/dt ms | |
| 30 | | dz/dt ls | |
| 31 | | | dx/ds*dy/dt ms |

CHART 6B
STEP 2.0.2.1, POINT NORMAL VECTORS

| Cycle | FPA A IN | FPA B IN | FPA C OUT |
|---|---|---|---|
| 1 | | | |
| 2 | | | |
| 3 | | | |
| 4 | | | |
| 5 | | | |
| 6 | | | |
| 7 | | | |
| 8 | | | |
| 9 | | | |
| 10 | | | |
| 11 | | | |
| 12 | | | |
| 13 | | FPM OUT | |
| 14 | | FPM OUT | |
| 15 | | | |
| 16 | | | |
| 17 | FPM OUT | | |
| 18 | FPM OUT | | |
| 19 | | FPM OUT | |
| 20 | | FPM OUT | |
| 21 | | | |
| 22 | | | |
| 23 | FPM OUT | | |
| 24 | FPM OUT | | |
| 25 | | FPM OUT | |
| 26 | | FPM OUT | |
| 27 | | | NORM x ms |
| 28 | | | NORM x ls |
| 29 | | | |
| 30 | | | |
| 31 | FPM OUT | | |

CHART 6C
STEP 2.0.2.1, POINT NORMAL VECTORS

| Cycle | FPM A IN | FPM B IN | FPM C OUT |
|---|---|---|---|
| 32 | | | dx/ds*dy/dt ls |
| 33 | dy/ds ms | | |
| 34 | dy/ds ls | | |
| 35 | dx/ds ms | | |
| 36 | dx/ds ls | | |
| 37 | | dx/dt ms | dz/ds*dy/dt ms |
| 38 | | dx/dt ls | dz/ds*dy/dt ls |
| 39 | dz/ds ms | | |
| 40 | dz/ds ls | | |
| 41 | dy/ds ms | | |
| 42 | dy/ds ls | | |
| 43 | IF MORE GO TO A | | dy/ds*dz/dt ms |
| 44 | LAST ONE | | dy/ds*dz/dt ls |
| 45 | | dy/dt ms | dx/ds*dz/dt ms |
| 46 | | dy/dt ls | dx/ds*dz/dt ls |
| 47 | dx/ds ms | | |
| 48 | dx/ds ls | | |

CHART 6C-continued

STEP 2.0.2.1, POINT NORMAL VECTORS

| Cycle | FPM A IN | FPM B IN | FPM C OUT |
|---|---|---|---|
| 49 | | | dz/ds*dx/dt ms |
| 50 | | | dz/ds*dx/dt ls |
| 51 | | | dy/ds*dx/dt ms |
| 52 | | | dy/ds*dx/dt ls |
| 53 | | | |
| 54 | | | |
| 55 | | | |
| 56 | | | |
| 57 | | | dx/ds*dy/dt ms |
| 58 | | | dx/ds*dy/dt ls |
| 59 | | | |
| 60 | | | |

CHART 6D

STEP 2.0.2.1, POINT NORMAL VECTORS

| Cycle | FPA A IN | FPA B IN | FPA C OUT |
|---|---|---|---|
| 32 | FPM OUT | | |
| 33 | | | NORM Y ms |
| 34 | | | NORM Y ls |
| 35 | | | |
| 36 | | | |
| 37 | | FPM OUT | |
| 38 | | FPM OUT | |
| 39 | | | |
| 40 | | | |
| 41 | | | NORM Z ms |
| 42 | | | NORM Z ls |
| 43 | FPM OUT | | |
| 44 | FPM OUT | | |
| 45 | | FPM OUT | |
| 46 | | FPM OUT | |
| 47 | | | |
| 48 | | | |
| 49 | FPM OUT | | |
| 50 | FPM OUT | | |
| 51 | | FPM OUT | |
| 52 | | FPM OUT | |
| 53 | | | NORM X ms |
| 54 | | | NORM X ls |
| 55 | | | |
| 56 | | | |
| 57 | FPM OUT | | |
| 58 | FPM OUT | | |
| 59 | | | NORM Y ms |
| 60 | | | NORM Y ls |
| 61 | | | |

CHART 6E

STEP 2.0.2.1, POINT NORMAL VECTORS

| Cycle | FPA A IN | FPA B IN | FPA C OUT |
|---|---|---|---|
| 62 | | | |
| 63 | | | |
| 64 | | | |
| 65 | | | |
| 66 | | | NORM Z ms |
| 67 | | | NORM Z ls |

All of the signals 86 representing the x, y, and z point normal coordinates for the V1 through V21 vertices 9 are stored in the font RAM 22 to complete step 2.0.2.1 for the 0 vertex row 12, which represents the first "t" step.

PROCESS VERTEX ROW 1 ACCORDING TO PROCESS 2

Referring again to Process 2, Step 2.1 calls for incrementing the "t" step size from 0 to 0.2. This is done by a pop command at the end of step 2.0.2.1 that causes the push/pop RAM 48 to output the next address signal 40 to the WCS 36 to cause the control register 35 to call the subroutine for performing Step 2.1 and to decrement the processor register 26. When the "t" step size has been incremented to 0.2, Step 2.0.1 is followed for that "t" step size so that the 1 vertex row 14 will be processed. As a result of performing Process 2, for each of the V1 through V22 vertices 9 of the vertex rows 12 and 14, the x, y and z coordinates and the corresponding point normal vectors have been obtained. When the last operation of Step 2.0.-1.4 has been completed, the next instruction that is read is to "pop", which causes the next address signal 40 to be read from the stack RAM 48. This address signal 40 is applied to the WCS 36 which outputs an instruction signal 39 to the control register 35 for performing Process 3.

OBTAIN POINT INTENSITY

Reference is made to Process 3 and to Charts 7A through 7F.

CHART 7A

PROCESS 3 - TRANFORM POINT AND OBTAIN POINT INTENSITY

| Cycle | FPM A IN | FPM B IN | FPM C OUT |
|---|---|---|---|
| 1 | PNZ ms | PNZ ms | |
| 2 | PNZ ls | PNZ ls | |
| 3 | SUN Z ms | PNZ ms | |
| 4 | SUN Z ls | PNZ ls | |
| 5 | PNY ms | PNY ms | |
| 6 | PNY ls | PNY ls | |
| 7 | SUN Y ms | PNY ms | |
| 8 | SUN Y ls | PNY ls | |
| 9 | a33 ms | Z ms | |
| 10 | a33 ls | Z ls | |
| 11 | a32 ms | Z ms | PNZ$^2$ ms |
| 12 | a32 ls | Z ls | PNZ$^2$ ls |
| 13 | a31 ms | Z ms | Z SUN*PNZ ms |
| 14 | a31 ls | Z ls | Z SUN*PNZ ls |
| 15 | | | PNY$^2$ ms |
| 16 | | | PNY$^2$ ls |
| 17 | PNX ms | PNX ms | Y SUN*PNY ms |
| 18 | PNX ls | PNX ls | Y SUN*PNY ls |
| 19 | SUN X ms | | Z * a33 ms |
| 20 | SUN X ls | | Z * a33 ls |
| 21 | a23 ms | Y ms | Z * a32 ms |
| 22 | a23 ls | Y ls | Z * a32 ls |
| 23 | a22 ms | Y ms | Z * a31 ms |
| 24 | a22 ls | Y ls | Z * a31 ls |
| 25 | a21 ms | Y ms | |

CHART 7B

PROCESS 3 - TRANSFORM POINT AND OBTAIN POINT INTENSITY

| Cycle | FPA A IN | FPA B IN | FPA C OUT |
|---|---|---|---|
| 1 | | | |
| 2 | | | |
| 3 | | | |
| 4 | | | |
| 5 | | | |
| 6 | | | |
| 7 | | | |
| 8 | | | |
| 9 | | | |
| 10 | | | |
| 11 | | FPM OUT | |
| 12 | | FPM OUT | |
| 13 | | | |
| 14 | | | |
| 15 | FPM OUT | | |
| 16 | FPM OUT | | |
| 17 | Z SUN*PNZ ms | | FPM OUT |
| 18 | Z SUN*PNZ ls | | FPM OUT |
| 19 | a43 ms | | FPM OUT |

CHART 7B-continued

PROCESS 3 - TRANSFORM POINT AND OBTAIN POINT INTENSITY

| Cycle | FPA A IN | FPA B IN | FPA C OUT |
|---|---|---|---|
| 20 | a43 ls | FPM OUT | |
| 21 | a42 ms | FPM OUT | |
| 22 | a42 ls | FPM OUT | |
| 23 | a41 ms | FPM OUT | |
| 24 | a41 ls | FPM OUT | |
| 25 | | | $PNZ^2 + PNY^2$ ms |
| 26 | | | $PNZ^2 + PNY^2$ ls |
| 27 | $PNZ^2 + PNY^2$ ms | FPM OUT | $Z + Y (SUN*PN)$ms |
| 28 | $PNZ^2 + PNY^2$ ls | FPM OUT | $Z + Y (SUN*PN)$ls |
| 29 | $Z + Y (SUN*PN)$ms | FPM OUT | $Z*a33 + a43$ ms |
| 30 | $Z + Y (SUN*PN)$ls | FPM OUT | $Z*a33 + a43$ ls |
| 31 | | FPM OUT | $Z*a32 + a42$ ms |

CHART 7C

PROCESS 3 - TRANSFORM POINT AND OBTAIN POINT INTENSITY

| Cycle | FPM A IN | FPM B IN | FPM C OUT |
|---|---|---|---|
| 26 | a21 ls | Y ls | |
| 27 | | | $PNX^2$ ms |
| 28 | | | $PNX^2$ ls |
| 29 | | | X SUN*PNX ms |
| 30 | | | X SUN*PNX ls |
| 31 | a13 ms | X ms | Y * a23 ms |
| 32 | a13 ls | X ls | Y * a23 ls |
| 33 | a12 ms | | Y * a22 ms |
| 34 | a12 ls | | Y * a22 ls |
| 35 | a11 ms | | Y * a21 ms |
| 36 | a11 ls | | Y * a21 ls |
| 37 | | SUN DIST$^2$ ms | |
| 38 | | SUN DIST$^2$ ls | |
| 39 | PN DIST$^2$ ms | | |
| 40 | PN DIST$^2$ ls | | |
| 41 | | | X * a13 ms |
| 42 | | | X * a13 ls |
| 43 | A REG 3 | A REG 3 | X * a12 ms |
| 44 | A REG 3 | A REG 3 | X * a12 ls |
| 45 | | | X * a11 ms |
| 46 | | | X * a11 ls |
| 49 | | FPM OUT | SUN*PN DIST$^2$ ms |
| 50 | | FPM OUT | SUN*PN DIST$^2$ ls |
| 53 | $\dfrac{\text{RECIP ms}}{\text{SUN*PN DIST}^2 \text{ ms}}$ | | Intensity Dot$^2$ ms |
| 54 | $\dfrac{\text{RECIP ls}}{\text{SUN*PN DIST}^2 \text{ ls}}$ | | Intensity Dot$^2$ ls |
| 55 | $\dfrac{\text{RECIP ms}}{\text{SUN*PN DIST}^2 \text{ ms}}$ | A REG 2 | |
| 56 | $\dfrac{\text{RECIP ls}}{\text{SUN*PN DIST}^2 \text{ ls}}$ | A REG 2 | |

CHART 7D

PROCESS 3 - TRANSFORM POINT AND OBTAIN POINT INTENSITY

| Cycle | FPA A IN | FPA B IN | FPA C OUT |
|---|---|---|---|
| 32 | A REG 2 | FPM OUT | $Z*a32 + a42$ ls |
| 33 | A REG 2 | FPM OUT | $Z*a31 + a41$ ms |
| 34 | A REG 2 | FPM OUT | $Z*a31 + a41$ ls |
| 35 | A REG 2 | FPM OUT | |
| 36 | A REG 2 | FPM OUT | |
| 37 | | | PN DIST$^2$ ms |
| 38 | | | PN DIST$^2$ ls |
| 39 | | | Intensity Dot ms |
| 40 | | | Intensity Dot ls |
| 41 | FPA OUT | FPM OUT | $Y*a23+Z*a33+a43$ms |
| 42 | FPA OUT | FPM OUT | $Y*a23+Z*a33+a43$ls |
| 43 | FPA OUT | FPM OUT | $Y*a22+Z*a32+a42$ms |

CHART 7D-continued

PROCESS 3 - TRANSFORM POINT AND OBTAIN POINT INTENSITY

| Cycle | FPA A IN | FPA B IN | FPA C OUT |
|---|---|---|---|
| 44 | FPA OUT | FPM OUT | $Y*a22+Z*a32+a42$ls |
| 45 | FPA OUT | FPM OUT | $Y*a21+Z*a31+a41$ms |
| 46 | FPA OUT | FPM OUT | $Y*a21+Z*a31+a41$ls |
| 47 | | | |
| 48 | | | |
| 49 | | | |
| 50 | | | |
| 51 | | | |
| 52 | | | |
| 53 | | | |
| 54 | | | |
| 55 | | | |
| 56 | | | |
| 57 | | | Z' ms |
| 58 | | | Z' ls |
| 59 | | | Y' ms |
| 60 | | | Y' ls |
| 61 | | | X' ms |
| 62 | | | X' ls |

CHART 7E

PROCESS 3 - TRANSFORM POINT AND OBTAIN POINT INTENSITY

| Cycle | FPM A IN | FPM B IN | FPM C OUT |
|---|---|---|---|
| 63 | | | $\dfrac{\text{SUN*PN DIST}^2}{\text{SUN*PN DIST}^2 \text{ ms}}$ |
| 64 | | | $\dfrac{\text{SUN*PN DIST}^2}{\text{SUN*PN DIST}^2 \text{ ls}}$ |
| 65 | | FPM OUT | $\dfrac{\text{INT DOT}^2}{\text{SUN*PN DIST}^2 \text{ ms}}$ |
| 66 | | FPM OUT | $\dfrac{\text{INT DOT}^2}{\text{SUN*PN DIST}^2 \text{ ls}}$ |
| 73 | FPA OUT | | |
| 74 | FPA OUT | | |
| 83 | | | INTENSITY ms |
| 84 | | | INTENSITY ls |

CHART 7F

PROCESS 3 - TRANSFORM POINT AND OBTAIN POINT INTENSITY

| Cycle | FPA A IN | FPA B IN | FPA C OUT |
|---|---|---|---|
| 63 | 2 ms | FPM OUT | A − B |
| 64 | 2 ls | FPM OUT | |
| 73 | | | $2 - \dfrac{\text{SUN*PN DIST}^2}{\text{SUN*PN DIST}^2 \text{ ms}}$ |
| 74 | | | $2 - \dfrac{\text{SUN*PN DIST}^2}{\text{SUN*PN DIST}^2 \text{ ms}}$ |

Referring also to FIGS. 4A, 4B, and 5, it will be recalled that equation (33) for the point intensity included, as the denominator of the fraction, the point normal distance squared times the sun object space distance squared. It is also recalled that equation (31) defined point normal distance squared. Process 3 starts in cycles 1 and 2 by entering the signals 86 representing the ms and ls words for the point normal z for the V1 vertex 9 into both the FPM A IN input 67 and FPM B IN input 68 of the floating point multiplier 69. (see "PNZ ms"

and "PNZ ls" in Chart 7A). At cycles 11 and 12, the signals 85 representing the ms and ls words of the point normal z squared (see $PNZ^2$ ms, for example) are output and are input to the FPA B IN input 73. Thus, the third term of equation (31) has been processed and the signals 85 entered into the floating point adder 71 to initiate adding it to one of the other two terms of equation (31).

In cycles 5 and 6, the signals 86 representing the ms and ls words for the point normal y for the V1 vertex 9 are entered into the A and B inputs 67 and 68 of the floating point multiplier 69 to initiate the squaring operation required for the second term of equation (31). Signals 85 representing the ms and ls words of the squared point normal y term are output at cycles 15 and 16 and at the same time are entered into the FPA A IN input 72 to condition the floating point adder 71 to output the signals 86 representing the sum of the second and third terms of equation (31) at cycles 25 and 26. (see $PNZ^2 + PNY^2$ ms, for example). These signals 86 are entered into the A REG 1 register 75 at cycles 25 and 26 and then to the A REG 2 register 76 in cycles 26 and 27. Thus, the completed second and third terms of the equation (31) are held in the A REG 1 register 75 and the A REG 2 register 76 awaiting squaring of the point normal x, which is the first term of the equation (31). This is done in cycles 17 and 18 where the signals 86 representing the ms and ls words for point normal x of the V1 vertex 9 are entered into the A and B inputs 67 and 68 of the floating point multiplier 69. At cycles 27 and 28, the floating point multiplier 69 outputs the signals 85 representing the ms and ls words of the square of point normal x for the V1 vertex 9. These signals 85 are at the same time input to the FPA B IN input 73. The prior signals 86 representing the second and third terms of equation (31) are input from the A REG 2 register 76 to the FPA A IN input 72. In cycles 37 and 38, the signals 86 representing the ms and ls words for the (equation (31)) point normal distance squared (see PN $DIST^2$ ms and PN $DIST^2$ ls) are output from the FPA C OUT output 74 and at the same time are input to the A REG 1 register 75. In successive cycles, these signals are shifted to the A REG 2 register 76.

It is also recalled that the point intensity dot that is the numerator of the equation (33) includes the point normals times the sun object space for the x, y and z coefficients. Referring to Chart 7A, it will be recalled that in cycles 1 and 2, the signals 86 representing the ms and ls words of the point normal z for the V1 vertex 9 were entered to the respective FPM A IN and FPM B IN inputs 67 and 68. These signals 86 are still applied to the FPM B IN input 68 at cycles 3 and 4, at which time signals 86 representing the sun object space z ms and ls words are applied to the FPM A IN input 67. (see SUN Z ms, for example). Thus, at the end of cycles 3 and 4, the floating point multiplier 69 is conditioned to multiply the third term of equation (32). The signals 85 representing this term are output at cycles 13 and 14 at the FPM C OUT output 70. These signals 85 output in cycles 13 and 14 are written into the A REG 1 register 75 and in cycles 14 and 17 the signals 85 representing the third term of equation (32) are written into the A REG 2 register 76.

By reference to cycles 7, 8 and 19, 20 on Chart 7A, it may be understood that the multiplication of the second and first terms of equation (32) occurs and is output respectively in the form of signals 85 at cycles 17 and 18 representing the second term of equation (32), and at cycles 29 and 30 outputting signals 85 representing the first term of equation (32). These respective signals 85 are input directly to the FPA B IN input 73 with the third term of equation (32) at cycles 17 and 18 to condition the floating point adder 71 to add the third term of equation (32) with the second term of equation (32). At cycles 27 and 28, signals 86 representing the ms and ls words of such second and third terms of equation (32) are output and are input to the A REG 1 register 75. In cycles 28 and 29, such second and third terms are written into the A REG 2 register 76. Referring to Chart 7A, cycles 29 and 30, it may be understood that the signals 85 representing the first term of equation (32) are output from the FPM C OUT output 70 and are input directly to the floating point adder FPA B IN input 73. Also, in cycles 29 and 30, the signals 86 stored in A REG 2 register 76 representing the second and third terms of equation (32) are applied to the FPA A IN input 72 to condition the floating point adder 71 to output signals representing the point intensity dot of equation (32). Such signals 86 are shown output from the floating point adder 71 at cycles 39 and 40 under the "FPA C OUT" heading and are indicated by the respective "intensity dot" ms and ls. These signals 86 are written directly into the A REG 1 register 75 and in the next cycles into the A REG 2 register 76. Then in cycles 41 and 43 they are written into the A REG 3 register 77.

To continue processing equation (33), in cycles 39 and 40 (Chart 7C), the signals 85 representing PN $DIST^2$ ms and ls are read from the A REG 2 register 76 and applied to the FPM A IN input 67 for multiplication with the signals 85 representing sun object space distance squared (see "SUN $DIST^2$ ms and ls" in Chart 7C, cycles 37 and 38). The product, which is the demoninator of equation (33), is represented by the signals 85 at cycles 49 and 50 (see "$SUN^2$ * PN $DIST^2$" ms and ls). To square point intensity dot, the signals 86 in the A REG 3 register 77 are applied to both the FPM A and B in inputs 67 and 68 (Chart 7C, cycles 43 and 44), and the signals 85 are output at cycles 53 and 54 to represent the numerator of equation (33) (see "Intensity $Dot^2$" ms and ls at cycles 53 and 54, Chart 7C).

Considering the denominator of equation (33), the signals 85 from the floating point multiplier 69 (cycles 49 and 50, Chart 7C) are applied to the reciprocal PROM 59 in cycles 51 and 52. In cycles 52 and 53, signals 90 representing the approximate reciprocal are output from the PROM 59. To obtain precise results from the division, instead of multiplying the reciprocal of the denominator by the signal 85 representing the intensity dot which is output from the floating point multiplier 69 cycles 53 and 54, the following steps are performed:

$$n/d = n/d' * (2 - d/d')$$

where $1/d'$ = approximately 1/(sun object space distance)$^2$ * (point normal distance)$^2$ from the reciprocal PROM 59, d = (sum object spaced distance)$^2$ * (point normal distance)$^2$, and n = intensity dot$^2$.

In cycles 63 and 64, signals 85 are output and represent "d/d'", in cycles 73 and 74, signals 86 are output to represent "$2 - d/d'$".

To conclude this processing and obtain the point intensity, the output signals 86 from the floating point adder 71 in cycles 73 and 74 are multiplied by the signals 85 from the floating point multiplier in cycles 65 and 66 to obtain the signals 85 and 86 representing the point intensity.

In addition to the intensity calculation description above, it may be understood that at cycles 9 through 14 (Chart 7A) at cycles 19 through 24 (Chart 7B), and at cycles 32 through 36 (Chart 7C), signals 24 and 83 are input to the respective floating point multiplier 69 and the floating point adder 71 to transform each vertex 9 using a standard transformation matrix having elements such as a33, a32, and a31 represented by signals 83 from the matrix RAM 52. These signals 83 are input to the FPM A IN input 67 in cycles 9 through 14, for example. In particular, the x, y, and z coordinate signals 86 representing the V1 vertex 9 are read from the font RAM 22 as the signals 24. At the above cycles, the signals 24 and 83 are input as noted above and processed to transform the V1 vertex 9.

The transformation results in signals 86 output at cycles 57 and 58 (Chart 7D) for the transformed z (or z') coordinate, at cycles 59 and 60 for the transformed y (or y') coordinate and at cycles 61 and 62 for the transformed x (or x') coordinate. The signals 86 representing the transformed V1 vertex 9 are stored in the FIFO 81. As indicated in Process 3, each of the V2 through V22 vertices 9 is seriatim and signals 86 representing the transformed vertices 9 are output and stored in the FIFO 81 for use in Process 4.

Referring now to Process 4, it may be understood that the process of defining the polygons 15 starts with Step 4.1 in which the signals 86 representing the transformed V1 vertex and the corresponding point intensity are read from the FIFO 81 (see "get 1st x, y, z, I", Step 4.1). These signals 86 are written into a RAM 89 (FIG. 4B). Steps 4.2 and 4.3 are performed and the signals 86 corresponding to the V2 and V3 vertices 9 are written into the RAM 89. In Step 4.4, these signals 86 are output as the vertex signals 10 representing the P1 polygon 15. In particular, when the signals 86 representing the transformed V1, V2 and V3 vertices 9 and the corresponding point intensities have been written into the FIFO, the control circuit 23 outputs an instruction to read such signals 86 representing the V1 vertex 9 from the FIFO 81 into selected storage locations in the RAM 89. The next instruction from the circuit 23 causes the signals 86 representing the V2 vertex 9 to be read and written into the RAM 89. The vertex signals 10 are then output to represent the P1 polygon 15. This output is via the terminal 82 connected to a raster-scan output device 91 having a video screen 92 (FIG. 4B). The raster-scan output device 91 responds to the vertex signals 10 that represent the polygons 15 and displays the object on the video screen 92.

The next instruction is to loop, which results in an instruction to read from the FIFO 81 the signals 86 representing the transformed coordinates and the intensity of the V4 vertex 9. These signals 86 are written in the RAM 89 over those of the V1 vertex 9 so that the P2 polygon 15 is represented. In response to an instruction from the circuit 23, the RAM 89 is read and the vertex signals 10 are output to represent the V2, V3 and V4 vertices 9 of the P2 polygon 15 and the corresponding point intensities. This continues as defined in Process 4 until the P20th polygon 15 has been processed. Then, the vertex row 19 is processed as described above and the signals 86 representing the V24, V26 . . . V44 vertices 9 are obtained and written into the font RAM 22 in place of the signals 86 that represented the V1, V3 . . . V21 vertices 9. Processes 3 and 4 are then performed as described above.

This continues until the P100th polygon 15 has been processed by outputting the vertex signals 10 representing the three vertices 9 of the P100th polygon 15 and the point normals corresponding thereto. At this time, the register 26 of the processor 61 outputs a "register equals zero" signal 89 which causes the control circuit 23 to stop.

While the preferred embodiment has been described in order to illustrate the fundamental relationships of the present invention, it should be understood that numerous variations and modifications may be made to these embodiments without departing from the teachings and concepts of the present invention. Accordingly, it should be clearly understood that the form of the present invention described above and shown in the accompanying drawings is illustrative only and is not intended to limit the scope of the invention to less than that described in the following claims.

What is claimed:

1. A method of representing an object having a surface for graphical display on a video display screen by controlling values of electrical signals that represent coordinates of vertices that define points on the surface of said object, comprising the steps of:
   selecting equations having at least two parameters for defining said coordinates of said vertices;
   identifying a first of said parameters and keeping the value of same at a first amount;
   factoring said equations to express each of said coordinates in terms of a first constant and of a variable that is a function of a second one of said parameters;
   sequentially solving said equations by substituting a predetermined series of values for said second one of said parameters to define first values for each of said coordinates for each vertex in a series of said vertices that form a first row of said points on the surface of said object;
   controlling the values of certain of said electrical signals by using said first values for each of said coordinates in said first row to cause said signals to represent each of said coordinates of said vertices that form said first row of points;
   repeating said factoring and solving steps using a second amount for the value of said first parameter and the same predetermined series of values for said second one of said parameters to define second values for each of said coordinates for each vertex in a second series of said vertices that form a second row of said points on the surface of said object;
   controlling the values of certain other ones of said electrical signals by using said second values for each of said coordinates in said second row to cause said other signals to represent each of said coordinates of said vertices that form said second row of points;
   the entire surface of said object being represented by more than two of said rows;
   selecting said electrical signals that represent at least a first coordinate of first and second ones of said vertices at one end of said first row;
   selecting said electrical signal that represents at least said first coordinate of one said vertex from the corresponding end of said second row;
   said selecting steps identifying those electrical signals that represent a first polygon that defines certain of said points on the surface of said object to be displayed;

selecting said electrical signal that represents at least said first coordinate of a next vertex of said second row and discarding said electrical signal that represents said coordinate of said first vertex of said first row to generate and store those electrical signals that represent a next polygon adjacent said last-represented polygon for defining an additional point on the surface of said object; and displaying said object on said video display screen in response to said signals that represent said first and next polygons.

2. A method of representing an object for graphical display according to claim 1, including the additional step of:

continuing said selecting of said electrical signals that represent coordinates of next vertices by alternately and sequentially selecting said electrical signals that represent the coordinates of said next vertex from said first row and then said next vertex from said second row and discarding said electrical signal that represents the coordinate of a selected previous vertex so that additional electrical signals are generated for representing a series of polygons formed between said vertices of said first and second rows; and displaying said object in response to said additional electrical signals representing said series of polygons.

3. A method of representing an object for graphical display according to claim 2, including the additional steps of:

continuing said alternate and sequential selecting and said displaying until additional electrical signals are selected and displayed for representing all of said vertices of said first and second rows;

repeating said factoring and solving steps using a third amount for the value of said first parameter and the same predetermined series of values for said second one of said parameters to define third values for each of said coordinates for each vertex in a third row of said points on the surface of said object;

controlling the values of certain other of said electrical signals by using said third values to cause said certain other signals to represent a third series of said vertices that form said third row of said points on said surface of said object;

storing said electrical signals that represent said coordinates of said third row of vertices in place of said electrical signals that represent said coordinates of said first row of vertices; and repeating all of said selecting steps and said displaying step with respect to said second and third rows to continue to display said object on said video screen.

4. A method of representing an object for graphical display according to claim 3, including the further steps of:

repeating the steps of claim 4 using successive amounts for the value of said first parameter to successively control the values of electrical signals that represent at least said first coordinate of successive series of vertices that define successive rows of vertices and to display said successive series of vertices until said amount of the value of said first parameter is a selected amount.

5. A method of representing an object for graphical display on a video display screen, said object having a surface and said representing being by controlling values of output electrical signals that represent point normals of vertices that define the surface of said object, the vertices being defined by coordinates, wherein said point normals are used to determine the point intensity of each of said vertices, comprising the steps of:

selecting point coordinate equations having at least two parameters for defining said coordinates of said vertices;

differentiating said point coordinate equations with respect to each of said parameters to obtain a partial derivative of each said coordinate with respect to each of said parameters;

factoring each said differentiated equation to express said coordinates in terms of a first constant and of a variable that is a function of a second of said parameters;

sequentially solving said equations by substituting a predetermined series of values for said second of said parameters to control the values of first electrical signals as a function of said partial derivative of each of said coordinates with respect to each of said parameters for each vertex of a first series of said vertices that form a first row of said vertices;

combining said first electrical signals that represent said partial derivatives of said coordinates with respect to each of said parameters to obtain said output electrical signals that represent the cross products of said partial derivatives for each said vertex of said first row of said vertices that define the surface of said object, wherein said output electrical signals for said coordinates of a given vertex of said vertices represent the point normal for said given vertex;

repeating said factoring and solving steps using a second amount for the value of said first parameter to change said first constant and using the same predetermined series of values for said second of said parameters to control the values of second electrical signals as a function of said partial derivative of each of said coordinates with respect to each of said parameters for each vertex of a second series of said vertices that form a second row of said vertices;

combining said second electrical signals, that represent said partial derivatives of said coordinates with respect to each of said parameters to obtain said output electrical signals that represent the cross products of said partial derivatives for each said vertex of said second row of said vertices that define the surface of said object, wherein said output electrical signals for said coordinates of a given vertex of said vertices represent the point normal for said given vertex;

selecting a first of said output electrical signals that represents the cross product of said partial derivatives for a first of said vertices at one end of said first row;

varying the value of said first selected output electrical signal for representing the point intensity of said first vertex;

storing said varied first selected output electrical signal;

selecting a second of said output electrical signals that represents the cross product of said partial derivatives for the next one of said vertices at said one end of said first row;

varying the value of said second output electrical signal for representing the point intensity of said next one of said vertices;

storing said varied second output electrical signal;

selecting a third of said output electrical signals that represents the cross product of said partial derivatives for a first of said vertices at the corresponding end of said second row;

varying the value of said third electrical signal for representing the point intensity of said first vertex at said corresponding end of said second row;

storing said varied third output electrical signal;

said stored varied first, second and third output electrical signals representing the point intensities of said the vertices that form a first polygon that defines certain of said points on the surface of said object to be displayed; and displaying said object on said video screen in response to said stored first, second and third output electrical signals.

6. A method of representing an object for graphical display according to claim 5, including the further steps of:

selecting a fourth of said output electrical signals that represents the cross product of said partial derivatives for the next vertex of said second row of vertices;

varying the value of said fourth electrical signal for representing the point intensity of said next vertex of said second row;

storing said varied fourth electrical signal in place of said varied first electrical signal;

said stored varied second, third and fourth electrical signals representing the point intensities of said vertices that form a second polygon that defines a certain additional one of said points on the surface of said object; and repeating said displaying step in response to said second, third and fourth electrical signals.

7. A method of representing an object for graphical display according to claim 6, including the additional steps of:

continuing said selecting of others of said output electrical signals that represent the cross products of said partial derivatives for said next vertices in each of said first and second rows by alternately and sequentially selecting said output electrical signals that represent the cross products of said partial derivatives of said next vertex from said first row and then from said second rows;

varying the value of each said other selected output electrical signal for representing the point intensity of said respective next vertex;

sequentially storing said varied other output electrical signals in place of one of said previously stored varied output electrical signals so that said currently stored varied output electrical signals represent the point intensities of successive polygons that define the next certain additional ones of said points on the surface of said object; and repeating said displaying step in response to said varied output electrical signals that represent said successive polygons.

8. A method of representing an object for graphical display according to claim 7, including the additional steps of:

continuing said alternate and sequential selecting step, said varying step and said storing step until additional ones of said varied output electrical signals are generated for representing the point intensities of all of said vertices of said first and second rows;

repeating said factoring, solving and combining steps using a third amount for the value of said first parameter and the same predetermined series of values for said second one of said parameters to control the values of certain other electrical signals as a function of said partial derivatives of each of said coordinates with respect to each of said parameters for each vertex of a third series of said vertices that define a third row of said points on said surface of said object;

repeating said selecting and varying steps and storing said resulting varied output electrical signals that represent the point intensities of said respective vertices of said third row of vertices in place of said varied output electrical signals that represent the point intensities of each said vertex of said first row of vertices; and repeating said displaying step in response to said varied electrical signals representing successive polygons of said second and third rows.

9. A method of representing an object for graphical display according to claim 8, including the further steps of:

repeating the steps of claim 9 using additional amounts for the value of said first parameter to successively generate varied electrical signals that represent the point intensities of each said vertex of new rows of vertices and to display said object in response to said varied electrical signals until said amount of said first parameter is a selected amount.

10. A method of defining data representing vertices of an object to be displayed graphically on a video display screen, said vertices being defined by coordinates, comprising the steps of:

generating electrical signals that have values that represent said coordinates of said vertices;

representing said values of each of said coordinates in terms of an equation having at least two parameters;

identifying a first of said parameters and keeping the value of same at a first amount;

factoring said coordinate equations to redefine same in terms of a first constant and a variable represented by a second one of said parameters;

sequentially solving said equations by substituting into said equations a predetermined series of values for said second one of said parameters to control said values of said electrical signals so that certain of said signals represent ones of said coordinates that define a first row of said vertices;

repeating said factoring and solving steps using a second amount for said first parameter and the same predetermined series of values for said second one of said parameters to control said values of said electrical signals so that certain of said signals represent ones of said coordinates that define a second row of said vertices;

sequentially selecting groups of said electrical signals from those representing said coordinates forming said first and second rows of said vertices to define a first row of polygons for representing said object for display; and displaying said object on said video display screen in response to said groups of electrical signals that define said polygons.

11. A method according to claim 10 for defining data representing said vertices of said object to be displayed, wherein said selecting step includes:
  selecting said electrical signals representing a pair of vertices at one end of said first row and one vertex from a corresponding end of said second row to define a polygon for representing said object for display; and
  sequentially selecting said electrical signals representing one additional vertex of said second row in lieu of said electrical signal representing said first vertex of said first row to provide electrical signals representing a series of polygons wherein each polygon is defined by two vertices of the last-defined polygon.

12. A method according to claim 11 for defining data representing said vertices of said object to be displayed, comprising the additional step of:
  continuing said sequential selection by alternately selecting said electrical signals representing said additional vertex of said first row and then of said second row and in succession substituting said last selected electrical signal for one of said previously selected said electrical signals representing a selected previous vertex so that said series of polygons is defined by all of said vertices of said first and second rows; and
  repeating said displaying step in response to said electrical signals representing all of said vertices of said first and second rows.

13. A method according to claim 12 for defining data representing said vertices of said object to be displayed, comprising the additional steps of:
  repeating said factoring and solving steps using a third amount for the value of said first parameter and the same predetermined series of values for said second one of said parameters to control the values of said electrical signals so that certain of said signals represent a third series of vertices that define a third row;
  repeating said sequential selection by sequentially selecting said electrical signals representing said third row of vertices instead of those that represent said first row of vertices to define another row of polygons for representing said object for display; and
  repeating said displaying step in response to said electrical signals representing said other row of polygons.

14. A method according to claim 13 for defining data representing said vertices of said object to be displayed, comprising the further steps of:
  repeating the steps of claim 14 for successively generating and displaying electrical signals representing new rows of vertices until said amount of the value of said first parameter is a selected amount.

15. Apparatus for generating data for graphically displaying an object having a surface defined by vertex locations, comprising:
  means for registering vertex electrical signals representative of first and second rows of said vertex locations;
  first means for selecting from said registering means vertex electrical signals representing a pair of vertices at one end of said first row and a vertex at a corresponding end of said second row to provide vertex electrical signals defining a first polygon; and
  means for further selecting from said registering means a next vertex electrical signal representing a next vertex of said second row and substituting said next signal for one of said previously selected signals to generate an additional signal that defines a next polygon along said rows,
  said further selecting means alternately selecting said vertex electrical signals representing vertices from said first row and then from said second row so that a series of polygons is formed between said first and second rows.

16. Apparatus according to claim 15 for generating data for graphically displaying an object having a surface defined by vertex locations, further comprising:
  means rendered effective upon selection of said vertex electrical signals representing all of said vertices of said first and second rows for writing into said registering means vertex electrical signals representing vertices in a third row in place of said electrical signals representing said first row of vertices; and
  means for cycling said first selecting means to select vertex electrical signals representing a pair of vertices at one end of said second row and a vertex at a corresponding end of said third row to provide vertex electrical signals defining an additional polygon for graphically displaying said object.

17. Apparatus according to claim 16 for generating data for graphically displaying an object having a surface defined by vertex locations, further comprising:
  means for defining how many rows of said vertex locations are to be used in displaying said object; and
  means operating in response to forming the last polygon from the last two of said rows for interrupting said cycling means.

18. A computer for controlling electrical signals so that said electrical signals represent vertices of an object to be displayed, said computer being programmed to perform the following sequential functions:
  generating said electrical signals that represent coordinates of said vertices;
  representing the values of each of said coordinates in terms of an equation having at least two parameters, said equation being factorable to redefine it in terms of a first constant and a variable represented by a second one of said parameters;
  identifying a first of said parameters and keeping the value of same at a first amount;
  sequentially solving said equations by substituting into said equations a predetermined series of values for said second one of said parameters to control the values of said electrical signals so that certain of said signals represent ones of said coordinates that form a first row of said vertices;
  repeating said solving function using a second amount for the value of said first parameter and the same predetermined series of values for said second one of said parameters to control the values of said electrical signals so that certain of said signals represent ones of said coordinates that form a second row of said vertices;
  sequentially selecting groups of said electrical signals from those representing said coordinates forming said first and second rows of said vertices to define a first row of polygons for representing said object for display; and displaying said object in response to said groups of said electrical signals.

19. A computer programmed according to claim 18 for controlling electrical signals to represent said vertices of said object to be displayed, wherein said sequentially selecting function of said computer programming includes:

selecting electrical signals representing a pair of said vertices at one end of said first row and one vertex from a corresponding end of said second row to define a polygon for representing said object for display; and sequentially selecting electrical signals representing one additional vertex of said second row in lieu of said electrical signal representing said first vertex of said first row to provide electrical signals representing a series of polygons wherein each polygon is defined by two vertices of the last-defined polygon.

20. A computer programmed according to claim 19 for controlling electrical signals to represent said vertices of said object to be displayed, wherein said sequentially selecting function of said programming of said computer includes:

continuing said sequential selection by alternately selecting electrical signals representing said additional vertex from said first row and then said additional vertex from said second row, and successively substituting said alternately selected electrical signals for said electrical signals representing a selected previous vertex so that said series of polygons is defined between all of said vertices of said first and second rows; and wherein said displaying function includes displaying said object in response to all of said electrical signals representing said series of polygons.

21. A computer programmed according to claim 20 for controlling electrical signals to represent said vertices of said object to be displayed, wherein said programming of said computer includes performing the additional functions of:

generating electrical signals by repeating said solving function using a third value for the amount of said first parameter and the same predetermined series of values for said second one of said parameters, the values of said electrical signals being controlled so that certain of said signals represent ones of said coordinates that form a third row of said vertices;

sequentially selecting electrical signals representing said coordinates of said third row of vertices instead of said first row of vertices to form another row of polygons for representing said object for display; and repeating said displaying step in response to said electrical signals representing said other row of polygons.

22. A computer programmed according to claim 21 for controlling electrical signals to represent said vertices of said object to be displayed, wherein said programming of said computer includes performing the additional function of:

repeating the functions of claim 21 for successively generating electrical signals representing the coordinates of vertices, in new rows and displaying said electrical signals until said value for the amount of said first parameter is a selected amount.

23. A computer for generating data to graphically display an object on a video display tube by controlling the values of output electrical signals that represent point normals of vertices that define a surface of said object, said vertices being defined by coordinates, the coordinates being defined by point coordinate equations having at least two parameters for defining said coordinates of said vertices, said point coordinate equations being differentiated and being factored to express said coordinates in terms of a first constant and of a variable represented by a second one of said parameters, said computer being programmed to perform the following sequential functions:

sequentially solving said differentiated equation by substituting a predetermined series of values for said second one of said parameters to control electrical signals that define the partial derivative of each said coordinate with respect to each of said parameters for each vertex of a series of vertices that define a first row of said vertices;

repeating said solving function using a second amount for the value of said first parameter and the same predetermined series of values for said second one of said parameters to control electrical signals that define the partial derivative of each said coordinate with respect to each of said parameters for each vertex of a series of vertices that define a second row of said vertices;

combining said electrical signals that represent the partial derivatives of said coordinates of a given coordinate with respect to each of said parameters to obtain said output electrical signals that represent the cross products of said partial derivatives for each said vertex of said first and second rows of vertices that define the surface of said object, wherein said output electrical signals for the coordinates of a given vertex represent the point normal for said given vertex;

selecting said output electrical signals to successively define polygons from said first and second rows of vertices; and displaying said object in response to said selected output electrical signals that define said polygons.

24. A computer according to calim 23 for generating data for graphically displaying an object, wherein said programming includes the following additional functions:

repeating said solving function using a third amount for the value of said first parameter and the same predetermined series of values for said second one of said parameters to control certain other of said electrical signals to define said partial derivatives of each of said coordinates with respect to each of said parameters for each vertex of a third series of said vertices that define a third row of said vertices;

repeating said combining function to combine said electrical signals for said third row that represent the partial derivative of a given coordinate with respect to each of said parameters to obtain said output electrical signals that represent the cross products of said partial derivatives for each vertex of said third row of vertices that define the surface of said object, wherein said output electrical signals for said coordinates of a given vertex represent the point normal for said given vertex; and repeating said selecting and displaying steps to display said object in response to output electrical signals defining polygons from said second and third rows.

25. A computer for defining data representing the vertices of an object to be displayed, the vertices of the object being defined by coordinates having values, the values of a particular coordinate being determined by a particular coordinate equation having at least two parameters, each particular one of the equations being successively factored to redefine that equation in terms of a first constant based on selected values of a first one of the parameters and a variable represented by a second one of said parameters, the values of the first parameter being selected so that a particular successively factored equation successively represents coordinates in successive rows of the vertices, said computer being programmed to perform the following sequential functions:

generating a first series of electrical signals having values determined by sequentially solving said factored equations after substituting into said factored equations each of a predetermined series of values for said second one of said parameters, the values of said electrical signals being controlled so that certain of said signals being controlled represent ones of said coordinates that form a first row of said vertices;

generating additional electrical signals having values determined by repeating said solving function using a second value for said first parameter and the same predetermined series of values for said second one of said parameters, the values of said additional electrical signals being controlled so that certain of said signals represent ones of said coordinates that form a second row of said vertices;

sequentially selecting groups of said first series of electrical signals and said additional electrical signals from those representing said coordinates forming said first and second rows of said vertices to define a first row of polygons for representing said object for display; and displaying said object in response to said grouped electrical signals that define said first rows of said polygons.

26. A computer programmed according to claim 25 for defining data representing the vertices of an object to be displayed, wherein the selecting function of said computer programming includes:

selecting from said first series of electrical signals those electrical signals representing a pair of vertices at one end of said first row;

selecting from said additional electrical signals one such signal representing one vertex from a corresponding end of said second row to define a polygon for representing said object for display;

selecting one of said additional electrical signals representing one additional vertex of said second row in lieu of said electrical signal representing said first vertex of said first row to provide electrical signals representing a next polygon; and selecting one of said electrical signals from said first series in lieu of one of said signals representing a vertex of said second row to provide electrical signals representing a further next polygon, wherein each polygon is formed from two vertices of the last-formed polygon.

* * * * *